(12) United States Patent
Walsh

(10) Patent No.: US 8,484,661 B2
(45) Date of Patent: Jul. 9, 2013

(54) AGNOSTIC EXECUTION CLUSTER FOR AN AGNOSTIC EXECUTION ENVIRONMENT

(75) Inventor: Matthew J Walsh, Redmond, WA (US)

(73) Assignee: AT&T Mobility II LLC, Atlanta, GA (US)

(*) Notice: Subject to any disclaimer, the term of this patent is extended or adjusted under 35 U.S.C. 154(b) by 313 days.

(21) Appl. No.: 12/783,474

(22) Filed: May 19, 2010

(65) Prior Publication Data
US 2011/0231862 A1 Sep. 22, 2011

Related U.S. Application Data

(60) Provisional application No. 61/315,502, filed on Mar. 19, 2010.

(51) Int. Cl.
G06F 9/44 (2006.01)

(52) U.S. Cl.
USPC ............................. 719/318; 719/315; 719/319

(58) Field of Classification Search
USPC ......................................... 719/315, 318, 319
See application file for complete search history.

(56) References Cited

U.S. PATENT DOCUMENTS

| | | | |
|---|---|---|---|
| 5,577,240 A | 11/1996 | Demers et al. | |
| 5,581,753 A | 12/1996 | Terry et al. | |
| 5,581,754 A | 12/1996 | Terry et al. | |
| 5,603,026 A | 2/1997 | Demers et al. | |
| 5,671,407 A | 9/1997 | Demers et al. | |
| 6,160,796 A * | 12/2000 | Zou | 370/257 |
| 6,557,111 B1 | 4/2003 | Theimer et al. | |
| 6,944,662 B2 * | 9/2005 | Devine et al. | 709/225 |
| 7,065,579 B2 | 6/2006 | Trversat et al. | |
| 7,133,669 B2 | 11/2006 | Nair et al. | |
| 7,136,927 B2 | 11/2006 | Trversat et al. | |
| 7,167,920 B2 | 1/2007 | Trversat et al. | |
| 7,206,841 B2 | 4/2007 | Trversat et al. | |
| 7,330,444 B1 * | 2/2008 | Pasqua | 370/282 |
| 7,340,500 B2 | 3/2008 | Trversat et al. | |
| 7,401,152 B2 | 7/2008 | Trversat et al. | |
| 7,401,153 B2 | 7/2008 | Trversat et al. | |
| 7,466,810 B1 * | 12/2008 | Quon et al. | 379/201.01 |
| 7,519,364 B2 | 4/2009 | Nair et al. | |
| 7,525,933 B1 | 4/2009 | Hall | |
| 7,533,172 B2 | 5/2009 | Trversat et al. | |
| 7,574,523 B2 | 8/2009 | Trversat et al. | |
| 7,802,001 B1 * | 9/2010 | Petry et al. | 709/230 |
| 7,814,218 B1 * | 10/2010 | Knee et al. | 709/230 |

(Continued)

OTHER PUBLICATIONS

"Xerox PARC's Bayou Project". Http://www2.parc.om/csl/projects/bayou. Last accessed on Apr. 6, 2010, 7 pages.

(Continued)

Primary Examiner — Van Nguyen
(74) Attorney, Agent, or Firm — Turocy & Watson, LLP

(57) ABSTRACT

The disclosed subject matter provides system(s) and method(s) for facilitating an execution environment in which services can be made available for use by one or more devices independently of such devices' hardware, operating systems, or run-time environments. The services can be abstracted and accessed by way of a Service Programming Interface (SPI). Execution environment devices can be members of one or more execution clusters and can interoperate by way of a logical bus, for example by contemporaneously signaling among member devices on an electronic signaling logical bus (ESLB). Signaling can be by way of event messages which can facilitate distributed computing and/or agnostic execution behavior.

36 Claims, 19 Drawing Sheets

U.S. PATENT DOCUMENTS

| | | | |
|---|---|---|---|
| 7,970,918 B2* | 6/2011 | Thompson et al. | ............ 709/230 |
| 2005/0149754 A1 | 7/2005 | Rasanen et al. | |
| 2006/0047830 A1 | 3/2006 | Nair et al. | |
| 2009/0041223 A1 | 2/2009 | Agarwal et al. | |
| 2009/0304015 A1 | 12/2009 | Wilars et al. | |
| 2010/0142368 A1 | 6/2010 | Gunukula et al. | |
| 2010/0220640 A1 | 9/2010 | Slack et al. | |

OTHER PUBLICATIONS

W. Keith Edwards, et al. Designing and Implementing Asynchronous Collaborative Applications with Bayou. Last accessed on Apr. 7, 2010, 10 pages.

"Thoughts on Flash". Http://www.apple.com/hotnews/thoughts-on-flash. Last accessed on Apr. 29, 2010, 4 pages.

Jini TM Architecture Specification. Sun Microsystems. Last accessed on Apr. 1, 2010, 26 pages.

Jaokar, Ajit. "How long should we wait for a standard to emerge and what is the cost of doing so?" Published on the Open Gardens Blog [http://www.opengardensblog.futuretext.com/archives/2009/05/how_long_should.html], May 25, 2009, retrieved on Dec. 8, 2010, 9 pages.

Sauter, Martin. "Voice—Bearer Aware, Bearer Adaptive or Bearer Agnostic?" Published on the WirelessMoves Blog [http://mobilesociety.typepad.com/mobile_life], Jun. 5, 2009, retrieved on Dec. 8, 2010, 2 pages.

Demers, et al. "The Bayou Architecture: Support for Data Sharing among Mobile Users", Proceedings of the 1994 First Workshop on Mobile Computing Systems and Applications, 6 pages.

Wikipedia. "General Magic", published online at [http://en.wikipedia.org/wiki/General_Magic], retreived Jan. 27, 2013, 3 pages.

Tardo, et al. "Mobile Agent Security and TeleScript", Proceedings of the 41st IEEE International Computer Conference, 1996, 6 pages.

OA dated Dec. 3, 2012 for U.S. Appl. No. 12/856,047, 36 pages.

Office Action dated Apr. 8, 2013 for U.S. Appl. No. 12/856,047, 34 pages.

Nakagawa. "Server-Less Programming: A simple and easy programming framework for 'device + cloud' computing model", published online at [http://live-e.naist.jp/sensor_overlay/5/doc/nakagawa.pdf], dated Oct. 2011, retrieved Apr. 6, 2013, 27 pages.

Nakagawa. "Dripcast: Server-less Java programming framework for Device Applications", published online at [http:// blog.livedoor.jp/techblog/techsemi/techcon120519-dripcast.pdf], dated May 2012, retrieved Apr. 6, 2013, 24 pages.

Nakagawa. "Challenge of cloud platform technology—changing communication style", published online at [http://mpls.jp/2011/presentations/111024-mpls-japan-print.pdf], dated Oct. 2011, retrieved Apr. 6, 2013, 27 pages.

* cited by examiner

AGNOSTIC EXECUTION CLUSTER FOR AN AGNOSTIC EXECUTION ENVIRONMENT

CROSS REFERENCE TO RELATED APPLICATION

This application claims the benefit of U.S. Provisional Application Ser. No. 61/315,502, filed on Mar. 19, 2010, and entitled "MOBILE MIDDLEWARE PLATFORM." The entirety of the above-referenced U.S. Provisional Application is incorporated herein by reference.

TECHNICAL FIELD

The disclosed subject matter relates to adaptive computer systems and, more particularly, to platforms for facilitating an execution environment often including mobile equipment in a wireless network environment.

BACKGROUND

Modern computer systems, including mobile electronic devices within or without a wireless network environment, typically employ a highly evolved operating system (OS) to execute software to accomplish computing tasks. Frequently, programmers work within standardized runtime environments or execution environments layered over an OS to develop an application for an end-user of a device. For example, many modern smartphones employ a highly evolved OS (e.g., MICROSOFT WINDOWS MOBILE 6.5, PALM OS, GOOGLE ANDROID, APPLE IPHONE OS 4.0, SYMBIAN OS, etc.) to provide much of the functionality of the device. Further, for example, applications are frequently written in well-characterized, and often competing, languages (e.g., SUN/ORACLE JAVA, ADOBE FLASH, WEBKIT, etc.) that execute in a "virtual machine" type environment on various OSs to allow more uniformity of results for a particular application despite the particular flavor of OS the application is running on top of. For example, a JAVA based calculator program can appear similar on an ANDROID based phone and on a WINDOWS MOBILE 7 (WM7) based phone, where both the ANDROID and WM7 phone support JAVA.

The use of applications in computing environments is greatly assisted by the use of runtime environment (RTE) programming silos (e.g., JAVA, FLASH, WEBKIT, etc.). The term "silo" is used herein to represents the paradigm that a program employing a specific RTE (for example, JAVA) is generally exclusively limited to functionality supported in that same RTE (i.e., JAVA), and would not be able to access functionality from a different RTE (for example, FLASH). Thus the exemplary program running JAVA code can be considered to be effectively relegated to, or "siloed" in, a JAVA RTE silo. These RTE silos allow programmers to learn and employ specific programming languages that are, at least in theory, supported across a plurality of OS. Thus, rather than demanding that each OS produce a similar rich set of functionality for the myriad of applications that could be made, the task is shifted to the RTE developers. As such, OS developers can focus on creating improved device functionality, RTE developers can focus on leveraging the resulting improved OS to provide improved programmatic functionality, and software application developers can focus on learning a RTE language to leverage the improved programmatic functionality to, in turn, produce improved applications within the particular RTE. Moreover, because a RTE runs similarly across different OS environments, the software developer need only learn and write in a small number of RTE languages to be an effective software developer for a large number of devices. It is worth noting that this specialization of labor is not exclusive to programmers that wish to develop software that is OS platform-specific (e.g., writing a program that directly interacts with an OS, rather than executing in a specific RTE silo on top of some OS).

One facet of specialized RTE silos is that the RTE developers have become associated with, or possibly had market success because of, superior performance in a particular aspect of RTE programmatic functionality. For example, ADOBE FLASH is highly regarded for visual effects the FLASH RTE can make available and easily accessible to the software developer. Similarly, JAVA is much appreciated by software developers, at least in part, because of the ease of programming data structures and robust computation functionality. Where competing developers gained market share by developing specific strengths over their competition, they were market-encouraged to metaphorically build the walls of the silos higher and higher to defeat the competition by drawing a sufficiently large base of programmers into only their RTE product to gain access to the desirable features not offered by the competing RTE products.

A second facet of specialized RTE silos is that the silos are typically mutually exclusive, especially where the RTEs are competitive technologies. As previously stated, to gain market share, RTE developers have historically resorted to development that more rigorously forces exclusive use of a single RTE for a developed software application. As such, software application developers often are highly invested in a single RTE technology to the exclusion of other RTE technologies. This 'brand loyalty' and robust silo business environment can be limiting to the quality of software products made available to users. For example, a JAVA programmer may opt not to use a particular FLASH feature in an application because they prefer to do the balance of the programming in JAVA. Thus, the exclusivity of the siloed RTEs, for example, can reduce the use of the FLASH feature even where said feature may be more desirable to an end-user.

In mobile networks in particular, user equipments (UEs) can run a highly tailored and evolved operating system to deliver a particular user experience (e.g., APPLE IPHONE OS, WINDOWS MOBILE OS, etc.), more so because the UE is often relatively inexpensive and frequently upgraded by end-users. For example, the IPHONE OS is currently experiencing major version upgrades on about a 12-month cycle (IPHONE OS v1.0 June 2007→v2.0 July 2008→v3.0 June 2009→v4.0 June 2010 (expected)). Further, the user experience can improve by employing a plurality of RTEs to give the user the best features of each RTE. However, the siloed nature of RTEs and increasingly the exclusivity of specialized OS can result in a lack of support for entire RTE silos on a particular UE (e.g., the IPHONE does not support FLASH on the IPHONE OS v1.0 through v4.0). As such, a mobile carrier can improve the user experience by providing an environment that facilitates access to functionality in different RTE silos and across a plurality of OSs.

SUMMARY

The following presents a simplified summary of the disclosed subject matter in order to provide a basic understanding of some aspects of the invention. This summary is not an extensive overview of the invention. It is intended neither to identify key or critical elements of the invention nor to delineate the scope of the invention. Its sole purpose is to present some concepts of the disclosure in a streamlined form as a prelude to the more detailed description that is presented later.

The disclosed subject matter provides system(s) and method(s) for facilitating an execution environment in which services can be made available for use by one or more devices independently of such devices' hardware, operating systems, or run-time environments. Services can be abstracted and accessed by way of a Service Programming Interface (SPI). The SPI related services can faclitate a more unified user experience across different user equipment.

Further, devices can be added to or removed from an execution cluster of the execution environment, wherein the devices of the execution cluster can interoperate by way of a logical bus, for example an electronic signaling logical bus (ESLB). Execution clusters can include one or more devices. The logical bus can allow the member devices of the execution cluster to signal the other devices of the execution cluster contemporaneously.

Signaling between devices of an execution cluster can be by way of event messaging on the logical bus. Event messages can include identifier portions and payload portions. Further, the payload portions can include code segments. Event messaging within the execution environment can facilitate distributed computing, for example by selectively distributing code segments, by way of the ESLB to other member devices of an execution cluster, for distributed processing by the execution cluster.

Signaling between devices of an execution cluster can also facilitate agnostic execution behavior, for example, between operating systems, run-time environments (RTEs), applications, or combinations thereof. This agnostic execution behavior can include accessing services related to the SPI. For example, an application in a first RTE can interact with an application in a second RTE through calls to SPI services.

To the accomplishment of the foregoing and related ends, the disclosed subject matter, then, comprises the features hereinafter fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the drawings.

DETAILED DESCRIPTION

Figure 1:
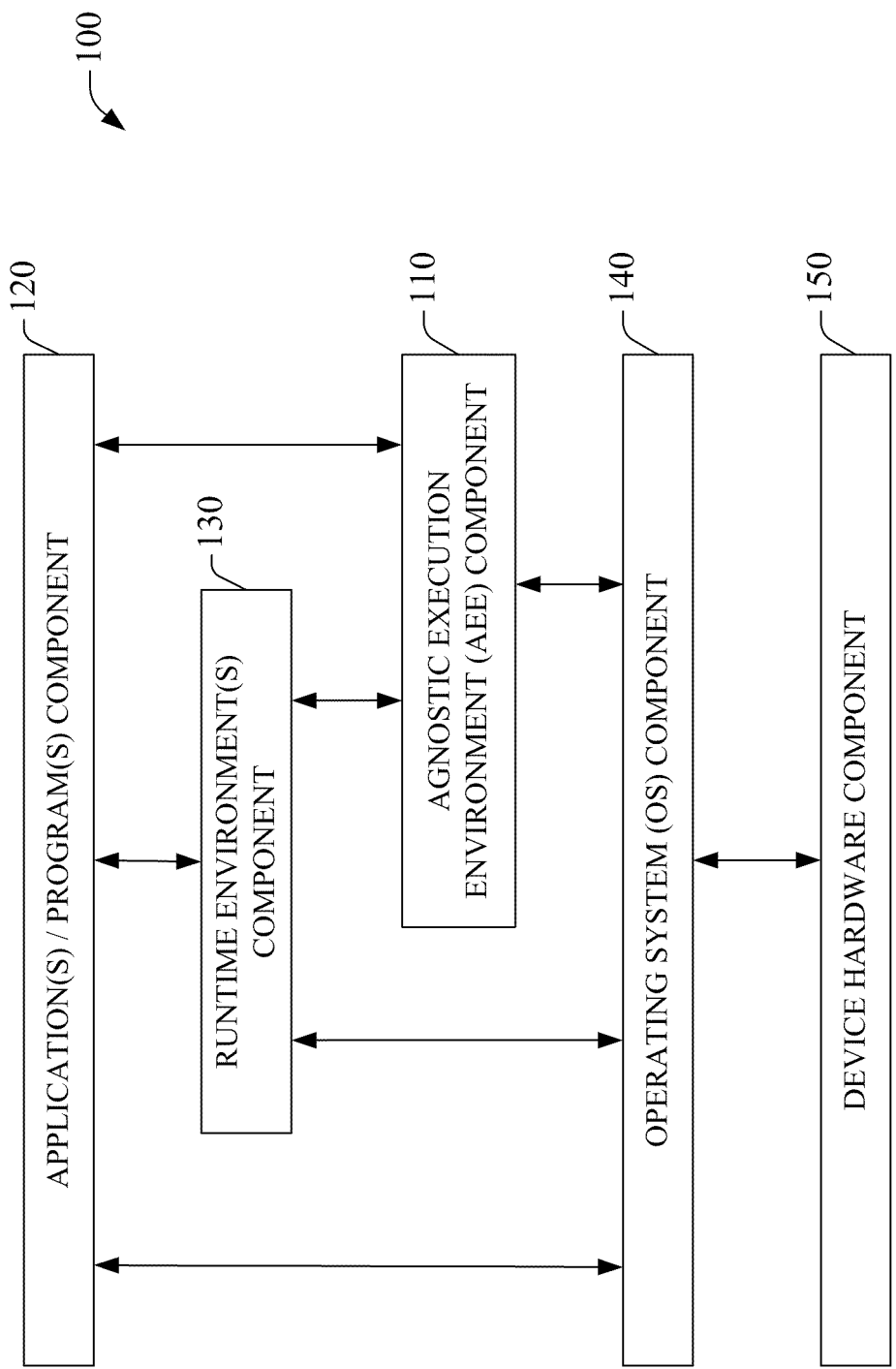
FIG. 1 is an illustration of a system that can interact within an agnostic execution environment in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); Femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UTMS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rate for GSM Evolution (EDGE) Radio Access Network (RAN) or GERAN; UMTS Terrestrial Radio Access Network (UTRAN); or LTE Advanced.

Further, mobile wireless networks can provide wireless access to various communications services for UEs, such as voice, video, data, messaging, content broadcast, VoIP, etc. Wireless networks can be short-, medium- or long-range, covering anywhere from a very limited area (e.g., a house) to a very wide area (e.g., a nation), and can employ various wireless transmission technologies and standards, e.g., UMTS, LTE, HSPA, Code Division Multiple Access (CDMA), Time Division Multiple Access (TDMA), Frequency Division Multiple Access (FDMA), Multi-Carrier Code Division Multiple Access (MC-CDMA), Single-Carrier Code Division Multiple Access (SC-CDMA), Orthogonal frequency division multiple access (OFDMA), Single-carrier FDMA (SC-FDMA), IEEE 802.11a/b/g/n (Wi-Fi), IEEE 802.16e (WIMAX), Bluetooth, ZigBee, short-range infrared, free-space optical, etc. Additionally, substantially all aspects of the subject matter can include other legacy telecommunication technologies not explicitly listed herein, as will be appreciated by one of ordinary skill in the art.

Modern electronic devices typically employ sophisticated operating systems (OSs) to leverage device capabilities in useful ways for end-users through programmatic access. OSs are a well known aspect of almost every electronic device in our modern world. Typically, these OSs closely track advances in devices to provide access to the most elementary and advanced aspects of a computer system (e.g., leveraging advances in processors, memory type/volume, video processing, networking standards/chipsets, etc.). Programs can interact with the device through the OS. These programs are often marquis software products for companies, for example, MS Office from MICROSOFT, ACROBAT from ADOBE, MATLAB from MATHWORKS, AUTOCAD from AUTODESK, etc. Programmers of these types of software are often concerned with the requirements of each specific OS that the developed software must run under. This can be cost-effective for some programs, but can be cumbersome and cost- prohibitive to smaller lightweight software programs that can often have substantially lower retail prices and thus narrower profit margins.

Smaller, lower cost programs are often desired by end-users. This desire is evidenced, for example, by the proliferation of "apps" for mobile devices, small shareware and freeware exchanges, etc. One drawback to the OS specific programming for these lower margin applications is that they often will only execute in a limited number of OS environments because the cost to port them to more OSs is prohibitive. This can restrict the eventual success of an application and can be a detriment to an end user with an unsupported OS on their device. One technique for overcoming the OS burden has been to develop runtime environments (RTEs) to allow an application developer to program in the RTE with the expectation that the RTE would run on multiple OSs. Further, RTEs evolved to include programmatic areas of expertise. Application developers could then leverage these RTE features to improve the application in development and could more easily avoid the need to port for multiple OS environments.

As stated herein, RTEs developed in a generally competitive environment that resulted in significant impediments to using features of a plurality of RTEs for a single application. Siloed RTEs generally do not allow the best features of each RTE to be available to end-users simultaneously. The restrictive nature of siloed RTEs also alienates some device users within a community of device users. For example, in a mobile carrier environment, where a first UE supports a first RTE but not a second, and a second UE supports the second RTE but not the first, releasing an application employing the first RTE silo alienates the users of the second device. This can be cured by releasing a second application programmed to employ the second RTE silo, but this can be cost-prohibitive. As such, the mobile carrier is not easily and cost-effectively allowed to offer a consistent user experience across the wide plurality of devices available.

As such, development of an environment that is agnostic with regard to RTE silos and OS environments is extremely desirable. An agnostic execution environment (AEE) can be deployed by a customer-oriented entity (for example, a large mobile carrier with millions of subscribers, a large computer manufacturer with millions of customers, a chip developer with billions of processors being used by millions of customers, etc.) such that programmers are allowed direct access to device features, access to OS features, and access to RTE features without the imposed silo walls created by competition between the RTE manufacturers, OS manufacturers, or device manufacturers. An AEE can facilitate a unified user experience among a plurality of affiliated devices, OS, RTEs, or combinations thereof. An AEE can facilitate access to the best features of a plurality of RTEs that are affiliated with the AEE. An AEE can exploit the consumer presence of the huge volume of customers (e.g., buying power) to cause competing RTEs (and similarly, competing OS, device manufacturers, etc.) to "play nice together" within the AEE to gain access to the large consumer base. For example, an RTE can become affiliated with an AEE by including RTE API elements allowing applications and/or programs written for the RTE silo to access AEE service(s) by way of Service Programming Interface (SPI) Module(s) and an agnostic execution cluster (AEC) component, as is more fully disclosed hereinbelow.

It is envisioned that an AEE can be functional across all types of communicative networks and technologies. As such, as previously stated, aspects, features, or advantages of the subject matter can be exploited in substantially any wired, broadcast, wireless, radio technology and/or network, or combinations thereof. Additionally, substantially all aspects of the subject matter can include other legacy telecommunication technologies. Where further information related particularly to Geocast technology can be useful to better understanding some aspects of the present disclosure, U.S. Pat. No. 7,525,933 B1, SYSTEM AND METHOD FOR MOBILE AD HOC NETWORK, ISSUED 28 Apr. 2009, is hereby incorporated by reference in the entirety without limiting the subject disclosure herein. Further, communicative coupling in any modality is envisioned to include unilateral, bilateral and/or multilateral forms of communication (as appropriate for any particular modality employed).

FIG. 1 is an illustration of a system 100 that can interact within an Agnostic Execution Environment (AEE) in accordance with aspects of the disclosed subject matter. System 100 can include an AEE Component 110. Further, system 100 can include application(s) and/or program(s) (A/P) component 120 and/or runtime environment(s) (RTE) component 130. Application(s) and/or program(s) (A/P) component 120 and/or runtime environment(s) (RTE) component 130 can be each communicatively coupled to AEE component 110. Where RTE component 130 is included in system 100, A/P component 120 can be communicatively coupled to RTE component 130. By this configuration, information can flow directly between A/P component 120 and AEE Component 110, directly between RTE component 130 and AEE component 110, between A/P component 120 and AEE component 110 by way of RTE component 130, or combinations thereof.

AEE component 110 of system 100 can be communicatively coupled to Operating System (OS) component 140. OS component 140 can be communicatively coupled to device hardware component 150. As depicted, AEE component 110 can be communicatively disposed between A/P component(s) 120 (including those running in a RTE silo) and the OS component 140. As stated herein, the term "silo" indicates that a program employing a specific RTE is generally exclusively limited to functionality supported in that same RTE and would not typically be able to access functionality from a different RTE. Thus, for example, a program executing in a JAVA RTE can be considered to be effectively relegated to, or "siloed" within, the JAVA RTE.

Whereas the AEE component 110 can be disposed between a program (by way of A/P component 120) and/or a program in a RTE (by way of RTE component 130) and a device operating system (by way of OS component 140 and device hardware component 150), AEE component 110 can receive and generate signals over the communicative couplings. As used herein, except where expressly otherwise limited, "signal" is interpreted broadly to include any communication of information between or among two or more elements, and by way of non-limiting examples can include instructions, commands, interrupts, heartbeat or monitoring information, timing information, and transfers of data, modules, code snippets, parameters, or any other information. In an embodiment, AEE component 110 can serve to merely "pass-through" the signals, and thus remain relatively invisible in a system. For example, an MP3 player application can generate signal(s) for the OS that are merely passed through AEE component 110 to the OS to cause the device to play a music file in response to a user action. In this example, AEE component 110 is present but has no noticeable effect on the functionality of the MP3 player application.

In other embodiments, AEE component 110 can be an interactive portion of system 100 by reacting to received signals and actively generating signals to elicit desired responses from communicatively coupled components. For example, an OS can send an "audio alert" signal for an alarm clock application through AEE component 110. AEE component 110 can intercept the signal and prevent it from propagating to the alarm clock application, for example, based on a determination that the user is scheduled to be in a business meeting at that time. Similarly, for example, AEE component 110 can generate a "visual alert" signal for the alarm clock application in lieu of an audio alert. While this is an overly simplistic set of examples, one of ordinary skill in the art will appreciate that interposing an AEE component 110 between the OS layer of an electronic device and the A/P and/or RTE layers can facilitate interaction with, and/or alteration of, nearly every aspect of modern computing systems. It is within the scope of the present disclosure that AEE component 110 can usurp all, some, or none of the communicative signaling between a device and software running on the device. It is further within the scope of the subject disclosure, that the AEE component 110 can communicate additional signals between a device and software running on the device based on criteria of which other components of system 100 may, or may not, be given access to.

System 100 can further include communicative couplings between A/P component 120 and OS component 140. Similarly, system 100 can include communicative couplings between RTE component 130 and OS component 140. Moreover, although not illustrated, each of A/P component 120, RTE component 130, AEE component 110, or combinations thereof, can be communicatively coupled to device hardware component 150.

In an aspect, AEE component 110 can be communicatively coupled to other system 100 components in a manner similar to a middleware component, as will be appreciated by one of ordinary skill in the art. However, it will further be appreciated by one of skill in the art that where the AEE component 110 serves to facilitate an agnostic execution environment as is disclosed herein in more detail, the AEE component 110 departs significantly from traditional notions of middleware as a simple translation layer (see, e.g., Microsoft Computer Dictionary, 5$^{th}$ Ed., 2002).

Figure 2:
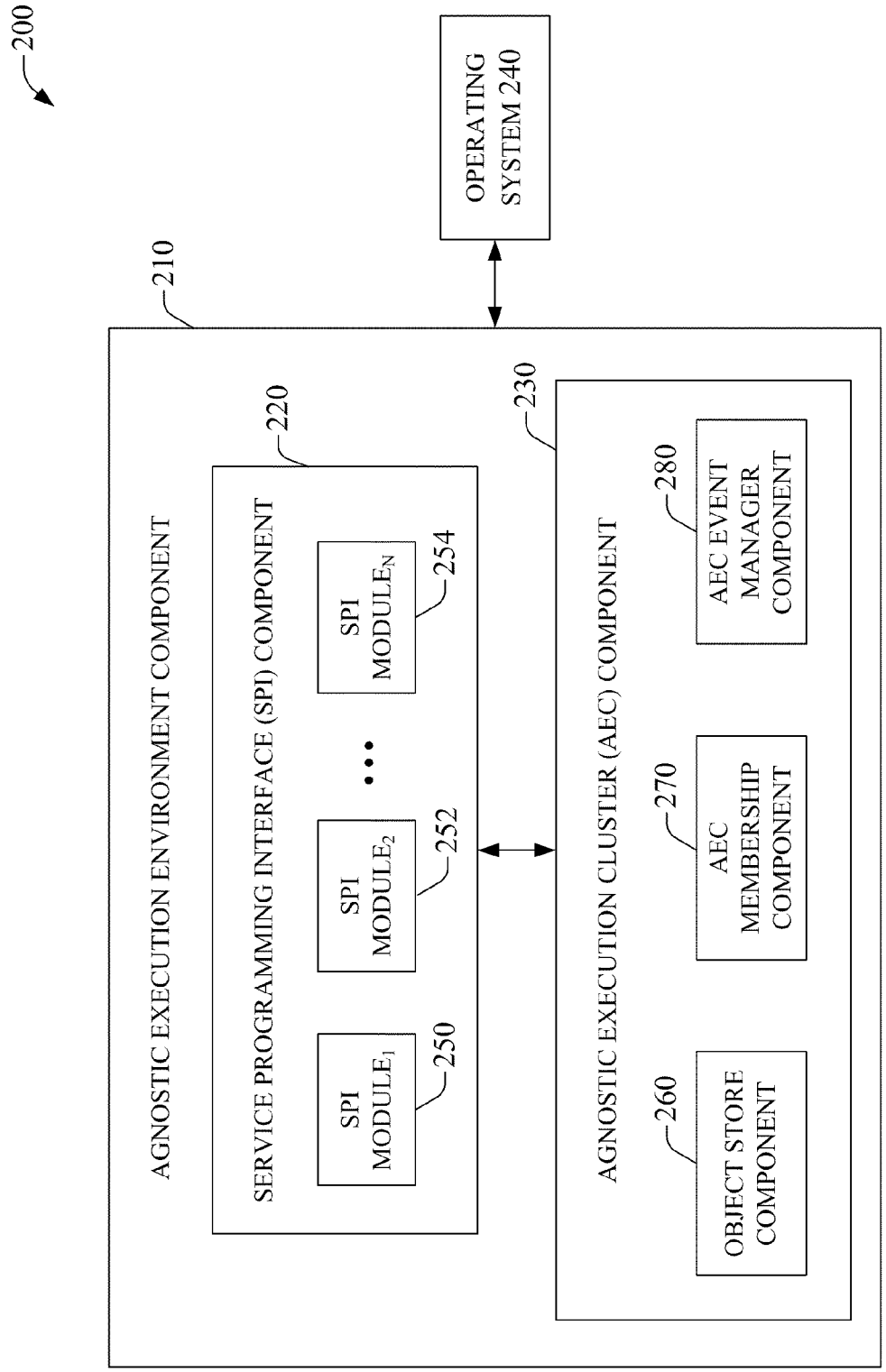
FIG. 2 is a depiction of a system that facilitates forming an agnostic execution cluster for an agnostic execution environment in accordance with aspects of the subject disclosure.

FIG. 2 is a depiction of a system 200 that facilitates forming an agnostic execution cluster (AEC) for an AEE in accordance with aspects of the presently disclosed subject matter. System 200 can include an AEE component 210 that can be the same as, or similar to, AEE component 110 of system 100. AEE component 210 can include Service Programming Interface (SPI) component 220. AEE component 210 can similarly include Agnostic Execution Cluster (AEC) component 230. AEE component 201 can be communicatively coupled to OS component 240, which can be the same as or similar to OS component 140 of system 100. An AEC can include one or more AEC components 230 (e.g., a single AEC component 230 of a single device; a plurality of AEC components 230 of a single device; a plurality of AEC components 230 of a plurality of devices; a single AEC component 230 distributed across a plurality of devices; etc.).

In an aspect, AEE component 210 can intercept communicative signaling intended for OS component 240 from other software and hardware layers (not illustrated) in a manner similar to that of AEE Component 110 in system 100. As such, AEE component 210 can assume none, some, or complete control of information passing to an electronic device OS. Further, AEE component 210 can generate signals that can be passed to OS component 240 (and to other software and hardware layers, not illustrated). These signals (interrupted, processed, generated, or combinations thereof) can cause an electronic device to act in manner consistent with a business logic layer and/or a core logic layer.

In an aspect, SPI component 220 can represent a collective of business logic. As will be appreciated by one of skill in the art, the term "business logic" generally refers to a set of rules or decision-making criteria relating to achieving a particular goal or purpose (which can be, but need not be, a business purpose) from a particular state or condition. A wide variety of such goals or purposes are possible. Some illustrative examples include selecting a particular bearer path from a set of available bearer paths based on network congestion, selecting a repository to store a persistent datum based on access speed, adapting a user interface on a user device based on a known user preference, sending a call to voicemail based on a user being scheduled for a meeting, etc.

The term "business logic" is used in contrast to the term "core logic," which generally refers to a set of rules or decision-making criteria relating to realization of and/or implementing a process (e.g., executing code, signaling, accessing information, etc.) to achieve a determined business logic. As a non-limiting example, a business logic determination can relate to deciding between an audio and visual alert based on the preferences of a user. In contrast, the core logic can be related to generating the particular electronic signals for the business logic selected visual or audio alert on a designated device of the user at a designated time. Of course, these simple examples of business logic and core logic are only intended to be illustrative and are not meant to be limiting. One of skill in the art will appreciate that both the business and core logics can be significantly more or less complex, and all such levels of complexity for these logics are within the scope of the presently disclosed subject matter. As a more complex non-limiting example, business logic can relate to generating landing sequence instructions for incoming air traffic at an airport based on spacing and timing rules and relating to criteria associated with passenger comfort levels, flight path noise levels, weather, date, and airplane fuel conditions among many others. Similarly, related core logic can be associated with generating and presenting the appropriate instruction sets on the appropriate aircraft as they come into the airspace controlled by that airport, e.g., accessing selected instructions on a database of instructions, merging the accessed instructions into a deliverable instruction set, passing the instruction set data over appropriate signaling pathways, presenting them to a pilot on a selected display device, etc.

One of skill in the art will appreciate that the service programming interface would not be confused with an application programming interface (API). An API is well understood to be a programming interface related to a particular application environment. In contrast, an SPI is an abstraction that describes an interface for interaction with a service, or set of services, used by components of an AEE. Unlike an API, an SPI is not constrained to an application environment. In an aspect, an SPI can allow access to services through an AEC component outside of the constraints typically associated with an API (see FIG. 13 for a non-limiting example). In another aspect, an API can serve as a means of accessing an SPI, for example, a JAVA API can offer SPI calls (e.g., abstractions specific to the JAVA programming environment that interface with an SPI module to access service functions) for inclusion by a JAVA application developer in a developed JAVA application. Extending this example, a FLASH API can offer the same SPI calls (e.g., the abstractions are specific to FLASH but interface with the same SPI modules accessed by the JAVA example to access the same service functions) to allow inclusion by a FLASH application developer in a FLASH application. For example, a JAVA based graphing calculator application and a FLASH based music player application can access a 'cluster member SPI module' to gather information on the member devices for the cluster to determine what processor in the cluster is fastest for the JAVA computations and where a music metadata table is stored for the FLASH music player.

In some embodiments of the disclosed subject matter, software providing access to service function(s) described by an SPI can be said to be module(s) of the SPI. SPI component 220 can comprise one or more SPI modules 250, 252, 254 in system 200. SPI modules 250-254 within SPI component 220 can be accessed, for example, though TCP and services/ports (e.g., TCP or UDP ports), as shared libraries, or by shared/block memory, etc. SPI modules 250, 252, 254 can range from very basic and simple services to highly complex and detailed services. For example, a very basic SPI module can simply accept a datum and store it to a location in memory. In contrast, a very complex SPI module can track data related to a nationwide truck shipping fleet and can have service function calls ranging from arrival time information to fuel consumption, to greenhouse gas generation and carbon credit computations, among many more. Clearly, having access to these types of services separate from any particular set of programs (in contrast with an API) provides tremendous leverage for the information and control these services can relate to, as will be appreciated by one of skill in the art. Given that the nature of the SPI layer associated with SPI component 220 and SPI modules 250, 252, 254, can be highly complex, the discussion herein is limited for purposes of clarity of exposition of the presently disclosed subject matter. Of course, it will be appreciated by one of ordinary skill in the art that other components can be substituted for, or work in conjunction with, SPI component 220 without departing from the scope of the disclosed subject matter; for example, API components (not illustrated) can complement SPI component 220 with regard to facilitating an Agnostic Execution Environment.

As illustrated, AEC component 230 can be communicatively coupled to SPI component 220 in accordance with aspects of the disclosed subject matter. In an aspect, AEC component 230 can represent a core logic layer. AEC component 230 can facilitate forming an agnostic execution cluster for an AEE in accordance with aspects of the subject disclosure. In an aspect of the disclosed subject matter, AEC component 230 can facilitate determinations related to a signaling event (e.g., signal interrupting, processing, generating, or combinations thereof) or a data access event (e.g., writing data, reading data, pointing to data, or combinations thereof). AEC component 230 can comprise an object store component 260, an AEC membership component 270, an AEC event manager component 280, or combinations thereof.

In an aspect, object store component 260 can be a persistent data storage component. Object store component 260 can include a table with pointers to data that can be local, remote, distributed, or combinations thereof. Further, object store component 260 can include data lookup modalities, as will be appreciated by one of ordinary skill in the art, and all such modalities are to be considered within the scope of the presently disclosed subject matter. Object store component 260 can further include memory space for storage and access of data (e.g., volatile and/or non-volatile memory).

In accordance with aspects of the disclosed subject matter, AEC membership component 270 can facilitate communicative coupling with AEC component 230. In an aspect, AEC membership component 270 can provide for self-interrogation features, that is, features for querying and obtaining information as to the state and status of AEC component 230 and/or the constituent components thereof, as well as AEC component services (e.g., those accessible through SPI modules), the device (not illustrated) and OS 240 which AEC component 230 is using, or combinations thereof. For example, AEC membership component 270 can determine a device identification, processor speed, physical memory conditions, network connection characteristics and performance data, device capabilities (camera, video, audio, keyboard, touch screen, . . . ), etc. (from a device hardware component (not illustrated) similar to, or the same as, device hardware component 150 in system 100); usage patterns, user preferences, historical data, etc. (from a persistent memory store such as object store component 260); software applications available, current user focus, etc. (by interrogating OS component 240); etc. One of skill in the art will appreciate that many other different types of data can be collected and that all such information through a self-interrogation is within the scope of the present disclosure.

In another aspect, AEC membership component 270 can select communication pathways among components within a device, among components between different devices, or combinations thereof. For example, AEC membership component 270 can select between a WiFi connection or a Bluetooth connection between a home theater device and a Smartphone device. In another example, the AEC membership component 270 can select to use both the WiFi and Bluetooth connections simultaneously, for example, where the smartphone is plugged in and battery drain is not an issue. Numerous other examples of communications pathway selection can be envisioned and all such examples are within the scope of the disclosed subject matter.

In a further aspect, AEC membership component 270 can facilitate access to metrics that can be employed by a network provider to designate to the UE a bearer path for information transfer. For example, the AEC membership component 270 can source information to the network provider that available WiFi connection is poor and a good 3G cellular service is available to a mobile phone device (such that the 3G service would be better performing than the WiFi). In response, the network provider can designate that the 3G connection be used by the UE where current 3G load is low and the user has a premium service package through the network provider.

As previously stated, AEC component 230 can comprise AEC event manager component 280 in accordance with aspects of the presently disclosed subject matter. In one aspect, AEC event manager component 280 can facilitate signaling on an event signaling logical bus (ESLB, not illustrated). In an aspect, electronic devices, having an AEC component 230, that share an ESLB can be considered members of an Agnostic Execution Cluster (AEC) as will be discussed in more detail hereinbelow (see FIG. 3, among others). In an accordance with an aspect of the subject disclosure, AEC event manager component 280 can read/write to the ESLB such that other communicatively coupled devices can "listen" (e.g., read) or "announce" (e.g., write) events on the ESLB. For example, AEC event manager component 280 of a television can announce the name of the next television program on the ESLB. Where a digital video recorder (DVR) shares the ESLB, the DVR can listen, by way of an AEC component (e.g., 230) of the DVR, to the announcement of the next television program to help determine if that is a television program that should be recorded for later viewing. Similarly, where a smartphone shares the ESLB, the phone can listen, by way of an AEC component (e.g., 230) of the smartphone, to the announcement of the next television program to determine if the phone should post an alert regarding the television program. Further, the phone can listen for an announcement from the DVR that the television program is being designated for recording and, in response, can determine if that information should be posted in an alert to the user. Further, where the phone, DVR and television all share the ESLB through an AEC event manager component 280 of the respective AEC components 230 in each device, these devices can be considered as an agnostic execution cluster. In an aspect, an ESLB can comprise one or more listening components, one or more announcing components, communicative pathways therebetween, or combinations thereof, to facilitate logical bus behavior across an AEC. In an aspect, logical bus behavior can be seen, for example, as being, at least in part, analogous to the behavior of a physical electrical bus in a computer system or network (keeping in mind that whereas electrical signals propagate through a physical electrical bus virtually instantaneously, that is, at the speed of light, logical signals can propagate through an ESLB at a slower rate wherein ESLB signaling can be subject to buffering, latency, translations, propagation delays, etc., such that signaling on the ESLB can be contemporaneous rather than simultaneous). An ESLB can, as will be appreciated by one of skill in the art, further comprise one or more security components, privacy components, buffering components, prioritizing components, or combinations thereof to augment the "bussing" behavior among associated AEC components.

In an aspect, information written on or read from the ESLB by AEC event manager component 280 can have an identifier portion and a payload portion. It will be appreciated that additional portions can be included in the written or read information, for example, reserve-bit portions, size-indicating-bit portions, etc. In a further aspect, the identifier portion can relate to a target, source, or type of information in the payload. As such, the information can be routed to a specific target, can be read by devices interested in writes from a particular source, or can be read by devices interested in particular types of payloads. The identifier can be a predetermined size, for example, 16 bits, 32 bits, 64 bits, 128 bits, etc. Further, the identifier can be inclusive or exclusive; for example, the identifier can indicate that all devices satisfying a condition should listen or all devises satisfying a condition should not listen. The payload can also be of a predetermined size, or can be dynamically sized, for example by including a payload size information within the identifier or designated bits of the payload itself. In an aspect, the AEC event manager component 280 can be ignorant of the payload content. For example, AEC event manager component 280 can present payloads that are data, code snippets, programs, etc.

One of skill in the art will appreciate that the specific delineation of functionality among the object store component 260, AEC membership component 270, and AEC event manager component 280 of the AEC component 230 is merely for convenience and ease of comprehension. The functionality of the individual components, as disclosed herein, can just as easily be combined into a single component, divided into more components, or distributed differently among the illustrated components without departing from the scope of the present disclosure. For example, the functionality of the network provider selecting a bearer path need not reside in AEC membership component 270 as disclosed herein, but could just as easily be embodied in a separate bearer path component (not illustrated) or within the object store component 260. As a similar non-limiting example, the self-interrogation features disclosed herein could be embodied in a separate interrogation component within AEC component 230, reside within object store component 260, or be an SPI module within the SPI component 220, among others.

Figure 3:
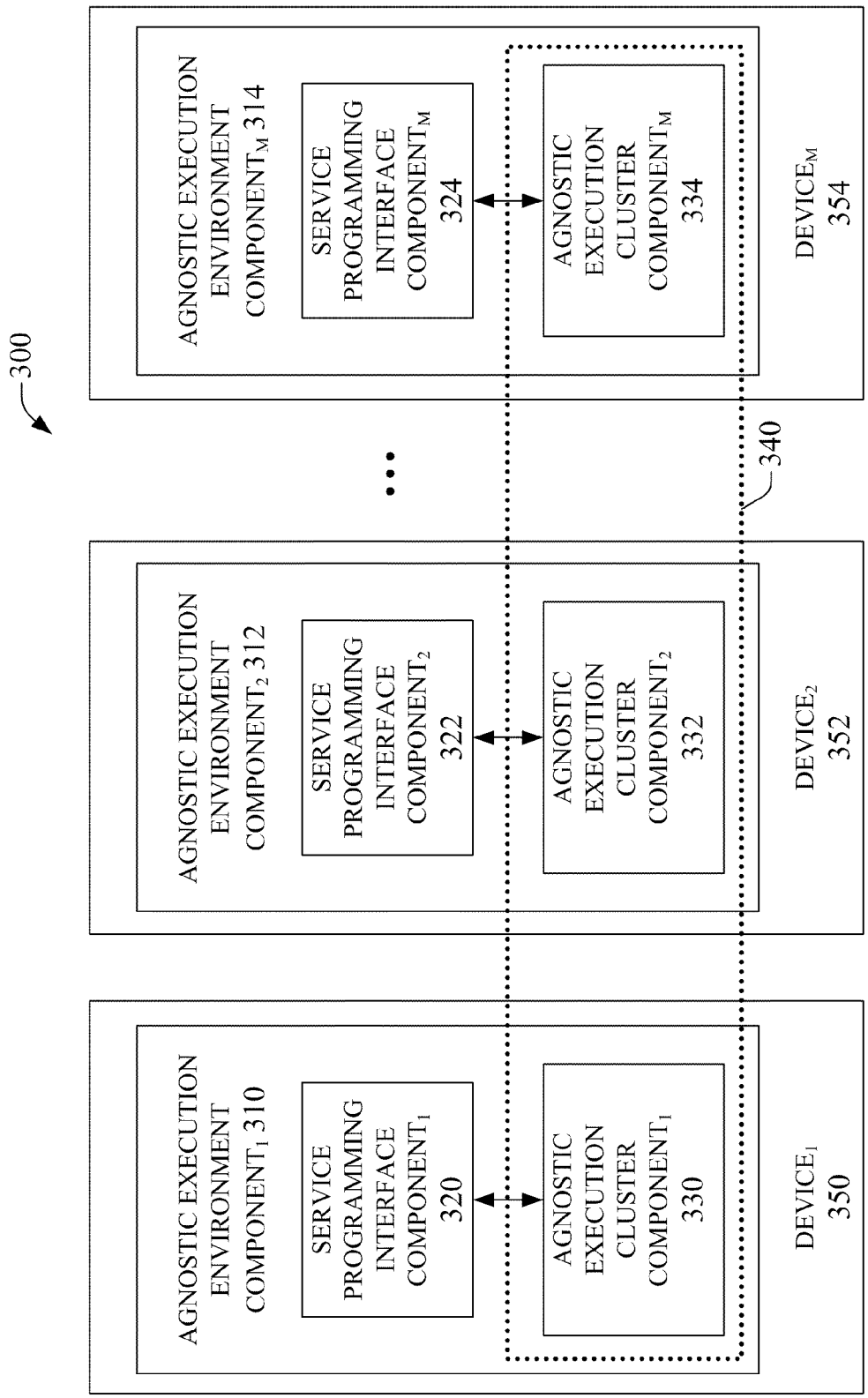
FIG. 3 illustrates a system that can function as an agnostic execution cluster in accordance with the disclosed subject matter.

FIG. 3 illustrates a system 300 that can function as an agnostic execution cluster 340 in accordance with the disclosed subject matter. System 300 can include any number of electronic devices, here illustrated as devices 1, 2, . . . M (350, 352, 354 respectively). For example, where a user has a home personal computer (PC), a laptop, a smartphone, and a digital video recorder (DVR), and a set-top box (STB), M can be equal to 5. In another example, where only one device is present (e.g., a smartphone), M can be equal to 1 (i.e. there is only one device, e.g., the smartphone, in the cluster). In a further example, there can be many devices with AEC components, such as in each of the tablets carried by United Parcel Service delivery persons, in which case, M can be in the thousands or tens of thousands. It will be appreciated that while increasingly large M-values can correlate to increasingly complex cluster management issues, all values of M are considered within the scope of the present disclosure. Devices 1 to M (350-354) can include AEE components 1 to M (310, 312, 314), respectively, as illustrated. These AEE components 1 to M (310-314) can each be the same as, or similar to, AEE component 210 of system 200, or 110 of system 100. AEE components 1 to M (310-314) can include SPI component 1 to M (320, 322, 324), respectively. Similarly, AEE components 1 to M (310-314) can include AEC component 1 to M (330, 332, 334), respectively. SPI components 1 to M (320-324) can be communicatively coupled to AEC components 1 to M (330-334), as illustrated. Further, SPI components 1 to M (320-324) can each be the same as, or similar to, SPI component 220 of system 200 and AEC components 1 to M (330-334) can each be the same as, or similar to, AEC component 230 of system 200.

In accordance with an aspect of the subject disclosure, AEC 340 can include devices 1 to M (350 to 354). In an aspect this can be associated with an ESLB (not illustrated) being shared among the member devices (e.g., devices 1 to M (350, 352, 354)) by way of AEC components 1 to M (330 to 334). An ESLB can comprise one or more communicative coupling modalities to extend a logical bus between AEC devices (e.g., 350-354). A logical bus can be a schema that provides for addressable communication between electrically decoupled devices or device components. For example, a logical bus can be a FIFO stack or any other logical means of queuing events that have an identifier and a payload. As another example, a logical bus can be effected over a persistent storage medium. In a further example, protocols, such as MBus (see Network Working Group RFC 3259) can be employed to deploy a logical bus. One of skill in the art will appreciate that any logical bus (and indeed, even some physical busses) can serve to effectively cluster devices in an AEC in accordance with the subject disclosure. As such, any logical bus (including without limitation those having significant physical bus portions) is considered within the scope of the present disclosure. One of skill in the art will further appreciate that an ESLB is but one possible means for clustering in an AEC and that any form of clustering is within the scope of the presently disclosed subject matter. Moreover, while many particular examples given herein relate to the use of an ESLB for brevity and ease of comprehension of the larger aspects of the disclosed subject matter, this should not be considered limiting, in that other clustering methods can be substituted functionally for an ESLB (with appropriate adaptations for any particular clustering technique). Moreover, the term "AEC" ("agnostic execution cluster") can be employed interchangeably with the term "cluster' without departing from the various aspects of the disclosed subject matter.

In an aspect, an AEC can comprise one or more AEC components of one or more electronic devices. For example, AEC 340 can extend between $Device_1$ (350) to $Device_2$ (352) by way of an ESLB (not illustrated) employing, for example, a Bluetooth link to effect that portion of the ESLB. Continuing the example, AEC 340 can similarly extend between $Device_2$ (352) to $Device_M$ (354) by way of the ESLB (not illustrated) employing a WiFi link, for example, to effect that portion of the ESLB. Moreover, AEC 340 in this example can couple $Device_1$ (350) to $Device_M$ (354) by way of the ESLB (not illustrated) with, for example, an Ethernet ESLB segment. One of basic skill in the art will appreciate that the particular coupling modality or modalities used are irrelevant with regard to clustering between some or all devices in an AEC (though it may bear on the performance of a cluster or portion thereof) and, as such, all communicative coupling modalities are considered within the scope of the present disclosure. For example, the ESLB can comprise peer-to-peer networking, 3G or 4G (i.e., $4^{th}$ generation) cellular networks, WiFi or other wireless LANs, wired LANs, WANs, Bluetooth, etc.

In an aspect, the members of an AEC need not be in geographic proximity to each other so long as the devices can cluster (e.g., communicatively couple, for example, by sharing an ESLB). In an aspect, the delineation of a cluster can be defined, at least in part, with regard to communicative coupling between AEC members, for example, by which AEC members are sharing an ESLB. As such, a particular device can be a member of one or more clusters. For example, where a particular device shares one or more ESLBs, that device can be a member of an AEC for each ESLB. Further, for example, a first ESLB can communicate to a second ESLB with or without the respective AEC devices being in the same cluster (e.g., two AECs can merge and share a merged ESLB or the two AECs can remain separate and simply transmit a message between the respective ESLBs). In an aspect, sharing an ESLB can be likened to listening (e.g., reading) for events being written to the ESLB. In a further aspect, devices can be dropped from an AEC where communicative coupling is absent (e.g., connectivity to the ESLB is lost) and automatically rejoin the AEC when a communicative coupling is established (e.g., connectivity to the ESLB is restored). Examples of this aspect can include spotty cellular coverage, dead battery in an AEC device, a device going into a sleep mode where the ESLB is not monitored, IP Address conflicts, radio noise, etc.

In accordance with an aspect of the present disclosure, where AEC components 1 to M (330-334) can each interpose between the OS layer and the A/P layers (not illustrated) on their respective 1 to M devices (350-354), intercepted communications between an A/P layer and an OS layer on any device 1 to M (350-354) can be parsed and distributed among one or more of devices 1 to M (350-354) of the cluster 340. For example, where a user changes a value in a computationally complex spreadsheet on a smartphone, the AEC component can designate that the computations (or portions thereof) be executed on a replica of the spreadsheet at a desktop PC of the AEC. The values can then be updated at the spreadsheet displayed on the smartphone. This can relieve the smartphone of the need to do the complex computations on a mobile processor. Extending the example, where one or more devices incorporating fast processors are members of the AEC, the aforementioned self-interrogation feature can, for example, facilitate a determination as to which processors to employ for the computation (e.g., which device(s) has a current replica of the spreadsheet, which device(s) is computationally most efficient, which device(s) has the best connectivity to update the replica after the computations have been completed, etc.). In a further example, distributed parallel computation can be facilitated by parsing code with an AEC component (e.g., 330 to 334) into subroutines to be run in parallel on various processors (not illustrated) within cluster 340.

In a related aspect, as the conditions within an AEC change (for example, membership changes, connectivity changes, etc.) the determinations as to delegation of functionality across components of the AEC can change dynamically. For example, where a photo-realistic rendering of a construction project is to be updated for viewing on a projector connected to a smartphone member of an AEC, the update can occur on an office computer member of the AEC and the smartphone can be notified that the render has completed. However, where the office computer becomes heavily taxed with other projects, a portion of the render can be dynamically offloaded to be performed on the smartphone, a portion on a home PC member of the AEC, and a remaining portion on the office computer. A shared replica of the render can then be updated with the separately rendered portions, and the smartphone can be notified that the render is complete. One of skill in the art will appreciate that numerous other applications of the dynamic allocation of resources or access to resources across members of an AEC are readily conceived and that all such examples are within the scope of the present disclosure.

Figure 4:
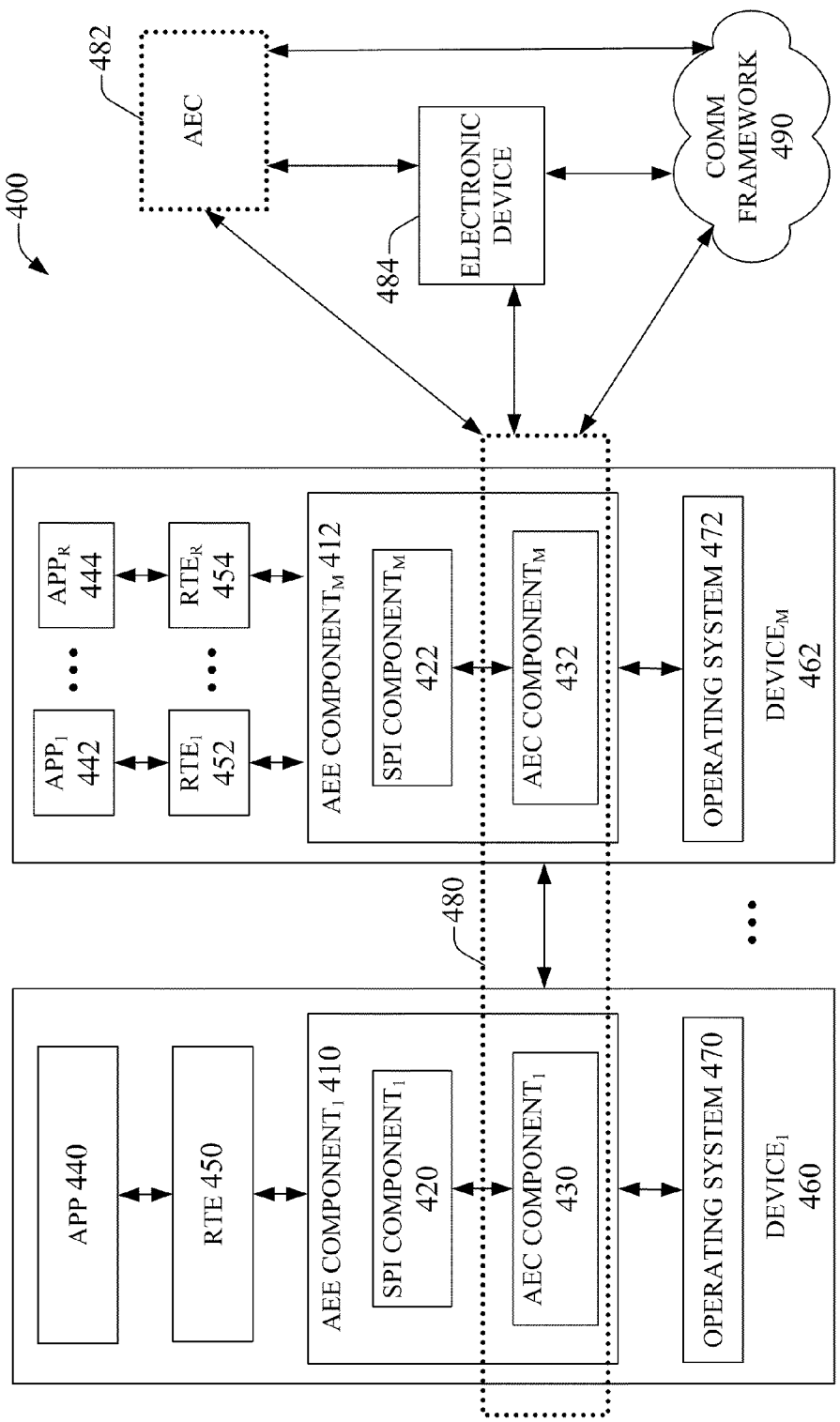
FIG. 4 is a depiction of a system comprising an agnostic execution cluster in accordance with aspects of the subject disclosure.

FIG. 4 illustrates a system 400 comprising an AEC in accordance with aspects of the subject disclosure. System 400 can be an AEE. System 400 can include AEC 480, which can comprise 1 to M AEC components 430 to 432. AEC components 430 to 432 can respectively be components of 1 to M devices 460 to 462. In an aspect, AEC components 430 to 432 can respectively be sub-components of AEE components 410 to 412. Devices 460 to 462 can each be the same as, or similar to, devices 350 to 354 of system 300; AEE components 410 to 412 can each be the same as, or similar to, AEE components 310 to 314 of system 300, AEE component 210 of system 200, or AEE component 110 of system 100; AEC components 430 to 432 can each be the same as, or similar to, AEC components 330 to 334 of system 300 or AEC component 230 of system 200; AEC 480 can be the same as, or similar to, AEC 340 of system 300; or combinations thereof.

Devices 460 to 462 of system 400 can further comprise 1 to M SPI components 420 to 422. SPI components 420 to 422 can be sub-components of AEE components 420 to 422. Moreover, SPI components 420 to 422 can each be the same as, or similar to, SPI components 330 to 324 of system 300 or SPI component 220 of system 200. SPI components 420 to 422 can be respectively be communicatively coupled to AEC components 430 to 432, as illustrated.

AEC 480 can be communicatively coupled to another AEC 482, either directly (e.g., by Ethernet cable, Bluetooth, WiFi, cellular radio, etc.), by way of a larger communications framework 490 (e.g., Internet, cloud computing, cellular network, satellite link, etc.), or combinations thereof. In an aspect, communicative coupling between AEC 480 and AEC 482 can facilitate communication between components of member devices for each AEC (e.g., device components of AEC 480 can be communicatively coupled with device components of ACE 482). In a further aspect, communicative coupling between AEC 480 and AEC 482 can facilitate communication between the ESLB of AEC 480 and the ESLB of AEC 482 (ESLB not specifically illustrated). In a still further aspect, communicative coupling between AEC 480 and AEC 482 can facilitate communication between components of member devices for each AEC and an ESLB of the other AEC (e.g., device components of AEC 480 can be communicatively coupled with the ESLB of ACE 482, etc., ESLB not specifically illustrated). In related aspect, the devices of an AEC can be communicatively coupled to devices of another AEC without a communicative pathway being specifically designated between the respective AECs. These inter-device communicative couplings can similarly be direct or through a communications framework (e.g., communications framework 490). For example, a member device of AEC 480 can be communicatively coupled to a member device of AEC 482 without any communicative coupling between AEC 480 and AEC 482 being specifically designated (not illustrated).

AEC 480 can be communicatively coupled to another electronic device 484, either directly (e.g., by Ethernet cable, Bluetooth, WiFi, cellular radio, etc.), by way of a larger communications framework 490 (e.g., Internet, cloud computing, cellular network, satellite link, etc.), or combinations thereof. In an aspect, communicative coupling between AEC 480 and electronic device 484 can facilitate communication between components of AEC member devices (e.g., device 460 to 462) and electronic device 484. In a further aspect, communicative coupling between AEC 480 and electronic device 484 can facilitate communication between the ESLB of AEC 480 (not specifically illustrated) and electronic device 484. In related aspect, the devices (e.g., device 460 to 462) of AEC 480 can be communicatively coupled to electronic device 484 without a communicative pathway being specifically designated between AEC 480 and the electronic device 484. These inter-device communicative couplings can similarly be direct or through a communications framework (e.g., communications framework 490).

In a further aspect, several hops between AECs, electronic device(s), communications frameworks, or combinations thereof, can be employed to communicatively couple an AEC with another AEC and/or electronic device. For example, AEC 480 can be communicatively coupled to ACE 482 by establishing communication through communications framework 490 to electronic device 484 and from electronic device 484 to AEC 482. As a non-limiting example, this can, at least in part, be embodied in a Geocast environment (or other MANET environment). As other non-limiting examples, this aspect a can be embodied by a peer-to-peer network, satellite linking, linking through a radio controller in a cellular network, cloud computing structures, the Internet, etc., or combinations thereof.

One of skill in the art will appreciate that, in general, the communicative coupling aspects disclosed with respect to system 400 (and other illustrated systems and methods) function in a nearly seamless manner with existing and anticipated communications technologies. As such, system 400 illustrates that AECs, members of AECs, components of AEC members, and conventional electronic devices and communication frameworks can be interconnected with a nearly limitless number of communication modalities. All such modalities and interconnections, as explicitly described herein or not, are considered within the scope of the subject disclosure.

In accordance with aspects of the subject disclosure, device 460 can comprise application 440. Application 440 can execute on device 460 by way of executing in a RTE 450 running on OS 470 by way of AEE component 410. As such, application 440 can be communicatively coupled to RTE 450 and RTE 450 can be communicatively coupled to OS 470 by way of AEE component 410, as illustrated (this can be the same as, or similar to, system 100). In another aspect, not illustrated, application 440 can run in the native OS 470 by way of AEE component 410 (similar to, or the same as system 100). Additionally, application 440 can be communicatively coupled to RTE 450, OS 740, or both without passing through AEE component 410, not illustrated (similar to, or the same as in system 100).

In an embodiment where application 440 executes in RTE 450 through AEE component 110 on OS 470, AEE component 110 can interact with application 440 through RTE 450 and AEE component can interact with OS 470 in a manner similar to that disclosed elsewhere herein (e.g., generate signals, interrupt signals, etc.). In an aspect, AEE component 410 can cause signals from RTE 450 to be routed to OS 472 across AEC 480. Similarly, signals from OS 472 can be routed to application 440 (through RTE 450) across AEC 480. This can allow cluster processing of code associated with an application on any particular device of a cluster on other devices of the cluster. For example, complex calculations for an application on a device with limited processing power can be parsed out to other processors on other devices in the AEC. Moreover, AEE component 410 and AEE component 412 can facilitate translation, allowing instructions between an application and a native OS to be converted to instructions for a target OS on another AEC device, where devices in the cluster do not necessarily operate traditionally compatible OS environments. In a related aspect, the translation can be effected by spawning emulators on a target device (e.g., so that the target device emulates an OS compatible with the untranslated instructions) and passing the untranslated instructions therethrough such that the code executes on the target OS (i.e., in the emulator). One of skill in the art will immediately appreciate that there are numerous techniques for signal processing to generate appropriate instructions for a target device within an AEC and that all such techniques are within the scope of the subject disclosure. As such, the AEC can be OS-agnostic.

In a similar aspect, device 462 can include a plurality of applications 1 to R (442 to 444) that can interact directly or through RTEs 1 to R (452 to 454) with a native OS 472 by way of AEE component 412. Agnostic behavior, such as that implemented for OS-agnosticism across a plurality of devices in an AEE can be similarly implemented for the applications (442 to 444) and RTEs (452 to 454) within a device or across a plurality of devices in an AEE. As such, an application 442 traditionally siloed to RTE 452 can interact with application 444 traditionally siloed to RTE 454 by way of AEE component 412. Moreover, applications on device 462 can In a similar aspect, device 462 can include a plurality of applications 1 to R (442 to 444) that can interact directly or through RTEs 1 to R (452 to 454) with a native OS 472 by way of AEE component 412. Agnostic behavior, such as that implemented for OS-agnosticism across a plurality of devices in an AEE can be similarly implemented for the applications (442 to 444) and RTEs (452 to 454) within a device or across a plurality of devices in an AEE. As such, an application 442 traditionally siloed to RTE 452 can interact with application 444 traditionally siloed to RTE 454 by way of AEE component 412. Moreover, applications on device 462 can interact with applications on device 460 across AEC 480, also despite being siloed in a particular RTE. As such, the AEC can be RTE agnostic and application agnostic. For example, a graphing calculator application written in JAVA can compute the plot of a function, pass that information, in JAVA, to a display application written in FLASH, by way of AEE component, such that the plot is displayed in FLASH. In an extension of this example, where the computation is complex, the processing can be offloaded from a first device to a second device of the AEC, wherein the results can be accessed by the FLASH display application of the first device for display on the first device, illustrating both agnosticism and cluster behavior. Thus, an agnostic cluster can leverage the best or most applicable features of any device(s) of an AEC and can also access the best or most applicable functionality of any affiliated RTEs and/or programs of an AEE (e.g., an affiliated RTE can include development tools to access AEE services abstracted at the SPI layer).

Agnostic behavior can be effected by numerous techniques, all of which are considered within the scope of the present disclosure. As an example, an AEE component can spawn middleware-type components to translate instructions between process and/or OS environments. In another example, AEE components can include middleware components to translate directly. An additional technique can be to create services that that can be programmatically accessed through various RTEs, for example, to store data in a common data format or syntax, etc. As stated previously, the SPI layer can be implemented with sockets/ports to services, shared code libraries, block memory writing, etc., or combinations thereof. As such, the SPI layer can serve to facilitate agnostic behavior within an AEC. For example, a software developer can call on a service of the SPI layer (e.g., SPI component 420 or 422) by including the service (e.g., access provided for in the RTE development environment used to develop the application) into an application executing in an affiliated RTE (see also FIG. 14). The service software can reside in an SPI module of the SPI layer and can be considered independent of the application or the related RTE silo (e.g., differentiating the SPI from a more traditional API). Thus, this same service can just as easily be called agnostically from a different application siloed in a separate affiliated RTE. The exemplary service software in the example, can be the same as, or similar to, an SPI module 250 to 254 of system 200. One of skill in the art will appreciate that numerous other techniques for effecting agnostic behavior can be employed efficaciously and that all such techniques are considered within the scope of the present disclosure.

Figure 5:
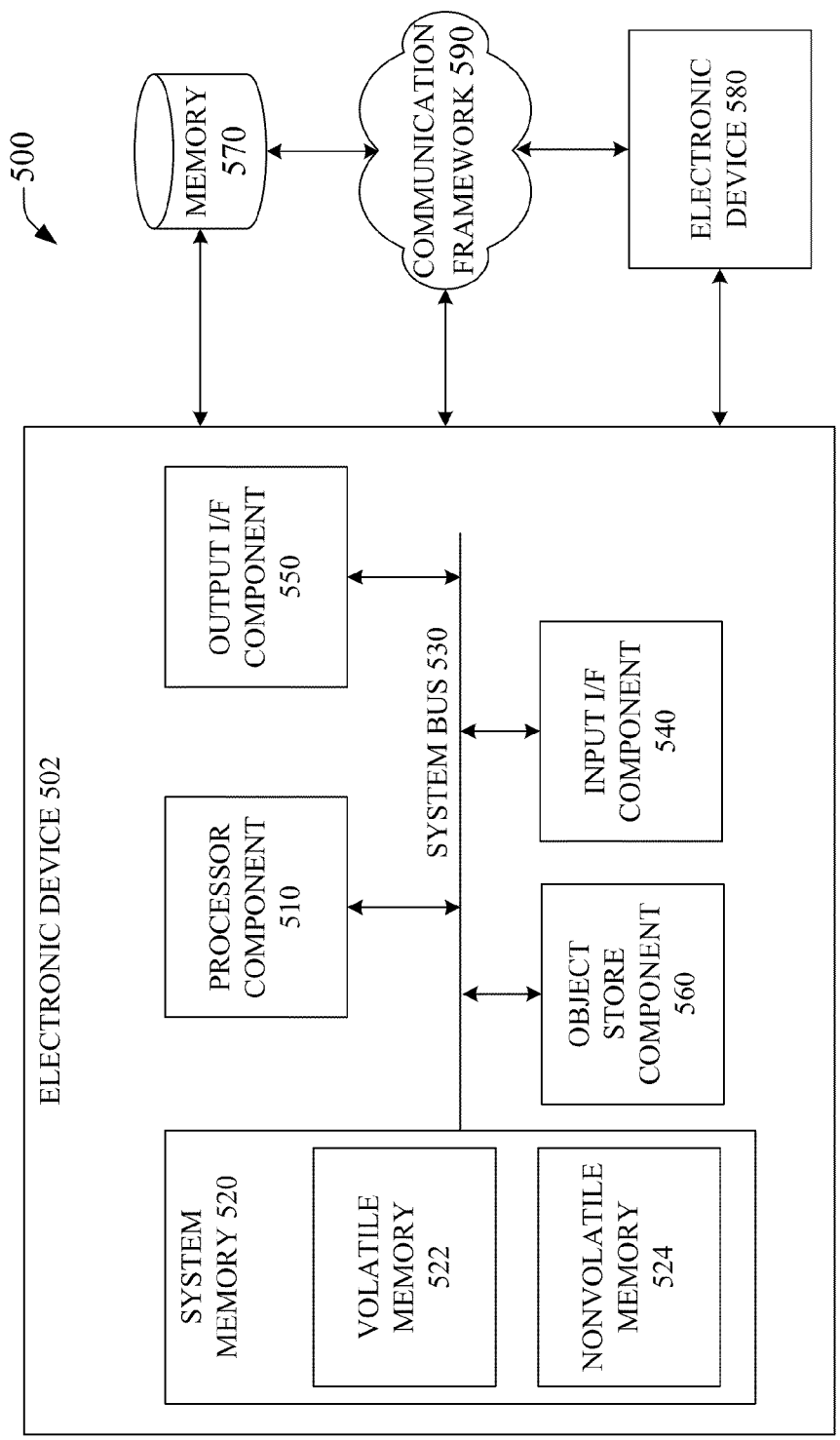
FIG. 5 illustrates a system employing persistent memory in accordance with the disclosed subject matter.

FIG. 5 illustrates system 500 employing persistent memory in accordance with the disclosed subject matter. System 500 can include electronic device 502 which can be the same as, or similar to, device 1 to M (350 to 354) of system 300, or device 1 to M (460 to 462) of system 400. Electronic device 502 can include processor component 510 and system memory 520. System memory 520 can include volatile memory 522 and/or nonvolatile memory 524. System memory 520 and processor component 530 can be communicatively coupled over system bus 530. System memory 520 and processor component 530 can further be communicatively coupled to input interface component 540, output interface component 550, object store component 560, or combinations thereof, over system bus 530.

Electronic device 502 can be communicatively coupled to remote memory (or other storage) 570, either directly or by way of communications framework 590. Electronic device 502 can also be communicatively coupled to electronic device 580, either directly or by way of communications framework 590. It will also be appreciated by those in the art that many alternate connections between some or all of the illustrated components of system 500 can be selected without departing from the scope of the subject disclosure; for example, object store component 560 can be directly coupled to system memory 520 rather than sharing system bus 530. Further, those in the art will appreciate that alternative organizations of some or all of the illustrated components, and/or the inclusion of more or fewer components also does not depart from the scope of the present disclosed subject matter. As illustrative non-limiting examples, object store 560 can itself further include separate memory components, electronic device 502 can include a plurality of processor components 510, object store component 560 can be external to electronic device 502 (e.g., being a distributed component, residing on a cloud service, etc.), a privacy component can be included in electronic device 502, etc.

In an aspect, object store component 560 can be the same as, or similar to, object store component 260 of system 200. Object store component 560 can facilitate persistent storage. Further, object store component 560 can include security features, privacy features, encryption features, or combinations thereof, to protect and safeguard stored information. For example, object store component 560 can include a firewall and can be encrypted. In an embodiment in accord with the disclosed subject matter, object store component 560 can include pointers to memory locations that are local or remote to facilitate persistent storage of information. One of skill in that art will appreciate that alternative identifiers other than pointers can be employed to facilitate access to stored information without departing from the scope of the disclosed subject matter (e.g., physical or logical memory addresses, tables, etc.) Further, object store component 560 can include the physical memory storing information. In an aspect, object store component 560 can facilitate memory persistence and access to information across communicative couplings. As such, object store component 560 can further include decision making components (not illustrated) to aid in persisting data. For example, object store component 560 can include a table of frequently accessed information. This table can be employed in synchronizing a replica of the frequently accessed data on, for example, local system memory 520 in addition to remote memory 570. This replica can, for example, facilitate more rapid access to the information on a consistent basis or, where the communicative coupling to memory 570 is severed, can provide access to the information as current as when the last synchronizing event occurred. The exemplary synchronizing of replica data can include other features, such as data collision resolution, transport security, etc. One of skill in the art will appreciate that numerous other examples of components for effectively managing persistent data are possible and that all such examples would be within the scope of the present disclosure.

In some embodiments, such as those wherein electronic devices 502 is part of an AEC, object store component 560 can facilitate AEC persistent storage. AEC persistent storage can include persistent storage within the AEC (e.g., the cumulative memory of devices comprising the AEC can be managed by one or more object store components 560 of the devices in the AEC), persistent data without the AEC (e.g., other AECs, cloud memory, remote memory, etc.), or combinations thereof. As non-limiting examples, in an AEC with a plurality of electronic devices 502, object store components 560 can act cooperatively to manage persistent data among the devices of the AEC by, for example, designating a first subset of object store components 560 to manage persistent storage within and across the AEC; designating a second subset of object store components 560 to manage persistent data between the AEC an external or distributed devices or systems; putting other object store components 560 into, for example, an observation only mode; etc.; or combinations thereof. Those of skill in the art will appreciate that many persistent memory systems and methods are foreseeable in accord with AEEs and that all such persistent memory systems and methods are within the scope of the present disclosure.

Figure 6:
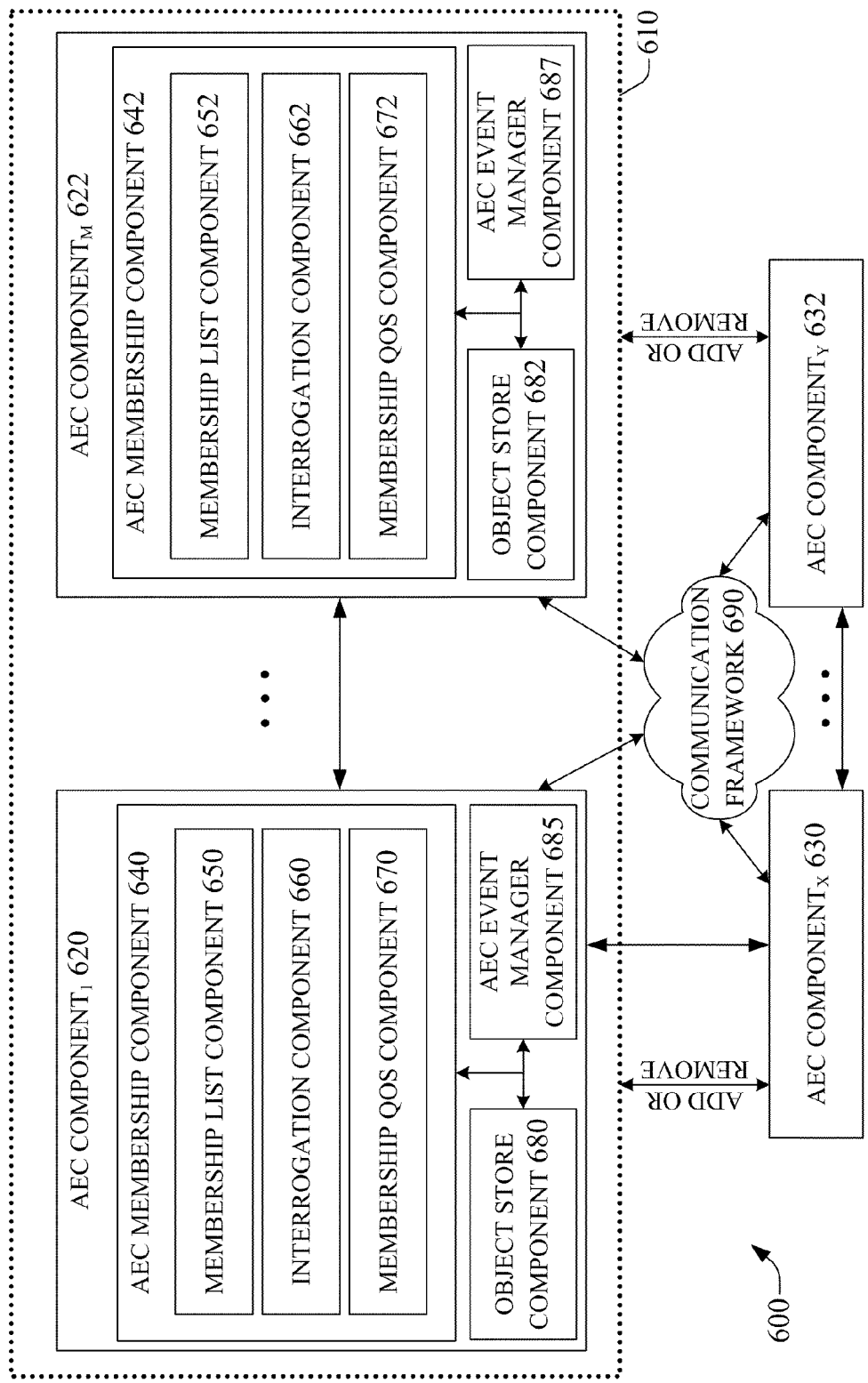
FIG. 6 is a diagram of a system comprising an embodiment of an agnostic execution cluster membership component in accordance with aspects of the subject disclosure.

FIG. 6 depicts a system 600 comprising an embodiment of an AEC membership component 640 in accordance with aspects of the subject disclosure. System 600 can include AEC 610, which can include 1 to M AEC components 620 to 622. System 600 can also include X to Y AEC components 630 to 632. AEC components 620 to 622 and/or AEC components 630 to 632 can be the same as, or similar to, AEC component 230 of system 200, AEC components 330 to 334 of system 300, AEC components 430 to 432 of system 400, or combinations thereof. In an aspect, one or more of AEC components 630 to 632 can be added to AEC 610 (as illustrated schematically by the "add" arrow in FIG. 6). In a further aspect, one or more of AEC components 620 to 622 can withdraw from AEC 610 (as illustrated schematically by the "remove" arrow in FIG. 6).

Subsets of AEC components 620 to 622 and 630 to 632 can be communicatively coupled. These subsets can comprise some, none, or all of the various AEC components of system 600. For example, AEC components 620 to 622 can be communicatively coupled. As another example, the subset of AEC components 620 to 622 can be communicatively coupled and the subset of AEC components 630 to 632 can be communicatively coupled but with no communicative coupling between the two subsets. As a third example, AEC components 620 to 622 and 630 can be communicatively coupled. These communicative couplings can be direct couplings, couplings across a communications framework 690, couplings by daisy chaining, etc. For example, a first AEC component 620 can be communicatively coupled to a second AEC component 632 by way of an electronic device (not illustrated) with or without an AEC component, such as in a MANET or peer-to-peer environment with a mix of AEE-enabled devices and legacy devices.

AEC components 1 to M (620 to 622) of AEC 610 can each include an AEC membership component (640 to 642). AEC membership components 640 to 642 can each include membership list component 650 to 652; interrogation component 660 to 662; membership QOS component 670 to 672; or combinations thereof. AEC membership components 640 to 642 can each further include object store component 680 to 682, AEC event manager component 685 to 687, or combinations thereof. In an aspect, object store components 680 to 682 can each be the same as, or similar to, object store component 260 of system 200, object store component 560 of system 500, or combinations thereof. The AEC membership component (e.g., 640 to 642), object store component (e.g., 680 to 682), and AEC event manage component (e.g., 685 to 687) of an AEC component (e.g., 620 to 622, 630 to 632, etc.) can be communicatively coupled.

In an aspect, membership list component 650 can facilitate identification of which AECs a particular AEC component may be a member of; facilitate identification of which AEC components are members of a particular AEC; facilitate identification of AEC components seeking admission to and/or removal from an AEC (e.g., by addition to or removal from AEC 610 as illustrated); or combinations thereof. For example, AEC membership component 640 can identify that AEC components 620 to 622 are, for example, members of AEC 610; that AEC component 630, for example, seeks admission to AEC 610 (e.g., addition to AEC 610 as illustrated); that AEC component 632, for example, seeks removal from AEC 610 (e.g., removal from AEC 610 as illustrated); etc. In a further aspect, AEC membership components (640 to 642) can each embody features that are the same as, similar to, or are associated with a Layer 7 to Layer 3 application switch (for example, a Big-IP appliance from F5 Networks, Inc.), to facilitate, for example, a many-to-1 service mapping or access environment (e.g., many AEC components can be switched to access a single service of the AEC). It will be appreciated that information related to membership, prospective membership, or removal from an AEC can be leveraged in other aspects related to an AEC, for example, determining what AEC resources are available, determining what communicative resources are available to an AEC through member devices, etc. All such leveraged features are considered within the scope of the subject disclosure whether or not specifically enumerated herein.

Interrogation component 660 can provide for system aspects related to determining information relative to an AEC or member (current or prospective) of an AEC. Interrogation component 660 can interrogate an AEC or make available information related to the interrogation of an AEC; for example, interrogation component 660 can initiate an interrogation of a member and/or component of AEC 610. In a related example, interrogation component 660 can initiate an interrogation of AEC 610 and all related devices. Further, for example, interrogation component 660 can allow access to interrogation information related to the identification of the 1 to M AEC components 620 to 622, access to information related to the number of AEC components (e.g., "M") in AEC 610, access to information related to hardware and software capabilities of the devices compromising the AEC components of the AEC, etc. Further, interrogation component 660 can allow for self-interrogation of devices of AECs, or of all or part of an AEC. One of skill in the art will appreciate that nearly any device hardware or software information, cluster information, AEC services information, port information, shared library information, shared/block memory information, communicative pathway information, bearer path information, historical information, user preference information, or combinations thereof can be collected and made accessible by way of interrogation component 660 and that all such information is within the scope of the subject disclosure.

Membership QOS component 670 can provide systems and methods related to forming determinations about quality and/or level of service relative to AECs. In an aspect, the QOS (quality of service) and/or LOS (level of service) determinations can be made across an AEC, within an AEC, between AECs, between devices of AECs, between AECs or their devices and non-AEC components, or combinations thereof. QOS and/or LOS determinations can be related to various performance metrics and can, for example, include processing efficiency, memory efficiency, latency, jitter, throughput, data priority, or any of numerous other performance metrics pertinent to the AEC or membership (present or prospective) thereof. For example, membership QOS component 670 can determine that, for example, a 1000 Mb/sec Ethernet connection and a Bluetooth connection is present between a first AEC member and a second AEC member, that the Ethernet connection is only 1% committed, the Bluetooth is unused, that historically the Ethernet connection is up 99.99% of the time and the Bluetooth connection is up 92% of the time, and that the transfer of video content between a hard drive on the first AEC member and a display on the second AEC member is thus best accomplished over the Ethernet connection. One of skill in the art will further appreciate that many such types of determinations and information can be made or accessed and that all such QOS and/or LOS determinations and information are within the scope of the disclosed subject matter. For example, multiplexing and/or bonding across network connections, parallel processing of code segments among processors in the AEC, scheduling of high demand tasks or information transfers, battery life improvements, or other numerous examples, can be facilitated by membership QOS component 670.

One of ordinary skill in the art will acknowledge that AEC membership component 640 can include more or fewer components than illustrated herein without departing from the scope of the disclosed subject matter. These components can include components associated with management of a network of devices forming one or more AECs. For example, one or more conflict resolution components, priority determination components, collision resolving components, replica management components, AEC controller components, etc., can be included as part of AEC membership component 640. In other examples, privacy components, security components, preference components, or the like can be included. It will be appreciated that these and other components can also be located in other disclosed components or as one or more separate components to facilitate the aspects disclosed herein. Further, some or all of the components of AEC membership component 640 disclosed herein can be embodied external to the AEC membership component without departing from the scope of the subject disclosure. For example, membership QOS component 672 can be embodied within, object store component 680 or communication framework 690. Further, features of existing technologies can be adapted to facilitate certain complementary aspects of cluster management, for example, features from BAYOU (a project from XEROX PARC in the mid-1990s, see, http://www2.parc.com/csl/projects/bayou/), Jini (see Jini.org), etc.

Figure 7:
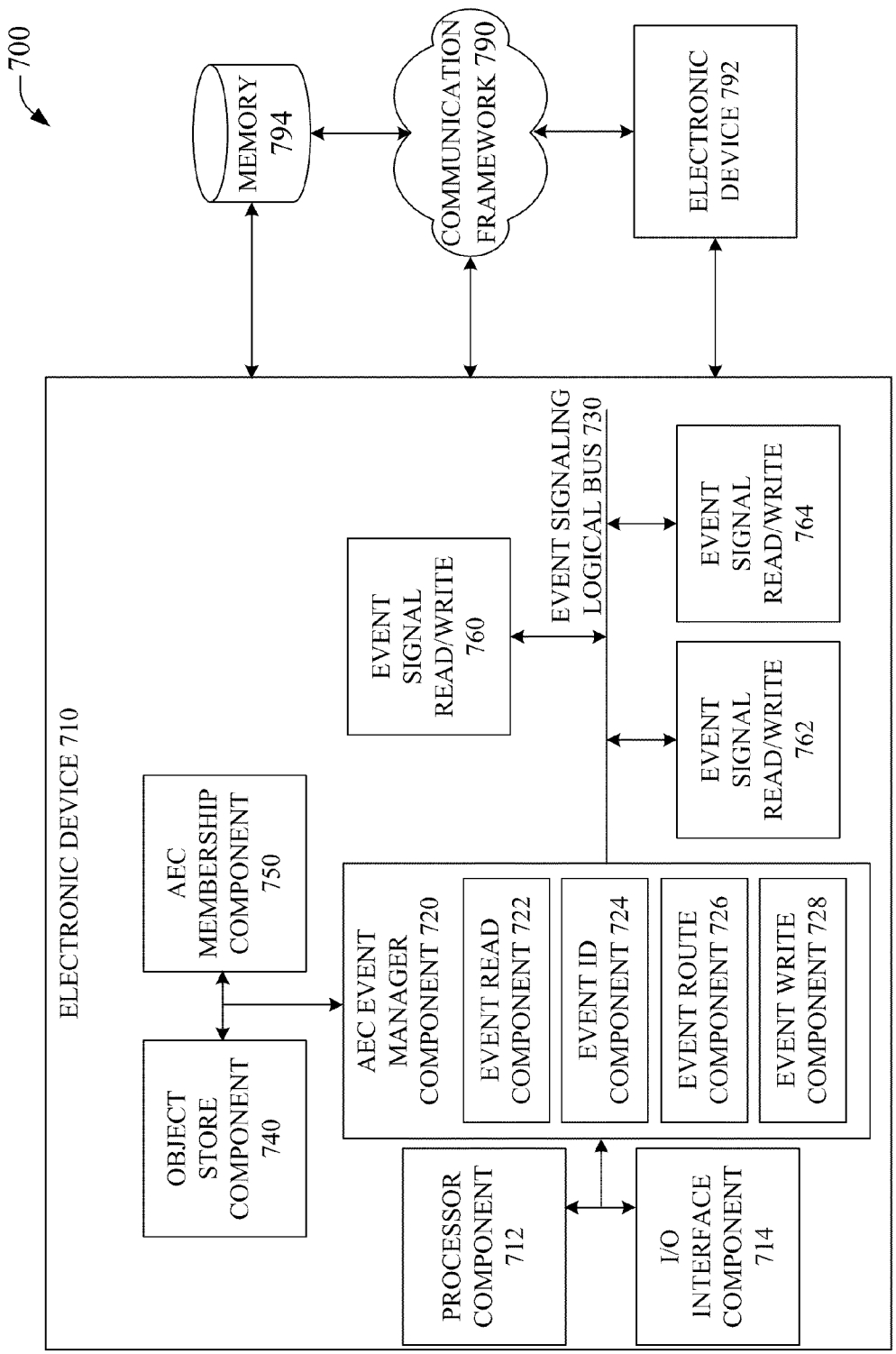
FIG. 7 illustrates a system comprising an embodiment of an agnostic execution cluster event manager component in accordance with aspects of the subject disclosure.

FIG. 7 illustrates aspects of event management in a system 700 in accordance with aspects of the subject disclosure. System 700 can include electronic device 710 which can be the same as, or similar to, devices 350 to 354 of system 300, devices 460 to 462 of system 400, device 502 of system 500, or combinations thereof. Electronic device 710 can include processor component 712, which can be the same as, or similar to, processor component 510 of system 500. Electronic device 710 can further include input/output interface component 714, which can be the same as, or similar to, output interface component 550 and/or input interface component 540 of system 500. Processor component 712 and input/output interface component 714 can be communicatively coupled to each other and to AEC event manager component 720.

Electronic device 710 can comprise object store component 740, which can be the same as, or similar to, object store component 260 of system 200, object store component 560 of system 500, object store components 680 to 682 of system 600, or combinations thereof. Similarly, electronic device 710 can include AEC membership component 750, which can be the same as, or similar to, AEC membership component 270 of system 200, AEC membership components 685 to 687 of system 600, or combinations thereof. Object store component 740 and AEC membership component 750 can be communicatively coupled to each other and to AEC event manager component 720.

Electronic device 710 can further comprise an event signaling logical bus (ESLB) 730. As described hereinabove, an ESLB can comprise one or more listening components, one or more announcing components, communicative pathways therebetween, or combinations thereof, to facilitate logical bus behavior across an AEC. In accordance with aspects of the subject disclosure, ESLB 730 can be communicatively coupled to AEC event manager component 720. Further, system 700 events, for example, those within electronic device 710, can be associated with event signal read/write (ESRW) 760, 762 or 764. ESRW 760 to 764 can be communicatively coupled to the ESLB 730. Electronic device 710 can additionally be communicatively coupled to an external electronic device 792, external memory 794, or combinations thereof, either directly or by communication framework 790 in a manner similar to that previously disclosed herein with regard to communications framework 490 or direct communications of system 400, communications framework 590 or direct communications of system 500, or communications framework 690 or direct communications of system 600.

AEC event manager component 720 can include event read component 722, event ID component 724, event route component 726, event write component 728, or combinations thereof. Event read component 722 can facilitate reading an event from ESLB 730 (e.g., by way of ESRW 760 to 764). Event write component 728 can facilitate writing an event to ESLB 730 (e.g., for access by way of ESRW 760 to 764). One of skill in the art will appreciate that an ESRW can be a component for reading/writing events to the ESLB 730. In an aspect, ESRW components can be exceedingly simple and can simply represent an act of reading/writing datum to the ESLB 730. However, the ESRW components can also be more highly evolved to add functionality to the reading/writing of datum to the ESLB 730. As non-limiting examples of more evolved ESRW features, error checking can be included, virus scanning can be instituted, the ESRW payload can be interrogated, data priority can be evaluated, etc. One of skill in the art will appreciate that numerous interactions with data read/written to the ESLB can be effected by way of ESRW components and that all such permutations are within the scope of the present subject matter. In an embodiment, an event can include an identifier portion and a payload portion such that an ESRW (e.g., 760 to 764) can read/write the identifier and payload to an ESLB (e.g., ESLB 730). Similarly, AEC event manager component 720 can interact with ESLB 730 to read/write events comprising an identifier and payload portion. More complicated event data structures are well within the scope of the subject disclosure, as will be appreciated by one of basic skill in the art.

Event ID component 724 can facilitate forming determinations related to an identifier portion of an event read from or written to an ESLB 730. In an aspect, ID component 724 can access and/or generate an ID portion (e.g., an identifier portion, identity portion, identification portion, etc.) related to a payload portion of an event to be read and/or written to/from ESLB 730. The ID portion can be a predetermined size or dynamically sized identifier (e.g., a fixed number of bits, a sequence of bits with a terminus designated by a specific bit code, a variable length bit sequence starting with a length indicator sequence, etc.) As non-limiting examples, the ID portion can be a 16-bit sequence, a 32-bit sequence, a 48-bit sequence, etc.

In an aspect, the ID portion can identify characteristics of the respective event. These event characteristics can relate to the contents of the payload portion, to the size of the payload portion, to the routing of the event payload, to the prospective audience of the event (e.g., what services, devices, applications, etc. should "listen" for the event), to the priority of the event, to the security of the event (e.g., virus checked, Q-bit status, etc.), or other characteristic of an event. One of skill in the art will appreciate that an identifier portion of an event can contain significant relevant information relating to the characteristics of the event (e.g., the event itself and/or to the payload of the event) and that all such content is within the scope of the disclosed subject matter. As a non-limiting example, an event can have an identifier portion and a payload portion, wherein the identifier portion indicates that the payload is, for example, 512-bytes, has been checked for viruses, and is intended for devices in an AEC with video display components. As a second non-limiting example, an event can have an identifier portion and payload portion, the identifier portion identifying that the event relates to sensitive banking information, that the payload portion has not been interrogated, and that the total event size (e.g., the identifier portion and the payload portion) is, for example, 124 bits.

Various embodiments of the subject disclosure can employ the identified characteristics to facilitate processing and/or routing of the event within an AEC, with devices outside an AEC, with other AEC, or the like. In an aspect, event route component 726 can facilitate routing of events and/or event payload portions based at least in part on identifier characteristics (e.g., accessed by way of event ID component 724). For example, where an event is identified as relating to secure banking information, event route component 726 can direct AEC event manager 720 to read the event from ESLB 730, the payload can be encrypted by processor 712, the payload can then be transmitted by way of a secure protocol (e.g., by way of I/O interface component 714) to a banking system computer (e.g., electronic device 792 by way of communications framework 790). As a second example, where an event on ESLB 730 is identified with an MP3 payload, the event can be routed by event route component 726 to AEC MP3 capable devices (not illustrated) by way of ESLB 730, which devices can, for example, access the MP3 payload from ESLB 730 (e.g., by way of event signal read/write 760 to 764) to play or store the MP3 content. In a third example, where an event on ESLB 730 is identified as a real time voice communication (e.g., a telephone call), it can be identified as being intended for communications devices within an AEC such that event ID component 724 for a cell phone in the AEC can identify the payload and facilitate accessing the content on the ESLB 730 (e.g., passing the voice payload to processor component 712 from ESLB 730 through AEC event manager component 720). Where a device of the AEC is not a voice communications-capable device, event ID component 724 can indicate that it is inappropriate to access the voice communications event.

It will be appreciated by one of skill in the art that where the ESLB is a logical bus, a plurality of AEC event managers 720 (e.g., the AEC event managers 720 from a plurality of devices of an AEC) can contemporaneously access one or more events on ESLB 730. An ESLB can include aspects that are the same as, or similar to, a publication-subscriber schema (e.g., pub/sub techniques). For example, where there are two voice capable devices in an AEC, an event identified as a voice communication can be simultaneously accessed by both devices, for example, causing both devices to ring in response to an incoming call. In this example, it is noteworthy that the call can be directed to only one of the devices and that the AEC event manager of the target device can cause the incoming call to be written as an event to the ESLB such that the call can ring at any appropriate device of the AEC, be routed to a voicemail system, etc. Further, in this particular example, it will be appreciated that the incoming call can be answered at a device other than the target device (e.g., the incoming call can pass through a target device to the answering device by way of the ESLB), and in response, AEC event manager component 720 can initiate a process to transfer the connection to the answering device. For example, where a call is targeted to a cell phone and passed to an AEC PC with VoIP capabilities, the cellular network can be notified that the call should be transferred (seamlessly) to the VoIP device that answered the call to reduce the loading of the cellular network. As another example of contemporaneous event access, documents and spreadsheets can be jointly edited by a plurality of users (e.g., data collision features can also be implemented) with or without a single master copy stored in a single device. As a further example of contemporaneous access, as a user watching time-shifted streaming video (e.g., previously recorded content) on a mobile handset enters her living room, the TV there can begin streaming the same video content queued to the same time-shift and the mobile handset can morph from a video player to a TV remote control device. These and all other examples of contemporaneous access to an ESLB by devices of an AEC are considered directly within the scope of the presently disclosed subject matter, as will certainly be appreciated by one of ordinary skill in the art.

Figure 8:
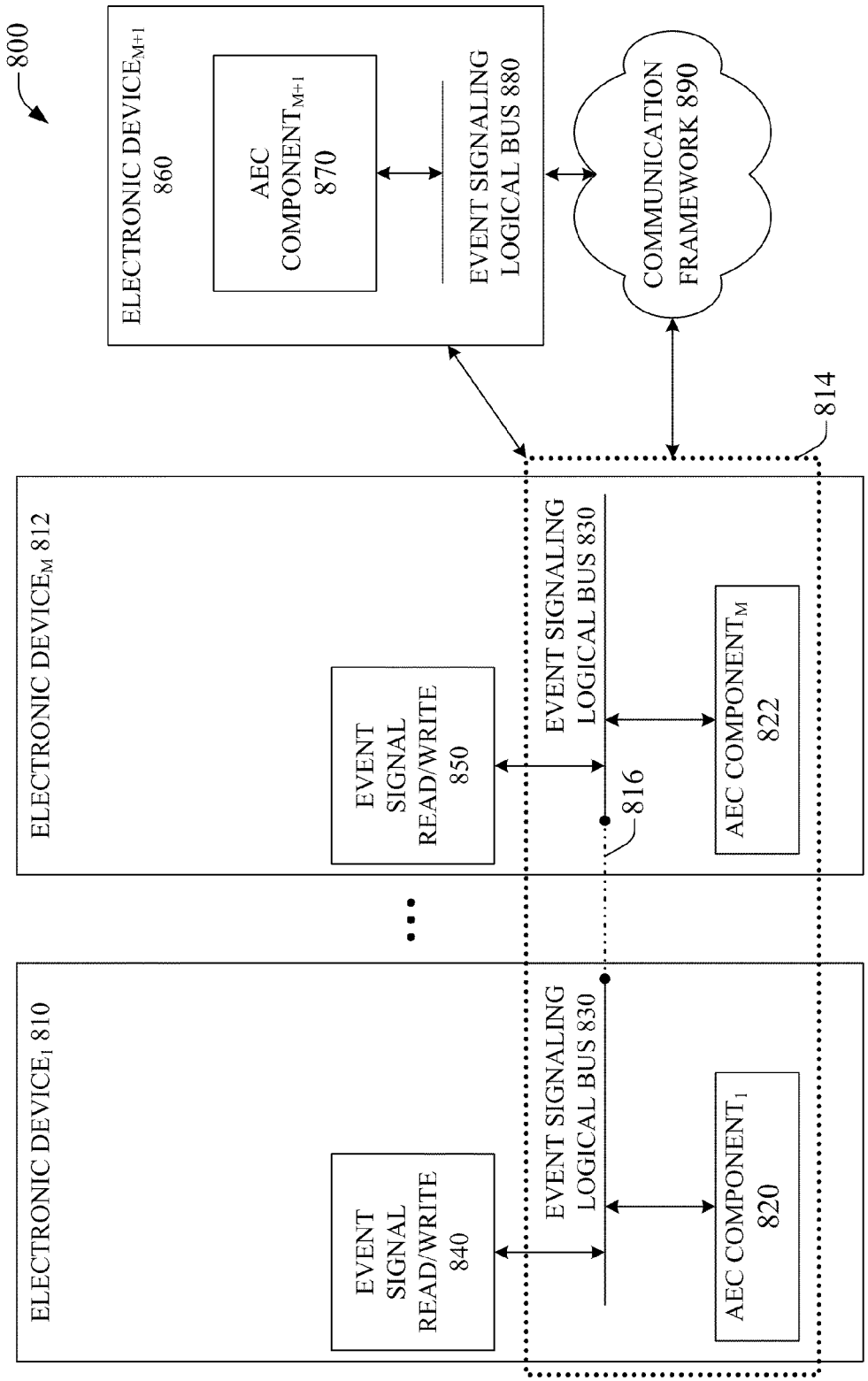
FIG. 8 is a diagram depicting a system employing logical buses in accordance with aspects of the subject disclosure.

FIG. 8 is a diagram depicting a system 800 employing logical buses in accordance with aspects of the subject disclosure. System 800 can comprise 1 to M+1 electronic devices 810 to 812 and 860. Electronic devices 1 to M (810 to 812) can be part of AEC 814. Electronic device M+1 (860) can be communicatively coupled to AEC 814, either directly or by way of communications framework 890. Communications framework 890 can be the same as, or similar to, communications framework 490 of system 400, communications framework 590 of system 500, communications framework 690 of system 600, communications framework 790 of system 700. Each of the 1 to M+1 electronic devices 810 to 812 and 860 can comprise an AEC component 1 to M+1 (820 to 822 and 870). In an aspect, AEC components can facilitate forming an AEC, for example, AEC components 1 to M (820 to 822) can facilitate forming AEC 814.

In an embodiment in accord with the disclosed subject matter, AEC 814 can comprise an ESLB 830, which can be shared among the devices of the cluster (e.g., electronic devices 1 to M (810 to 812)). In an aspect, the portions of ESLB 830 in each AEC device can be communicatively coupled by a communications path 816 (indicated by the dot-dot-dash line joining ESLB 830 in electronic device 1 (810) with ESLB 830 in electronic device M (812)) and communications path 816 can be, for example, considered to be part of ESLB 830. Wherein an ESLB is a logical bus that can be effected, at least in part, by native hardware in each separate device, it is not intended that all portions of ESLB 830 are physically identical; rather, ESLB 830 can be continuous across the member devices of an AEC 814 by way of the communicative links 816 between member devices of AEC 814. It will further be appreciated that a communicative path 816 can include daisy chaining through other devices; for example, where there are three electronic devices (e.g., device A, B and C), device A can be linked to device B which can be linked to device C, and as such, device A can be considered linked to device C through device B without needing a separate communications path between device A and C. It will further be appreciated that device B can be, but need not be, AEC-enabled (e.g., can, but need not, comprise an AEC component).

Wherein ESLB 830 is accessible across the electronic devices (e.g., electronic devices 810 to 812) of AEC 814, events can be written/read to/from the ESLB contemporaneously. For example, an event on ESLB 830 can be read at each of the 1 to M electronic devices 810 to 812 contemporaneously (e.g., by way of ESRW 840 in electronic device 1 (810) and by way of ESRW 850 in electronic device M (812)). Similarly, for example, where ESRW 840 writes an event to ESLB 830, AEC component 1 (820) and AEC component M (822) can contemporaneously access the event on the ESLB 830.

It is anticipated that latency can occur on ESLB 830 and/or across communications path(s) 816 within an AEC (e.g., where AEC members are physically distant, have limited bandwidth communications pathways, uni-directional communications systems, require a plurality of hops between portions of an ESLB, etc.) and embodiments of ESLB 830 can be adapted to address such latency with the intent of the logical bus allowing access to the ESLB events contemporaneously. For example, time stamps, prioritization of ESLB traffic, employing a centralized event queue, severing of overly latent devices from an AEC (dynamic reduction of an AEC membership), adding additional devices to an AEC to construct faster communications paths (dynamic expansion of an AEC membership), or many other methods can be employed to keep the ESLB acting like a "bus". All such techniques are considered within the scope of the subject disclosure, as will be appreciated by one of ordinary skill in the art. Further, it is expected that dedicated ESLB hardware components can be incorporated in future devices to improve ESLB performance across a plurality of devices in an AEC, for example, a dedicated high-speed communications link. It is further envisioned that imposition of ESLB latency classes can be effected to stratify ESLB access between devices. As such, devices burdened with high latency can be relegated to a "slow ESLB" status and related devices can access the ESLB at a slower interval as compared to a "fast ESLB" status family of devices that have low latency. For example, devices interconnected by gigabit Ethernet connections can be classed as "fast ESLB" (e.g., PCs in a gigabit LAN) while devices that employ IR transmission of data can be classed as "slow ESLB" (e.g., legacy PDA devices).

In an aspect, ESLB 830 can be contrasted with ESLB 880 in system 800. ESLB 830, as discussed at length, can be shared among the members of AEC 814, while ESLB 880 can be local to electronic device 860 only. As such, ESLB 870 can be considered to be shared in a single member AEC (not illustrated) comprising only AEC component M+1 (870) of electronic device M+1 (860). In an aspect, an AEC can comprise one or more AEC-enabled devices, a single AEC-enabled device can be a member of one or more AECs (e.g., a single AEC-enabled device can be a member of a "Personal AEC" and a "Work AEC" simultaneously while keeping the two AECs distinct and separate, etc.). In an aspect, communication between AEC 814 (or the members thereof) and ESLB 880 can be effected without dynamic expansion of AEC 814 membership. That is, AEC 814 and the AEC associated with ESLB 880 need not merge merely because there is intercommunication therebetween. In another aspect, dynamic expansion of AEC 814 membership can be initiated such that ESLB 880 merges with ESLB 830 and the resulting ESLB is shared across the 1 to M+1 electronic devices 810 to 860 within resulting AEC 814 (e.g., AEC 814 now includes electronic device M+1 (860) as a member). AEC 814 can then divest itself of electronic device M+1 (860) in a dynamic manner. As such, business logic can be applied to determining the most efficacious intercommunications schema (e.g., separate intercommunicating AECs, transitory merging of AECs (with inherent intercommunication paths), goal driven merging of AECs (with inherent intercommunication paths), event driven merging of AECs (with inherent intercommunication paths), predetermined-term merging of AECs (with inherent intercommunication paths), etc.).

One of skill in the art will appreciate that sharing an ESLB among members of AEC, communicating between a plurality of AEC, communicating between AEC and non-AEC devices, or combinations thereof, can provide for distributing many aspects of modern computing in a novel manner throughout dynamically adapted clusters of devices that can be agnostic to OS and/or to affiliated RTEs. One of skill in the art will further appreciate that numerous permutation of the disclosed subject matter are possible and that all such permutations or configurations are considered within the scope of the present disclosure even where not explicitly recited for brevity and succinct disclosure.

Various aspects of the subject disclosure can be automated through artificial intelligence (AI) methods to form suitable inferences (e.g., reason and draw a conclusion based upon a set of metrics, arguments, or known outcomes in controlled scenarios). As non-limiting examples, a suitable inference can relate to dynamically adapting the membership of an AEC; inferring an best routing of an event on an ESLB; selecting a most efficient distribution of computation tasks across an AEC; forming a set of criteria relating historical usage with best practices for persisting data in dynamic AEC membership pools; or the like. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., the collected AEC membership criteria in the case of dynamic AEC membership conditions. In particular, one of numerous methodologies can be employed for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation also can be utilized. In addition, linear classifiers, such as support vector machines (SVMs), non-linear classifiers like methods referred to as "neural network" methodologies, or fuzzy logic methodologies also can be employed, alone or in combination.

In view of the example system(s) described above, example method(s) that can be implemented in accordance with the disclosed subject matter can be better appreciated with reference to flowcharts in FIG. 9-FIG. 12. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 9:
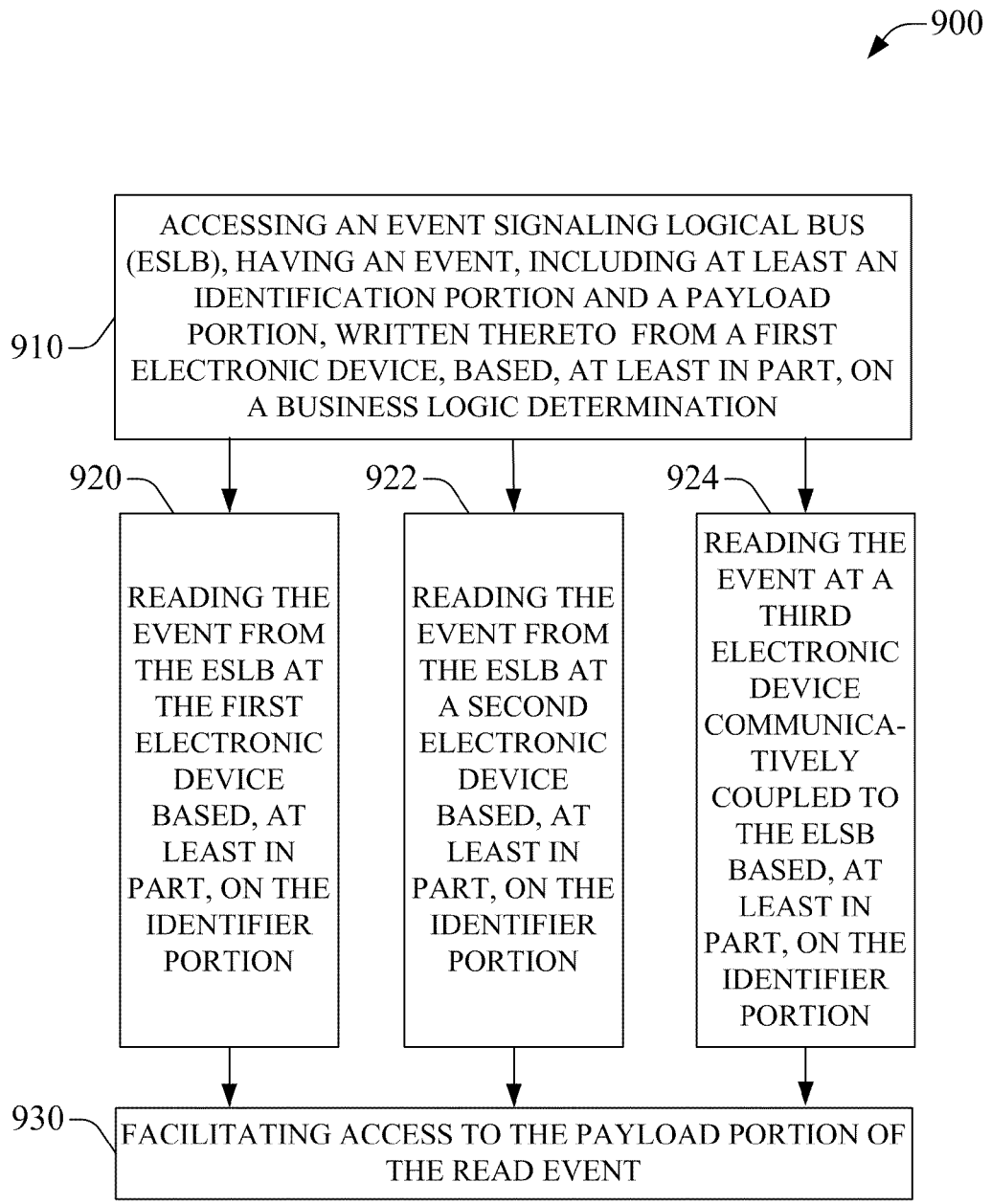
FIG. 9 illustrates aspects of a methodology facilitating communication in an agnostic execution environment in accordance with aspects of the subject disclosure.

FIG. 9 illustrates aspects of a methodology 900 facilitating communication in an AEE in accordance with aspects of the subject disclosure. At 910, an ESLB, having an event written thereto from a first electronic device, can be accessed. The event on ESLB at 910 can include at least an identifier portion and a payload portion. The event can have been written to the ESLB by a first electronic device and writing it can have been based, at least in part, on a business logic determination.

In accordance with an aspect of the disclosed subject matter, an SPI module, which can be the same as, or similar to, SPI modules 250 to 254 of system 200, etc., can embody business logic and can form and write events to an ESLB, which can be the same as, or similar to, ESLB 830 of system 800, etc. These events can facilitate achieving the goal(s) or purpose(s) of a business logic. For example, where an SPI embodies services, sub-routines, etc. related to determining the location of airplanes in flight patterns near airports, an event can be written to an airport AEC ESLB that has an identifier and a payload portion. The exemplary event can identify as containing flight traffic class data for an identified flight number. The payload of the exemplary event can, for example contain a flight identifier, a plane identifier, captain's name, present heading, GPS location, speed, altitude, and flight equipment status for the designated plane. Applications on electronic devices of the airport AEC can read the event from the ESLB to access the payload data.

Where an event has been written to an ESLB, as disclosed herein, members of an AEC sharing the ESLB, for example, as in system 800, can read the event from the ESLB. At 920, a first electronic device can read the event from the ESLB based, at least in part, on the identifier portion. This aspect of methodology 900 can be easily related to electronic device 462 of system 400, wherein an app such as 442 can write an event by way of AEC component 432 to an ESLB (not illustrated in FIG. 4). Where the selfsame device is also a member of the AEC 480, it can generally read from the ESLB. As such, where the identifier can specify a payload valuable to another application in the same device, the other application (e.g., 444) can read the event from the ESLB within the same device, for example, to access the payload. In an aspect, this can be viewed as a form of intra-device agnostic behavior. Continuing the flight data example above, where the specified airplane writes the event with the aforementioned identifier and payload portions, a flight data recorder application of the airplane computer can read the event from the ESLB at 720 where the identifier, for example, indicates that the event contains valuable flight data that the flight recorder application identifies as information that should be recorded.

Further, where events on the ESLB can be contemporaneously accessed by devices sharing an ESLB, at 922, a second electronic device of the AEC associated with the ESLB can read the event, based at least in part on the identifier portion. For example, where an automated passenger information computer (APIC) shares the ESLB (e.g., being part of the airplane's AEC), the APIC can read the event from the ESLB, for example, to access the payload to update maps showing the position of the plane that are displayed on the seatback displays in the passenger cabin. In a related example, the pilot's cell phone can be part of the airplane AEC (e.g., permitted to join a private AEC based on employment with the airline and status as pilot) such that, for example, a cell phone "flight hours" application can read the event from the ESLB, for example, to access the payload such that the application can update a captain's log with an "in flight" status. This information can, for example, then be transmitted from the cell phone to the pilots' union and FAA tracking software to be sure the pilot does not exceed permitted flight hours per month, etc.

Similarly, at 924, a third electronic device that is communicatively coupled to the ESLB can read the event. In an aspect, reading the event at 922 differs from reading the event at 924 wherein the device at 922 can be a member of the AEC and the device at 924 can be a non-member of the AEC. As illustrated by electronic device 860 of system 800, a non-member of the AEC sharing the ESLB can be communicatively coupled to the AEC. As such, the non-member device (e.g., device 860 in system 800) can read an event from the ESLB. As an example, a taxi cab meter can be communicatively coupled to the AEC of the airplane through pathways provided by the FAA and the airport such that the incoming flight information can be read out, to access the event payload in order to compute the estimated time of arrival of the flight and to notify the cab driver with a best time to return to the airport to meet the departing passengers.

At 930, access to the payload portion of the event can be facilitated. At this point method 900 can end. In an aspect, reading the event can collapse into accessing the payload. In other aspects, accessing the event may not provide access to the payload. As an example, a payload can be encrypted or otherwise protected, the payload can be portions of code for execution, sub-routines, etc., or can be a pointer/identifier to data stored in a memory that, for example, can be remote or distributed and can even be protected by the storage system. Thus, where an ESLB can be accessed at 910 and an event can be read at 920 to 924, at 930 access to the payload read from the ESLB can be facilitated. It is anticipated that many privacy and security aspects will accompany access at 930, and one of skill in the art will appreciate that all such privacy and security aspects are to be considered within the scope of the disclosed subject matter. For example, where the taxicab computer reads the event (e.g., with permission from the FAA, air traffic control, and the airline) only portions of the payload can be made accessible to the taxicab computer. For example, the pilot's name can be considered restricted information, while the flight number, heading, and speed can be considered accessible information.

Figure 10:
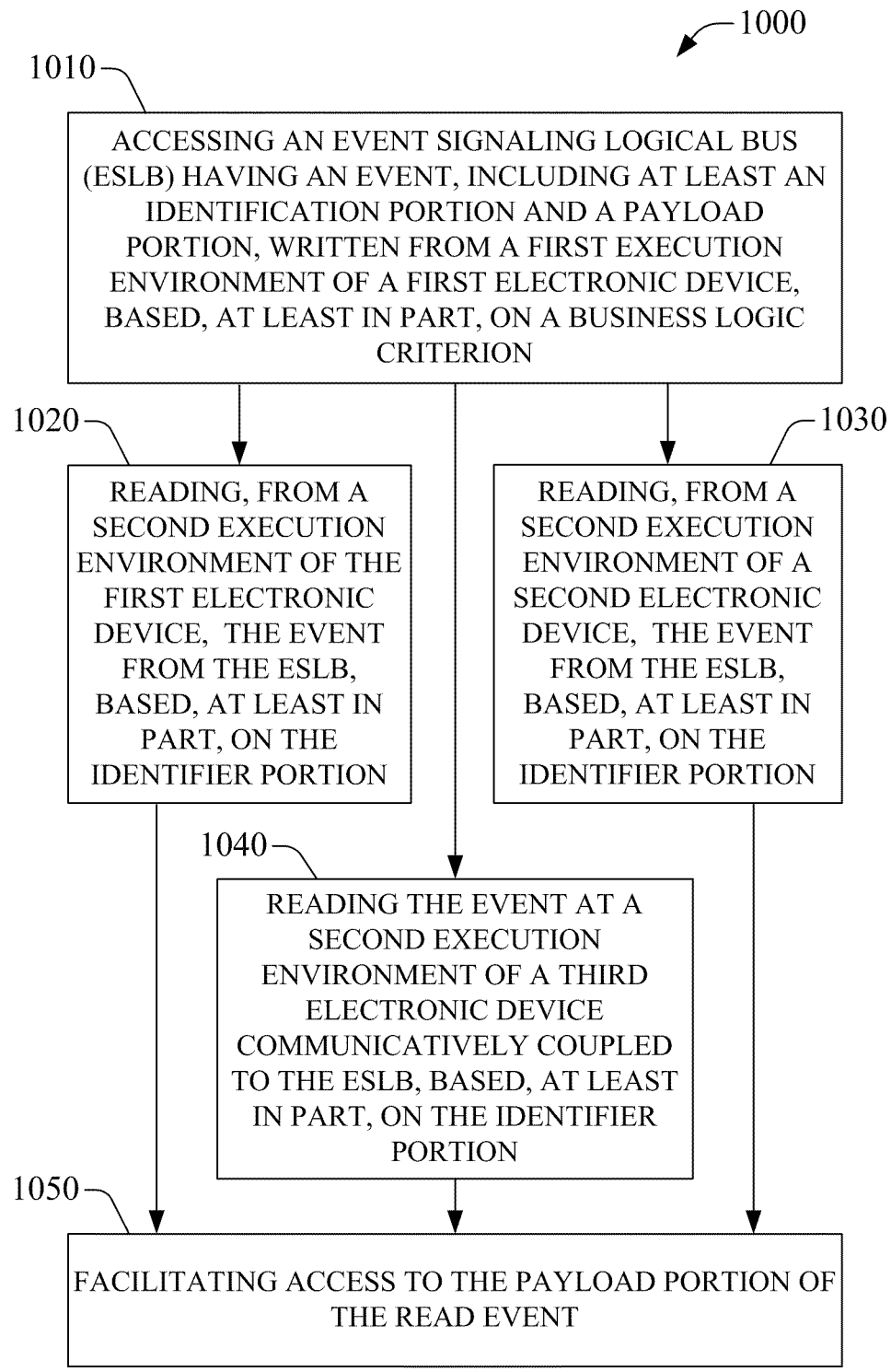
FIG. 10 illustrates aspects of a methodology facilitating communication in an agnostic execution environment in accordance with aspects of the subject disclosure.

FIG. 10 illustrates aspects of a methodology 1000 facilitating communication in an AEE in accordance with aspects of the subject disclosure. Methodology 1000 can be the same as, or similar to, methodology 900. Whereas methodology 900 is more generally applied to electronic devices accessing an ESLB, reading an event from the ESLB, and accessing the payload of a read event, methodology 1000 is more narrowly directed towards an execution environment agnostic access of information from the ESLB.

At 1010, an event written to an ESLB from a first execution environment (e.g., a first RTE, VM, OS, etc.) can be accessed. This access can be predicated on a business logic criterion. For example, a first RTE can write an event to an ESLB based, for example, predicated on the calculation of the payload being more efficient in a different RTE of the same device, a different RTE of a second device that is a member of the AEC, or a different RTE of a third device that is a non-member of the AEC. The event, similar to the event of methodology 900, can include an identifier and a payload portion.

At 1020, an event on the accessed ESLB can be read from a second execution environment of the first electronic device. This can be the same as, or similar to, reading an event at 920 of methodology 900. In an aspect, this second execution environment can be a separate instance of the same execution environment, but more typically can be an instance of a different execution environment. For example, the first execution environment can be a JAVA RTE and the second execution environment can be a FLASH RTE. Thus, at 1020, intra-device agnostic behavior can be demonstrated; for example, in the graphing calculator example, computations previously done in a JAVA RTE and associated with an event having an identifier portion specifying graphical display in a FLASH RTE and a payload portion with the data to be displayed can be read by a FLASH RTE. Other examples can, as disclosed herein, include other affiliated RTEs, OS environments, etc.

At 1030, an event on the accessed ESLB can be read from a second execution environment of a second electronic device. This can be analogous to reading at 922 of methodology 900, though it specifically is between a first and second execution environment. These two execution environments can be the same as, or similar to, those discussed with regard to reading at 1020. A difference for reading at 1030 is that the reading occurs on a second device from the ESLB, indicating that the second device is clustered with the first device in that they read from the same ESLB.

At 1040, an event on the accessed ESLB can be read from a second execution environment of a third electronic device. The third electronic device can be communicatively coupled to the ESLB (see the discussion with regard to reading at 924). Non-member electronic devices can access and read events from the first electronic device AEC ESLB. Further, execution environment agnosticism can be effected with non-member electronic devices at 1040.

At 1050, access to the read event payload can be facilitated. At this point, methodology 1000 can end. This can be analogous to the access at 930 of methodology 900. In an aspect, methodology 1000 illustrates that agnostic behavior can exist in an AEE in accord with the subject disclosure. One of skill in the art will certainly appreciate that methodology 1000 (and similarly 900) are extremely simplified to illustrate aspects of agnosticism and cluster behavior for methodologies associated with AEE. More complex methodologies comprising aspects of methodology 1000 (and similarly methodology 900) are considered within the scope of the present disclosure.

Figure 11:
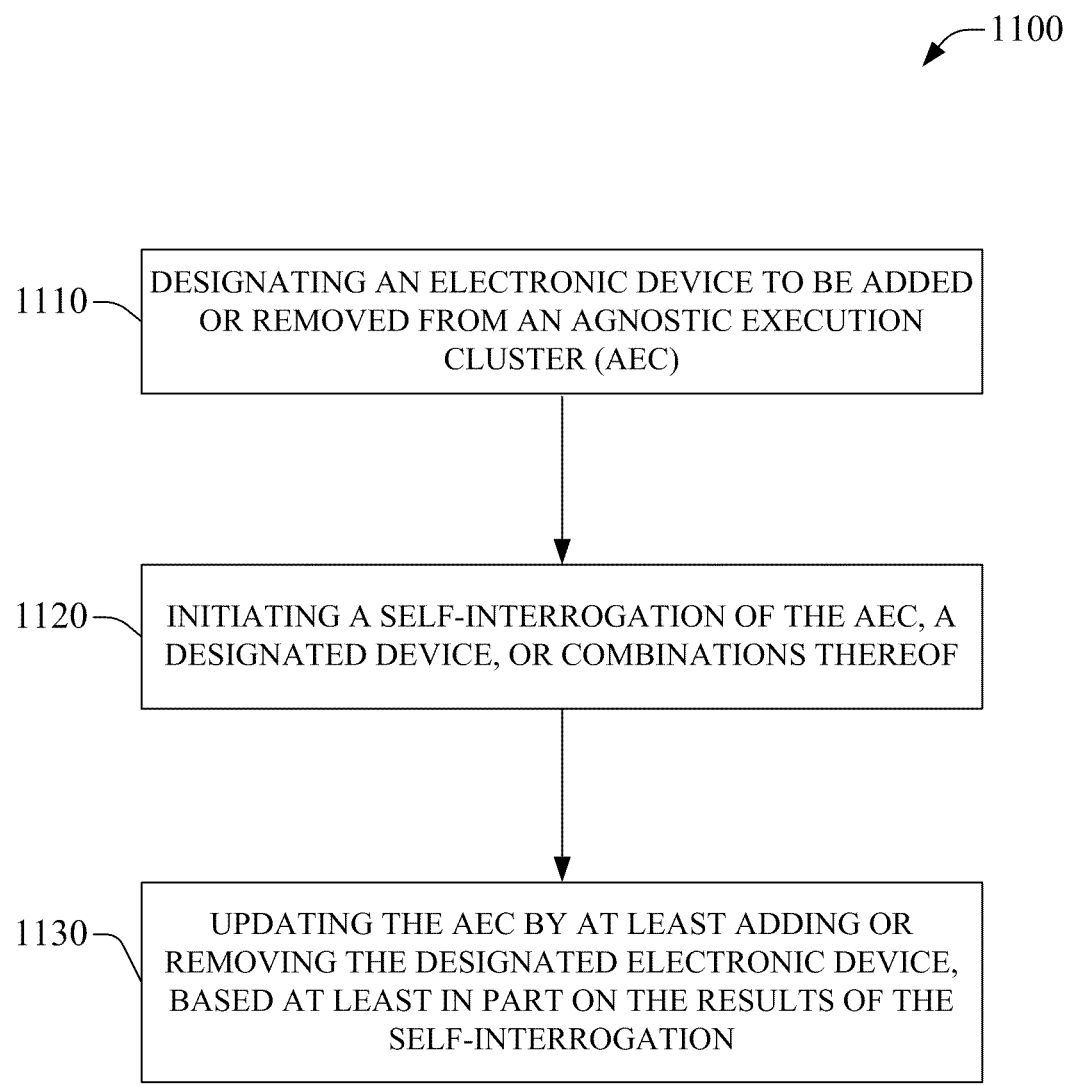
FIG. 11 illustrates a method facilitating dynamic agnostic execution cluster membership modification in accordance with aspects of the subject disclosure.

FIG. 11 illustrates a method 1100 facilitating dynamic AEC membership modification in accordance with aspects of the subject disclosure. At 1110 an electronic device to be added or removed from an AEC can be designated. In an aspect, the designation of a device for removal from an AEC can be generated by the device to be removed, by an AEC member device, by a device that is not a member of the AEC, or combinations thereof. For example, where an AEC member device is powered down, a part of the power down sequence, for example, can be to designate that it is removed from any AECs. As another example, when a device becomes non-communicative with other AEC member devices (for example, power failures, being out of cellular range, etc.), other AEC member devices can designate that it be removed from the AEC. In a third example, a network component that that, for example, tracks the spread of malware through networks, can communicate with an AEC to designate that a device be removed based, for example, on a high likelihood that the specified device is infected. One of skill in the art will appreciate that numerous other examples for designating the removal of a device can be easily envisioned and that all such examples fall within the scope of the present disclosure.

In another aspect, the designation of a device to be added to an AEC can similarly be generated by the device to be added, by an AEC member device, by a device that is not a member of the AEC, or combinations thereof. For example, a device can simply request to join an AEC (based, for example, on physical proximity (e.g., devices within 25 feet), logical proximity (e.g., devices sharing a segment of a corporate LAN), common ownership or account status (e.g., devices having a common user), affiliation with a common entity (e.g., devices belonging to a common corporation) or purpose (e.g., location aware devices), etc.). As a particular non-limiting example, a police cruiser laptop can request to join an AEC comprising other police-owned devices within 50 miles of the cruiser location, wherein those device also have accessed information related to a particular license plate number. In a further example, AEC member devices can designate (e.g., request and designate) devices to be added to the AEC (for example, to provide additional services, resources, communicative pathways, etc.). In a still further example, a device that is not a member of an AEC, such as a network controller, can designate another device for addition (for example, other cell phones between an established AEC near the edge of a cellular network where cellular coverage is poor and cell phones nearer to a base station to provide additional communicative pathways by peer-to-peer hopping).

At 1120, a self-interrogation can be initiated. This self-interrogation can be of the AEC, a designated device, or a combination thereof. For example, where a device is designated to be removed from an AEC, a self-interrogation of the AEC can facilitate assignment of processes, resources, persistent data, etc. to other members of the AEC in anticipation of removing the designated device. In another example, self-interrogating of a designated device to be removed can be faster than interrogating a large AEC, and where, for example, the designated device has no shared processes, or utilized shared resources, etc., removing the device will pose little impact on the AEC. As another example, a device to be added can be self-interrogating to facilitate identifying itself to the cluster it is attempting to join. Additionally, self-interrogating the AEC prior to adding a designated device can illuminate, for example, necessary synchronizations between replica persistent data that can be accomplished prior to the addition.

At 1130, the AEC can be updated with at least the addition or removal of the designated device from the AEC based, at least in part, on the results of the self-interrogation at 1120. At this point, method 1100 can end.

Figure 12:
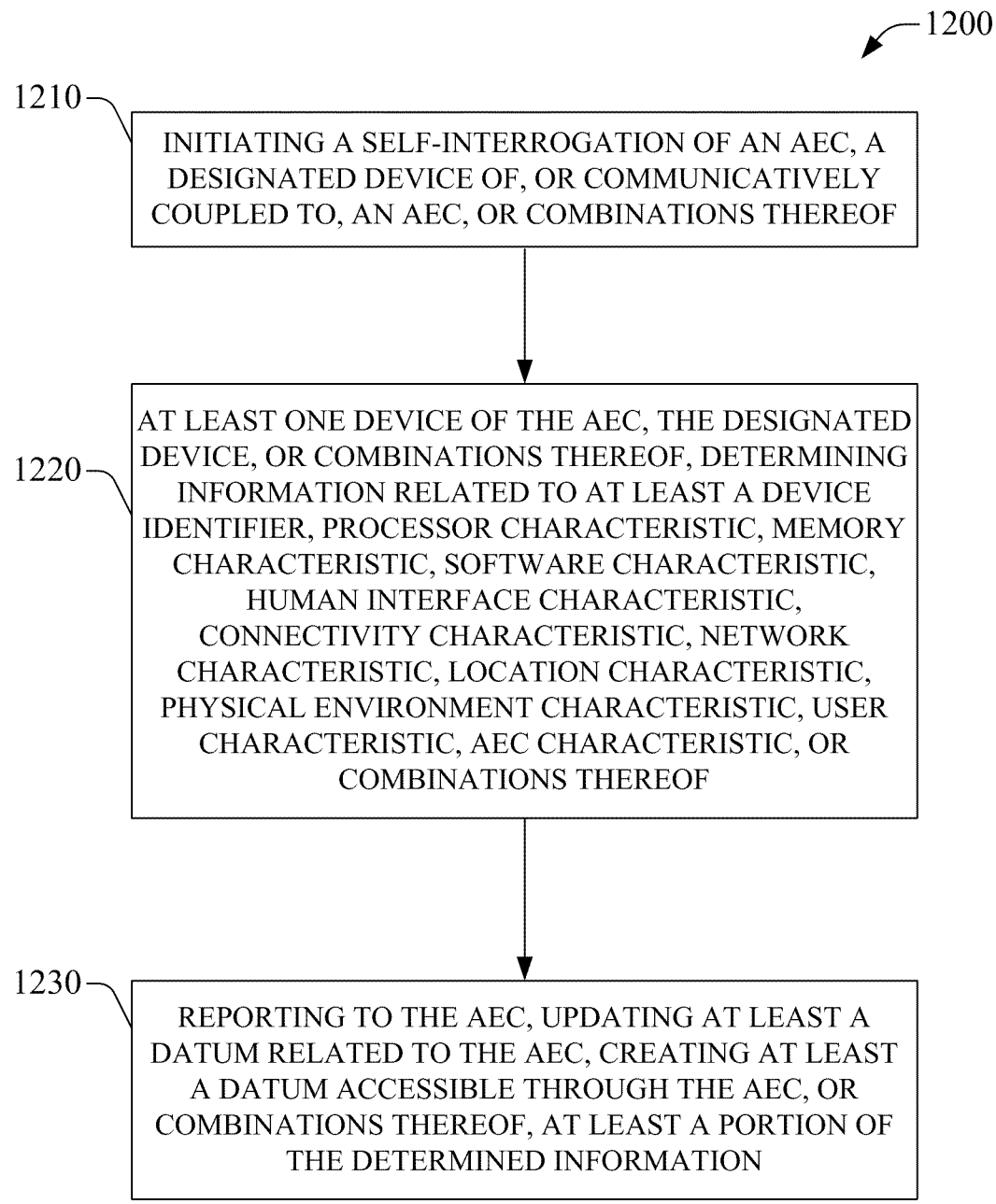
FIG. 12 is a depiction of a method facilitating self-interrogation related to an agnostic execution cluster in accordance with aspects of the subject disclosure.

FIG. 12 is a depiction of a method 1200 facilitating self-interrogation related to an AEC in accordance with aspects of the subject disclosure. At 1210 a self-interrogation can be initiated. The self-interrogation can be of an AEC, a designated device of an AEC, a designated device communicatively coupled to an AEC, or a combination thereof.

At 1220, the self-interrogation can return information for at least one device of the AEC, a designated device of the AEC, a designated device communicatively coupled to the AEC, or a combination thereof. The returned information can be related to at least a device identifier, processor characteristic, memory characteristic, software characteristic, human interface characteristic, connectivity characteristic, network characteristic, location characteristic, physical environment characteristic, user characteristic, AEC characteristic, or combinations thereof. One of skill in the art will appreciate that self-interrogation is intended to be able to access and return almost any information related to the electronic device, the cluster, the network, the user, or the environment of an electronic device. This information can be leveraged to the advantage of the users of AEE-enabled systems and methods. A self-interrogation can seek specific subsets of information. Such subsets can include some, none, or all of the available information for an electronic device (inclusive of the user, physical, computing, and network environments). For example, a self-interrogation of an altimeter that is part of an AEC can return information relating to the present geographical location and altitude of the altimeter. This exemplary altimeter information can cause the AEC to employ that specific altimeter to track changes in barometric pressure related to a storm cell passing near to the altimeters physical location. Numerous other examples of interrogation data can be envisioned and all such examples are considered squarely within the scope of the presently disclosed subject matter.

At 1230, at least a portion of the determined information from 1220 can be made available. This can be accomplished by reporting to the AEC, updating at least a datum related to the AEC, creating at least a datum accessible through the AEC, or combinations thereof. At this point method 1200 can end. In an aspect, self-reporting can cause devices of, or related to, an AEC to gather and report information relating to themselves. In another related aspect, an AEC can self-interrogate to cause some or all of the AEC member devices to report information relating to themselves to generate information reflective of the AEC itself.

Self-interrogation can be desirable in a dynamic cooperative environment, e.g., an AEE (and/or an AEC) because devices may be unable to interrogate other devices where there are hardware or software inconsistencies. For example, it may be difficult for a military satellite to be interrogated by an IPHONE given the different operating systems, the security measures, and the communicative pathway complexities. However, these various difficulties to directed interrogation are overcome with self-interrogation wherein each device self-interrogates and reports information (or parts of it) back to the AEC (and/or AEE). This can be especially powerful where the self-interrogation is related to communicative pathways for AEC member devices. For example, a cell phone can be in an over-utilized cellular environment and face degraded performance, but can be informed of a high speed Ethernet connection available by accessing a Bluetooth link to an AEC member laptop which reports that it is connected to a hotel wireless Ethernet connection. It is envisioned that the breadth of examples for self-reporting can be as varied as the types of AECs that can be formed in AEEs, and that all such self-reporting examples are within the scope of the present disclosure.

Figure 13:
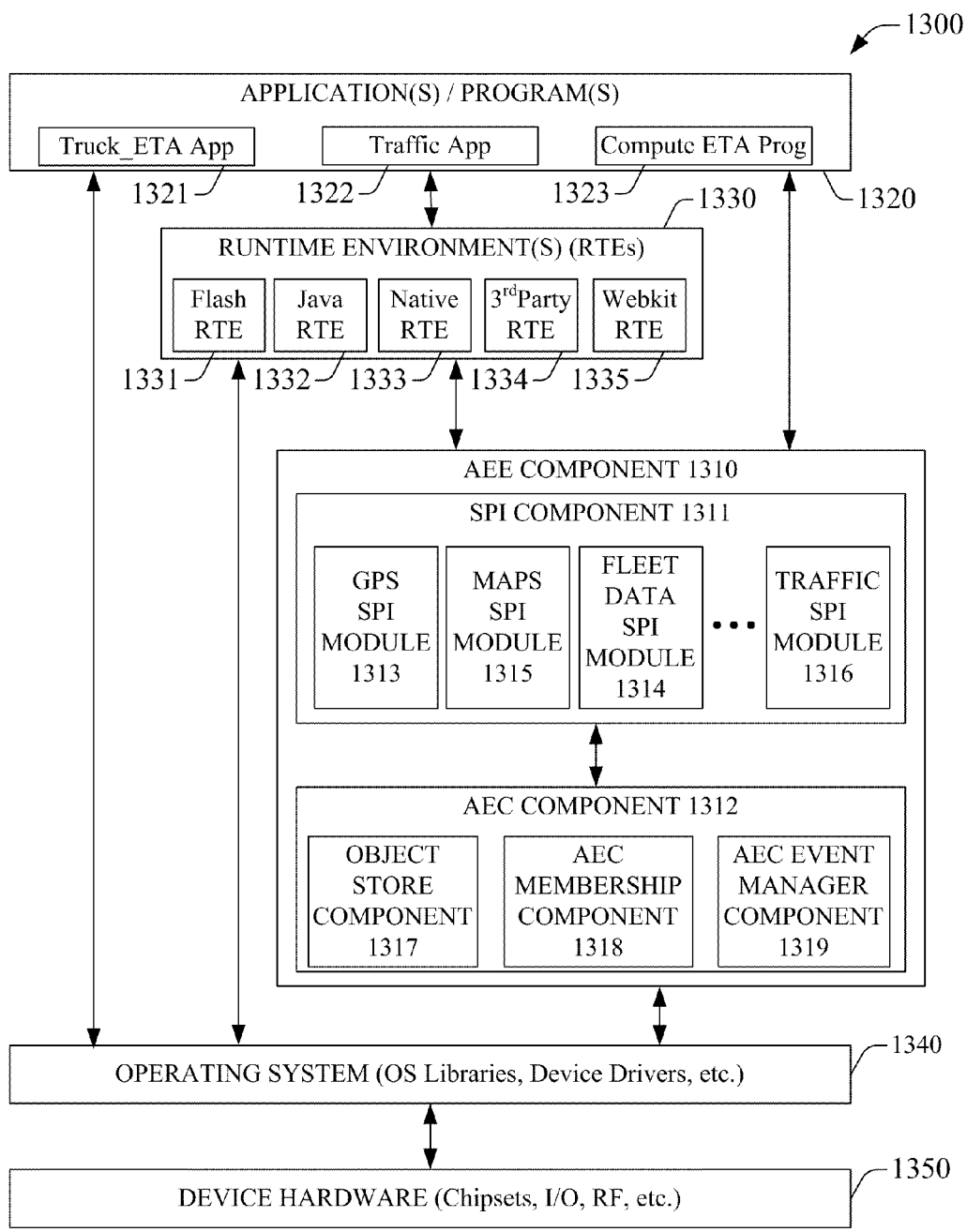
FIG. 13 illustrates a non-limiting exemplary system facilitating an agnostic execution environment in accordance with aspects of the disclosed subject matter.

FIG. 13 presents a non-limiting exemplary system 1300 facilitating an AEE in accordance with aspects of the disclosed subject matter. System 1300 can include AEE component 1310 that can include SPI component 1311 and AEC component 1312. AEC component 1312 can comprise object store component 1317, AEC membership component 1318, AEC event manager component 1319, or combinations thereof. System 1300 can further comprise A/P component 1320, RTE component 1330, OS component 1340, device hardware component 1350, or combinations thereof. In an aspect, system 1300 can be the same as, or similar to, system 100. Moreover, it will be appreciated by one of skill in the art that the various components comprising system 1300 can be the same as, or similar to, the several component(s), either alone or in combination, described herein for the various systems 100 to 900. For example, SPI component 1311 can be the same as, or similar to, SPI component 220 of system 200, SPI components 320 to 324 of system 300, SPI components 420 to 422 of system 400, or combinations thereof. SPI component 1311 can further comprise a plurality of SPI modules (SPIMs) that can be abstractions of AEE service functionality as disclosed hereinabove and which can be the same as, or similar to, SPI modules 250 to 254 of system 200.

Figure 14:
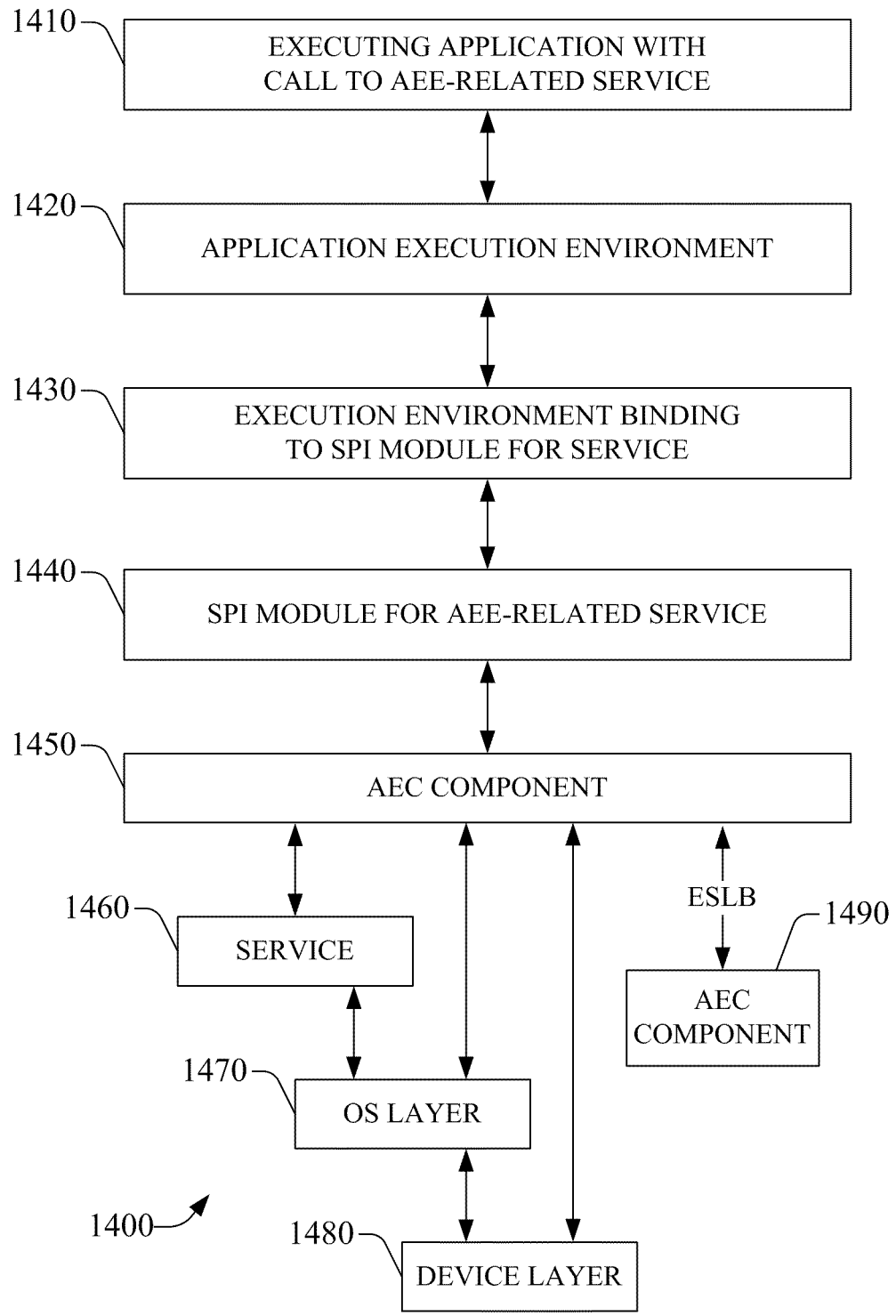
FIG. 14 illustrates a non-limiting exemplary illustration of an interdependency flow depicting aspects of a service programming interface layer for an agnostic-execution-environment-enabled electronic device.

FIG. 14 is a non-limiting exemplary illustration of an interdependency flow 1400 depicting aspects of an SPI layer for an AEE-enabled electronic device (not illustrated). Departing momentarily from FIG. 13, at 1410 of flow 1400, an application can be executing on the device (not illustrated). The application can execute in a siloed RTE, for example, in a JAVA Virtual Machine (JVM). The execution can have a call to an AEE-related service, for example, searching metadata for music files of all cluster member devices. At 1420, the executing program with the call to the AEE service can interact with the execution environment of the application. Continuing the present example, the program can interact within the JVM to initiate a call to the metadata search service. One of skill in the art will appreciate that this interaction with the JVM can be the result of the SPI service call being included in the application when the application was in development. For example, the JAVA development environment allowed the application programmer to include access to an SPI service in the application through a JAVA API at build time. Thus at 1430, the execution environment (e.g., the JVM) can interact with the execution environment binding of the SPIM related to the service (e.g., the JVM can bind to the SPIM associated with searching music file metadata within a cluster).

At 1440, the binding from 1430 can allow the program from 1410 to interact with a SPIM related to the service, for example, the JAVA application in execution can now interact with the SPIM for searching music file metadata. At 1450, the SPIM at 1440 can facilitate interaction with an AEC component of the device executing the application of 1410. Continuing the example, the JAVA application, through the metadata search SPIM, can interact with the AEC component. One of skill in the art will appreciate that where a SPIM is an abstraction of service functionality, as herein disclosed, the SPIM can allow a calling application or program to interact with the AEC to effect the abstracted AEE service functionality. At 1460, the application of 1410 can access the service, e.g., the JAVA application in execution, at 1410, can access the music metadata search service through the AEC (at 1450) by employing the SPIM abstraction of the metadata search service (accessed at 1440) bound to the RTE silo of 1420, at 1430.

It will be appreciated by one of skill in the art that the SPIM at 1440 can be accessed by other RTEs (e.g., a FLASH RTE at 1420) by employing different bindings at 1430. In an aspect, the APIs of the various affiliated RTEs can provide access to the SPIMs in their respective programming environments. Further, affiliated RTE bindings to SPIMs can be provided for the various affiliated RTEs. In contrast to APIs which can be constrained to their particular RTE silos, the SPIMs can be accessible from affiliated RTEs (including affiliated native RTEs) to allow access to AEE-related services from within the various RTE silos that are otherwise generally non-cooperative.

At 1470 and/or 1480, the service at 1460 (and/or the AEC component at 1450) can access the OS layer and/or the device component layers of a device executing the application at 1410. Further, at 1490, the AEC can announce and listen for events over the ESLB to other devices by way of their AEC components. For example, a service resident on a desktop PC can be accessed by the exemplary JAVA application running on a smartphone at 1410 (by way of the ESLB). In a related aspect, it will be appreciated that the SPIM, being an abstraction of service functionality, can be a permissive gateway to the service, e.g., where a SPIM is out of date, the abstraction can be out of date and access to the service can fail; the SPIM can incorporate authentication elements; etc.

Returning to FIG. 13, in a non-limiting exemplary embodiment, SPI component 1311 can further comprise a plurality of SPI modules including, in this example, GPS SPIM 1313, Maps SPIM 1314, Fleet Data SPIM 1315, and Traffic SPIM 1316, and others (not illustrated). The SPIMs can facilitate agnostic access to AEE-related services from within affiliated RTEs, applications, programs, OSs, or combinations thereof (e.g., an affiliated RTE can include application development tools to access, through an AEC component, AEE services abstracted in a SPIM; the application, program, and/or OSs can include calls to SPIM AEE service function abstractions; etc.). For example, GPS SPIM 1313 can be related to global positioning satellite location services. As another example, Maps SPIM 1314 can relate to mapping services. In a further example, Fleet Data SPIM 1315 can related to truck fleet information and location services. As an additional example, Traffic SPIM 1316 can relate to traffic data services. One or more of the RTEs (e.g., those in 1330) can access these services by calling through the appropriate SPIM; for example, where Traffic App 1322 is a JAVA application, it can access traffic data service by calling through the Traffic SPIM 1316 from within JAVA RTE 1332.

Where system 1300 can employ a plurality of runtime environments, RTE component 1330 can comprise, for example, FLASH RTE 1331, JAVA RTE 1332, native RTE 1333, other 3$^{rd}$ Party RTE 1334, WEBKIT RTE 1335, or combinations thereof, and others (not illustrated) among numerous available RTEs as will be appreciated by one of ordinary skill in the art. The various RTEs can facilitate access to desirable features within each siloed RTE. In traditional systems, this access would result in siloing an application within the specific RTE. In contrast to traditional systems, the features of the various RTEs of the exemplary system 1300 (e.g., RTEs 1331 to 1335) according to the present disclosure can be accessed agnostically by, for example, employing AEE component 1310 to execute select code segments in a plurality of appropriate RTEs as needed. For example, an application for plotting the movement of a fleet vehicle can access fleet data by way of fleet data SPIM 1314, compute and log the location in JAVA RTE 1332, and display the plot of the logged locations in the FLASH RTE 1331 (e.g., the application can be developed to include calls to specific JAVA and FLASH features). For example, the application can execute in JAVA and call a FLASH emulator to display the plot; the application can execute in native and spawn a sub-routine in JAVA to compute and a sub-routine in FLASH to plot; the application can be written in FLASH and use a Bytecode translator to do the computations in a JVM; etc.

To better illustrate other examples of agnostic execution environments, including those demonstrating cluster behavior, non-limiting exemplary programs and non-limiting exemplary applications within the A/P component 1320 such as Truck_ETA application 1321, Traffic application 1322, or compute_ETA program 1323 can be introduced. Exemplary Truck_ETA application 1321 can be, for example, an application that can display the estimated time of arrival (ETA) for specified trucks within a vehicle fleet, for example, for a parcel delivery company. Exemplary Traffic application 1322, for example, can be an application to access traffic information for specified roadways. Exemplary compute_ETA application 1323 can be a helper computation program that can calculate an estimated time of arrival given a destination location, a present location, and a source of route information(s). Further, FIG. 15 can be introduced to aid in illustrating certain aspects related to executing one or more of the exemplary applications and/or programs.

Figure 15:
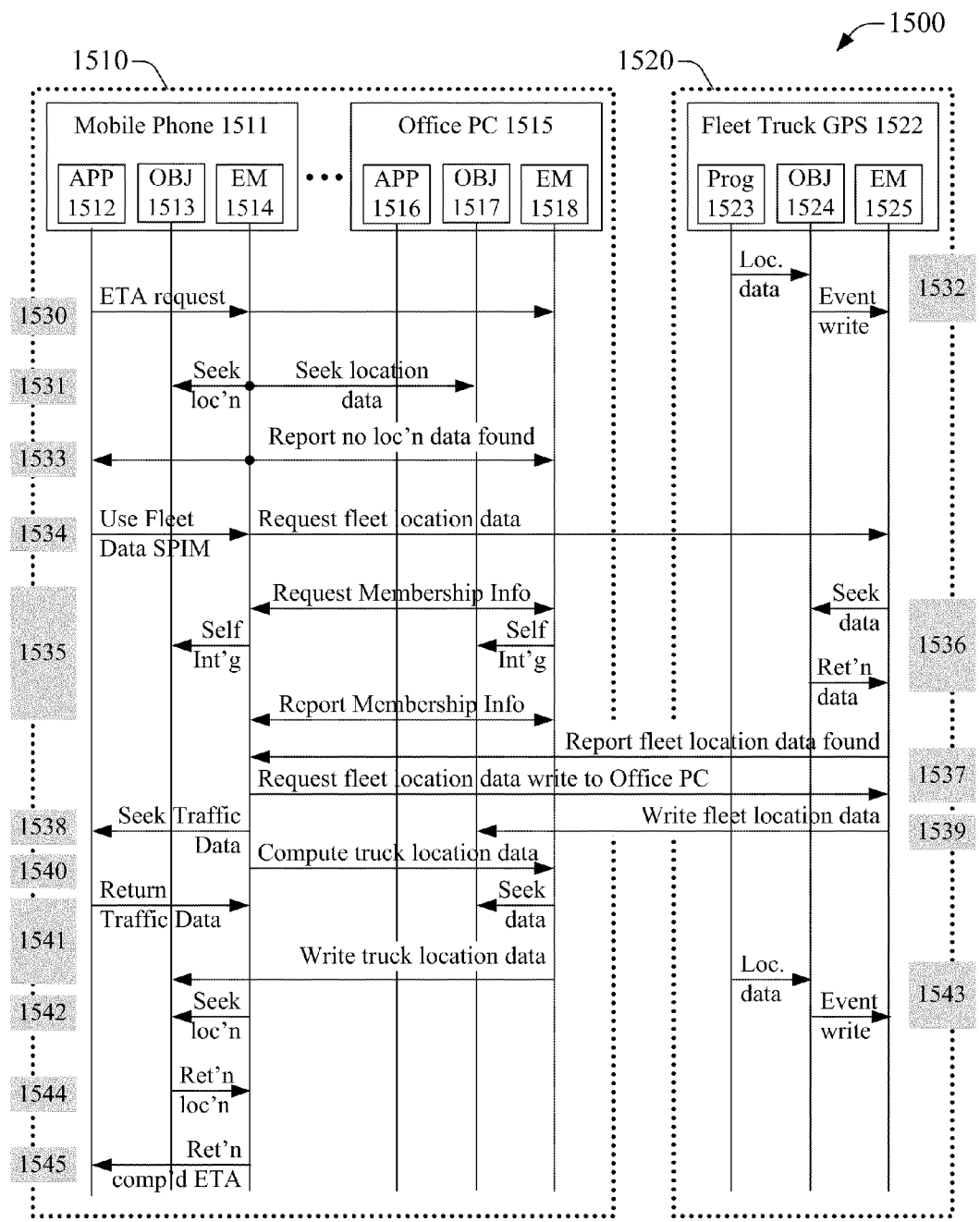
FIG. 15 illustrates a non-limiting exemplary service flow facilitating an agnostic execution environment in accordance with aspects of the disclosed subject matter.

FIG. 15 is a non-limiting exemplary service flow 1500 facilitating an AEE in accordance with aspects of the disclosed subject matter. Service flow 1500 can comprise services within devices, between devices within an AEC, between a plurality of AECs, or combinations thereof. As such, service flow 1500 can be demonstrated as involving AEC 1510 which has a plurality of electronic devices, such as mobile phone 1511 and Office PC 1515. As disclosed elsewhere herein, an AEC can include an ESLB (not illustrated) facilitating contemporaneous signaling among AEC components (not illustrated). Service flow 1500 can also involve AEC 1520 that can comprise, for example, Fleet Truck GPS device 1522. Each electronic device can further comprise an application or program component (e.g., App/Prog 1512, 1516, 1523, respectively) which can be the same as, or similar to, an application from 1320 of FIG. 13, and an AEC component (not illustrated) including an object store component (e.g., OBJ 1513, 1517, 1524, respectively), an AEC event manager component (e.g., EM 1514, 1518, 1525, respectively), or combinations thereof.

In an aspect, OBJ 1513 and OBJ 1517 can comprise shared memory (e.g., joint memory space, lookup tables, etc.), where they are both within AEC 1510. In another aspect, OBJ 1513 and OBJ 1517 can comprise separate memory (e.g., distinct memory space, private lookup tables, etc.), in that, while they are in the same AEC, they are also relative to separate electronic devices. In an example, OBJ 1513 and OBJ 1517 can each comprise a local public memory, a local private memory, remote private memory, and remote shared memory, wherein both the local and local private memory for each device can be unshared and non-indexed privileged memories, local public memories for each device can be indexed and accessible to other devices within AEC 1510, and the remote shared memory space for each device can be a memory resident in a cloud computing environment (e.g., on a server) that is shared by both devices simultaneously. One of skill in the art will appreciate the numerous other permutations for structuring memory amongst the various devices of an AEC jointly and severally, as well as features associated with replication and synchronizing data among local, remote, and distributed members and components of an AEC. While not all such permutations are demonstrated in this particular non-limiting example, all such permutations are considered within the scope of the disclosed subject matter.

In a further aspect, OBJ 1524 can be accessible by AEC 1510. While OBJ 1524 can be separate from AEC 1510, it can be permissibly interrogated either directly (e.g., memory made open generally to the public, for example, searching a library catalog; by first gaining permission to directly access a memory, for example, accessing an email account; etc.) or indirectly (e.g., requesting that a privileged entity access the memory for the AEC, for example, requesting a news feeds from an aggregator). Again, as previously stated, while not all of the numerous permutations readily apparent to one of skill in the art are demonstrated in these particular non-limiting examples, all such permutations are considered within the scope of the disclosed subject matter.

AEC 1510 and AEC 1520 can be communicatively coupled in a manner that is the same as, or similar to, other AEC systems disclosed herein (e.g., system 800). As such, AEC 1510 can, for example, be communicatively coupled to Fleet Truck GPS 1522 of AEC 1520 by way of, for example, cellular link, satellite link, broadcast frequency transmission, internet servers, Ethernet components, etc., or combinations thereof. In a particular non-limiting example, AEC 1510 can receive information from Fleet Truck GPS 1522 by way of a first bearer, for example, a satellite uplink. Further, in this example, AEC 1510 can send information to Fleet Truck GPS 1522 by way of a separate bearer, for example, a uni-directional RF broadcast from transmission antenna in the same geographic region as Fleet Truck GPS 1522 (e.g., as the GPS unit in the truck travels along the interstate highway system). Numerous other examples are readily apparent and all such examples are within the scope of the disclosure.

Whereas a more expansive example can foster an appreciation of some of the various features of an AEE and/or AEC, a further multipart non-limiting example is herewith presented in the following paragraphs with reference to both FIGS. 13 and 15 simultaneously. This example is intended only to aid in comprehension of some of the more subtle aspects of the disclosure and is not meant to read or breath limitation into these or any other aspects of the subject disclosure. This example can begin by appreciating that mobile phone 1511 of AEC 1510 in FIG. 15 can comprise system 1300 of FIG. 13. Truck_ETA application 1321 can be initiated (e.g., application component 1512 can be the Truck_ETA application 1321 in execution) on mobile phone 1511 and ETA request 1530 can be generated from application component 1512 during execution (e.g., 1512 can be an instance of Truck_ETA application 1321 and can request an ETA for a specific truck in a fleet of trucks).

An event (not illustrated) correlating to an ETA request, at 1530, can be written to the ESLB of AEC 1510 by EM 1514. The event related to ETA request 1530 can include an identifier portion and a payload portion. EM components 1514 and 1518 can contemporaneously access the written event, and based at least in part on the identifier portion can route the payload. As such, EM 1518 can determine from the identifier portion that no action needs to be taken on Office PC 1515. In contrast, based at least in part on the identifier portion, EM 1514 can determine that the Mobile phone 1511 OS (not illustrated) should be caused to seek location information (at 1531) from all AEC 1510 object stores (e.g., OBJ 1513 to 1517). While these events are occurring within AEC 1510, other events can be occurring in AEC 1520; for example, program 1523 of Fleet Truck GPS 1522 can be writing, at

1532, a location data to OBJ 1524. Further, at 1532, the ESLB of 1520 can have an event written thereto indicating that the location information on OBJ 1524 was updated, wherein the event can be read by EM 1525 from the ESLB without requiring further action (based at least in part on the identification portion indicating it is a status update event).

Returning to AEC 1510, where the seek at 1531 did not resolve location data, EM 1514 can write a status update event to the ESLB indicating that no data was located at 1533. The status update at 1533 can be simultaneously read by EM 1518 and communicated to application component 1512. Application component 1512 (e.g., Truck_ETA application 1321) can then cause an event to be written, at 1534, by EM 1514 to the ESLB seeking that the search be expanded by way of fleet data SPIM 1314 to seek data from Fleet Truck GPS 1522. The event, at 1534, can be read by EM 1514 which can cause AEC 1510 to employ a communicative pathway (e.g., through device hardware 1350) to communicate the event to EM 1525 by way of the ESLB of 1520, such as, by a cellular network link to Fleet Truck GPS 1522.

Within AEC 1510, AEC membership information can be requested, at 1535, initiating a self-interrogation on mobile phone 1511 and Office PC 1515 (among other devices of AEC 1510), which results can be written to a shared table between OBJ 1513 and 1517. Such membership information can then be reported among the cluster membership by writing an event to the ESLB. Meanwhile at 1536, a seek event can be written by EM 1525 to be read by OBJ 1524 and the location data written (from 1532) can be returned by a write from OBJ 1524 that is read by EM 1525.

In response, at 1537, EM 1525 can communicate to AEC 1510 that fleet location data was found; this can be read from the ESLB of 1510 by EM 1514. The payload portion of the reporting event can indicate that the fleet data is in a large multi-dimensional table. Based in part on this report and by determining from the self-interrogation (from 1535) that the processing capacity and bandwidth capacity at Office PC 1515 is substantially greater than Mobile phone 1511, a request event can be written and communicated from EM 1514 to EM 1525 (e.g., over a communicative link between the separate ESLBs of AECs 1510 and 1520) requesting that the fleet location data be written to the Office PC OBJ 1517.

At 1538, Truck_ETA application 1321 can cause EM 1514 to communicate with Traffic App 1322 to seek traffic data. Meanwhile, at 1539, EM 1525 can write an event to OBJ 1517 (e.g., over the communicative coupling between the ESLB of 1520 and the ESLB of 1510), the event having a payload with the fleet location data found at 1536 (e.g., that generated at 1532).

At 1540, in a demonstration of split-processor computing, EM 1514 can write a request to the ESLB of AEC 1510 that identifies a payload containing an executable code segment portioned from Truck_ETA application 1321 (e.g., running on Mobile phone 1511 as application component 1512) to be executed on Office PC 1515 (for example, due to the predetermined better processing power from 1535), which can be read by EM 1518. The identifier can cause EM 1518 to read the event and send the executable code to the OS of Office PC 1515 to compute a designated truck's location from the set of fleet data received at 1539. At 1541, Office PC 1515 can seek the fleet location data on OBJ 1517 to compute the truck location and can then write the truck location (e.g., by way of a write event on ESLB) to OBJ 1513. In addition, at 1541, the Traffic data requested at 1538 through traffic SPIM 1316 can be returned from traffic application 1322.

At 1542, EM 1514 can write a seek request to facilitate access to the designated truck's location data from OBJ 1513. Meanwhile at 1543, Fleet Truck GPS 1522 can log location data and report an update (the same as, or similar to, that done at 1532). At 1544, the designated truck's location can be written back on the ESLB of 1510 and read by EM 1514. This data can then be passed to Truck_ETA application 1321 (e.g., running as application component 1512). Truck_ETA application can then call Compute ETA program 1323, which can access route data from the maps SPIM 1315 and can access GPS data for mobile phone 1511 through GPS SPIM 1313. The results of the computation can then be returned to Truck_ETA application 1321 (e.g., running as application component 1512) at 1545.

It will be appreciated by one of skill in the art that the applications/programs 1321, 1322, and/or 1323 (e.g., running as application components 1512, 1516, 1523) can be written to each run in a siloed RTE. For example, Truck_ETA application 1321 can be a JAVA application, Traffic application 1322 can be a $3^{rd}$ Party RTE application, and Compute ETA program can be written in native code (and thus be considered in a native RTE). Furthermore, one of skill in the art will appreciate that interposing the AEE component 1310 between the RTE layer (e.g., 1330) and the OS layer (e.g., 1340) can result in the EM 1514 interacting with the execution of the applications (e.g., 132, 1322, 1323). This provides for RTE level agnostic behavior as illustrated in the present example. Furthermore, whereas mobile phone 1511, Office PC 1515, and fleet truck GPS 1522 can each run a distinct OS, OS level agnostic behavior can be appreciated by passing interactions between the devices through AEE component 1310 and thereby EM 1514, EM 1518, and EM 1525.

In a further aspect, the current example illustrates that object store components (e.g., OBJ 1513, 1517, 1524) can be shared across an AEC, held private, and shared by communicating between AECs. Furthermore, it will be appreciated that, as elsewhere illustrated, where devices are not part of an AEC, they can still be communicatively accessed. This can allow for data to be located at one or more locations to facilitate efficient access, distribution, and persistence.

In an additional aspect, split processing is demonstrated in the present example (see 1540). The cluster attributes of the present disclosure facilitate execution of code in an efficient manner among AEC members (and even across multiple AEC and with non-AEC members as elsewhere herein disclosed). In this particular example, code related to complex processing of a large multidimensional table is best executed on a desktop PC as compared to a mobile device. As such, even though the application code is running on the phone, a portion of that code can be designated for execution on the desktop (both OS-agnostic and distributed processing).

While not illustrated in this particular example, the AEC can be dynamic and members can be added and removed. The demonstration of self-interrogation to determine the topology of the AEC 1510 (at 1535) can facilitate efficient dynamic membership adaptation. For example, where a larger work server computer were added to AEC 1510, the code split off at 1540 can have been run at the newly added server over the Office PC where the server can have been an even faster processor of the data. Of note, if the server was to be assigned the processing, the multidimensional table can have remained on the Office PC OBJ 1517 where it can be accessed by the server over a local high speed Ethernet connection to Office PC 1515.

While this example can serve to illustrate several aspects of the subject disclosure more clearly, it also illustrates that these many aspects (and others) can be combined in myriad ways. However, one of skill in the art will appreciate that these numerous particular combinations are all within the scope of the subject disclosure as supported herein. The specific examples made employing FIGS. 13 and 15 are not intended to limit the scope of the disclosure in any way, but are merely intended to help illustrate the intricate nature of some of the many aspects of the present disclosure. Further, the particular examples involving FIG. 13 and FIG. 15 can include further aspects described elsewhere herein.

Figure 16:
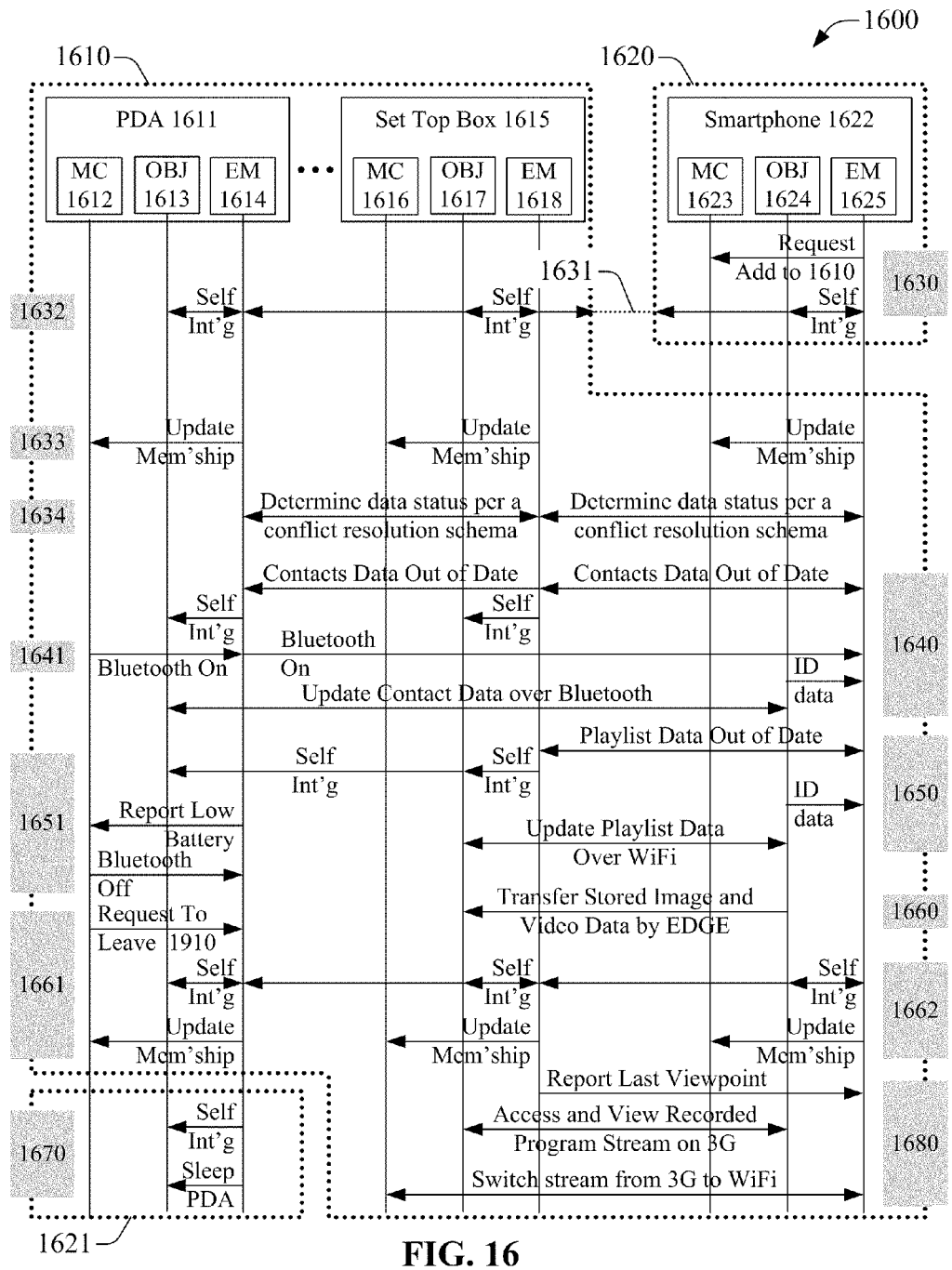
FIG. 16 illustrates a non-limiting exemplary service flow facilitating an agnostic execution environment in accordance with aspects of the disclosed subject matter.

FIG. 16 is a non-limiting exemplary service flow 1600 facilitating an AEE in accordance with aspects of the disclosed subject matter. Service flow 1600 can comprise services within devices, between devices within an AEC, between a plurality of AECs, or combinations thereof. As such, service flow 1600 can be demonstrated as involving AEC 1610 which has a plurality of electronic devices, such as Personal Digital Assistant (PDA) 1611 and Set-Top Box (STB) 1615. As disclosed elsewhere herein, an AEC can include an ESLB (not illustrated) facilitating contemporaneous signaling among AEC components (not illustrated). Service flow 1600 can also involve AEC 1620 that can comprise, for example, Smartphone 1622. Similarly, service flow 1600 can involve AEC 1621 that can comprise, for example, PDA 1611.

Each electronic device can further comprise an AEC component (not illustrated). This AEC component can comprise an AEC membership component (MC) (e.g., MC 1612, 1616, 1623, respectively) which can be the same as, or similar to, AEC membership component 270 of system 200, AEC membership components 620 to 622 of system 600, AEC membership component 750 of system 700, AEC membership component 1318 of system 1300, or combinations thereof. The AEC component can similarly comprise an object store component (e.g., OBJ 1613, 1617, 1624, respectively) which can be the same as, or similar to, object store component 260, of system 200, object store component 560 of system 500, object store components 680 to 682 of system 600, object store component 740 of system 700, object store component 1317 of system 1300, object store components 1513, 1517, 1524 of service flow 1500, or combinations thereof. The AEC component can also comprise an AEC event manager component (e.g., EM 1614, 1618, 1625, respectively), which can be the same as, or similar to, any of the various AEC event manager components 280, of system 200, AEC event manager components 685 to 687 of system 600, AEC event manager component 720 of system 700, AEC event manager component 1319 of system 1300, AEC event manager components 1514, 1518, 1525 of service flow 1500, or combinations thereof.

In an aspect, OBJ 1613 and OBJ 1617 can be the same as, or similar to, OBJ 1513 and 1517 and comprise shared memory separate memory or combinations thereof while PDA 1611 and STB 1615 are in the same AEC. In an example, while PDA 1611 and STB 1615 are members of AEC 1610, OBJ 1613 and OBJ 1617 can each comprise a local public memory, a local private memory, remote private memory, and remote shared memory, wherein both the local and remote private memory for each device can be unshared and non-indexed privileged memories, local public memories for each device can be indexed and accessible to other devices within AEC 1610, and the remote shared memory space for each device can be a memory resident in a network attached storage device (not illustrated) that is shared by both devices simultaneously (e.g., by Ethernet to STB 1615, by FTP client to PDA 1611, etc.). One of skill in the art will appreciate the numerous other permutations for structuring memory amongst the various devices of an AEC (e.g., AEC 1610) jointly and severally, as well as features associated with replication and synchronizing data among local, remote, and distributed members and components of an AEC. While not all such permutations are demonstrated in this particular non-limiting example, all such permutations are considered within the scope of the disclosed subject matter.

In a further aspect, OBJ 1624 can be accessible by AEC 1610 even when Smartphone 1622 is not a member of AEC 1610. (Similarly, OBJ 1613 can be accessible by AEC 1610 even after PDA 1611 withdraws, at 1670, from AEC 1610, as is described hereinbelow.) While OBJ 1624 can be separate from AEC 1610, it can be permissibly interrogated either directly or indirectly, in a manner that is the same as, or similar to, that described above in regard to system 1500. Again, as previously stated, while not all of the numerous permutations readily apparent to one of skill in the art are demonstrated in these particular non-limiting examples, all such permutations are considered within the scope of the disclosed subject matter.

AEC 1610 and AEC 1620 (and similarly AEC 1621 as will be disclosed hereinbelow) can be communicatively coupled in a manner that is the same as, or similar to, other AEC systems disclosed herein (e.g., system 400, 600, 800, 1500, etc.). As such, AEC 1610, or members thereof, can, for example, be communicatively coupled to Smartphone 1622 of AEC 1620 by way of, for example, cellular link, satellite link, broadcast frequency transmission, internet servers, Ethernet components, etc. In a particular non-limiting example, AEC 1610 can employ asymmetric bearer path communications, for example, receiving information from Smartphone 1622 by way of a first bearer, for example, a 3G cellular network and sending information to Smartphone 1622 by way of a distinct bearer, for example, WiFi. Numerous other examples are readily apparent and all such examples are within the scope of the disclosure.

To foster comprehension of some of the various features of an AEE and/or AEC, a further multipart non-limiting example is herewith presented in the following paragraphs. This example can begin by appreciating that AEC 1610 can initially include PDA 1611 and STB 1615 and AEC 1620, being a separate cluster, can include Smartphone 1622. Further, each of PDA 1611, STB 1615 and Smartphone 1622 can belong to the same user.

The user can determine that they would like to add Smartphone 1622 to their cluster, e.g., AEC 1610. At 1630, for example, in response to the user indicating the desired addition, EM 1625 of Smartphone 1622 can signal MC 1623 with a request to add Smartphone 1622 to AEC 1610. This request can cause Smartphone 1622 to begin a self interrogation, for example, by accessing and/or updating a table of information on OBJ 1624 relating to the characteristics of the devices in AEC 1620. The request can also be the impetus (for example, by way of signaling between AEC 1610 and Smartphone 1622 associated with the request to add at 1630) for the devices of AEC 1610 (e.g., PDA 1611 and STB 1615) to begin self interrogations at 1632, with the results being shared by, for example, establishing an ESLB 1631. One of skill in the art will appreciate that communicative pathways other than an ESLB can be established to facilitate access to information relating to the self interrogations at 1630 and 1632, for example, writing to a shared directory in the cloud; non-ESLB communicative couplings such as Bluetooth, WiFi, 3/4G, EDGE; etc., all of which are within the scope of the present disclosure.

At 1633, the membership information for AEC 1610 can be updated to reflect that Smartphone 1622 has been added to AEC 1610. This can include the EM of each member device sending an update message to the respective MC of the device (e.g., EM 1614 signals MC 1612, EM 1618 signals MC 1616, EM 1625 signals MC 1623). In an aspect, the addition of Smartphone 1622 to AEC 1610 can be independent of Smartphone 1622 remaining a member of AEC 1620. For example, Smartphone 1622 can be a member of AEC 1610 and AEC 1620 simultaneously. For ease of illustration, Smartphone 1622 is shown as leaving AEC 1620 to join AEC 1610 at 1630. As such, AEC 1620 is extinguished by 1633 in this particular example.

At 1634, EM 1618 can cause a conflict resolution to begin within newly expanded AEC 1610 (e.g., now including Smartphone 1622). This can include determining the status of data in accordance with a particular conflict resolution schema. The conflict resolution can be initiated across the cluster by posting an event on the ESLB for AEC 1610 that can be listened for by the EM of each device in the cluster, as illustrated at 1634.

At 1640 EM 1625 of Smartphone 1622 can write an event to the ESLB indicating the contacts on Smartphone 1622 are out of date. This event can be read from the ESLB by EM 1618 and can also be read contemporaneously by EM 1614. This can, for example, result in EM 1614 performing a self interrogation related to contact information stored in OBJ 1613. Similarly this can also, for example, result in EM 1618 performing a self interrogation related to contact information stored in OBJ 1617. At 1641, for example, based, at least in part, on the self interrogations at 1640 and the self interrogations at 1632, PDA 1611 can turn on a Bluetooth system of the PDA device (system not illustrated) in response to a message from MC 1612 to EM 1614. This message can, for example, indicate that the PDA has the most current contacts data set of AEC 1610 (e.g., gleaned from the self interrogations of 1640 and/or the determinations of 1634). This message can further indicate, for example, that both Smartphone 1622 and PDA 1611 have Bluetooth capabilities (e.g., from the self interrogations at 1632). The message can additionally indicate that Bluetooth should be selected based on, for example, a determination by MC 1612, that this is a sufficiently fast means of updating contact data between PDA 1611 and Smartphone 1622, that a directive from a 3G network provider indicates that 3G bandwidth is currently congested and other bearer paths are highly preferable, that PDA 1611 and Smartphone 1622 are physically near enough for effective Bluetooth communication (e.g., gleaned from a location datum of self interrogations at 1632), etc. Further, at 1641, the message to EM 1614 can cause EM 1614 to write a 'turn Bluetooth on' message onto the ESLB with an identifier portion indicating that the event should be read only by Smartphone 1622. In response, EM 1625 of Smartphone 1622 can read the event and turn on a Bluetooth system of the Smartphone device (system not illustrated). Continuing at 1640, out-of-date contact data can be identified and reported, for example, from OBJ 1624 to EM 1625. Further, at 1640, out-of-date contact information identified can be updated, for example, over a Bluetooth coupling between PDA 1611 and Smartphone 1622 (e.g., data updated between OBJ 1613 and OBJ 1624).

At 1650, EM 1618 of STB 1615 can write an event to the ESLB indicating the playlists metadata on Smartphone 1622 is out of date. This event can be read from the ESLB by EM 1625. This event can also be read contemporaneously by EM 1614 (not illustrated). This can, for example, result in EM 1618 performing a self interrogation related to playlist metadata information stored in OBJ 1617 and the shared portions of OBJ 1613. Continuing at 1650, out-of-date playlist metadata can be identified and reported, for example, from OBJ 1624 to EM 1625. Further, at 1650, out-of-date playlist metadata information identified can be updated on OBJ 1624, for example, over a WiFi coupling between STB 1615 and Smartphone 1622 (e.g., data updated between OBJ 1617 and OBJ 1624). One of skill in the art will appreciate that where portions of OBJ 1613 are shared across the cluster, information contained thereon can also be updated to OBJ 1624 (not illustrated), for example, by being aggregated to OBJ 1617; by being wrapped into an event payload and written to the ESLB and read out to OBJ 1624 by EM 1625, etc.

While the service flow at 1650 is proceeding, at 1651, EM 1614 can receive a signal that the PDA battery is running low (not illustrated), for example, from a device hardware layer, battery-monitoring application, OS level indicator, etc. This can result in EM 1614 signaling MC 1612 about the low battery condition. In response, MC 1612 can signal EM 1614 to turn off the Bluetooth system to conserve remaining battery power. While the illustrated service flow at 1650 demonstrates that the playlist metadata update occurs over a WiFi connection with STB 1615, it will be appreciated by one of skill in the art, based on the disclosure herein, that were the update was initiated with a Bluetooth link between Smartphone 1622 and PDA 1611, when MC 1612 requests the Bluetooth be turned off because of the low battery condition, EM 1614 can signal EM 1625 to complete the update by switching bearer paths to WiFi and routing the remainder of the update through STB 1615, for example by employing shared object store space. The ability of an AEC membership component to dynamically select bearer paths and route signaling (e.g., similar to a Layer 3 to Layer 7 application switch) can be a powerful tool that can facilitate self healing of perturbed processes, dynamic QOS/LOS adjustments to routing, etc., as will be appreciated by one of skill in the art, and all such features are within the scope of the present disclosure and are not limited to this simplistic example.

At 1660, stored images and video content can be transferred from OBJ 1624 to OBJ 1617, for example to free space on OBJ 1624, to place high bandwidth content at a cluster node with higher speed bearer paths (e.g., STB 1615 can have a high speed internet connection), etc. In the illustrated example, at 1660, the transfer can be by EDGE network, for example, where STB 1615 can be located at the user's home and the transfer from the Smartphone can be occurring as the user is driving to work. The use of EDGE illustrates that while the Smartphone can have access to 3G, the slower EDGE network can be selected for a lower priority data transfer (e.g., large volume of data transferred at a slower speed where the speed of transfer is not a priority). This can occur, for example, where MC 1623 is signaled that the 3G network is available but reserved for priority traffic. Such signaling can be effected by a network carrier, for example, by direct signaling, by setting a value in a lookup table accessed by MC 1623, etc. It is readily apparent that numerous metrics for determining bearer path selection and/or notification can be employed and that all are within the scope of the disclosed subject matter. Moreover, it will be appreciated that a network provider can actively and dynamically manipulate the use of network resources by way of techniques that signal subscriber devices, all such techniques are also to be considered within the scope of this disclosure. For example, regional priority surfaces can be mapped such that as a device travels between regional zones, the threshold priority level for data to employ certain levels of service can fluctuate.

At 1661, PDA 1611 can request to withdraw (e.g., MC 1612 can signal EM 1614) from AEC 1610, based, for example, on the low battery condition reported to MC 1612 at 1651. In response to the signaled request to leave AEC 1610, EM 1614 can write an event to the ESLB of AEC 1610 which can cause listening AEC event manager components (e.g., EM 1614, 1618, 1625) to self interrogate their associated devices, as illustrated. Further, at 1660, membership information can be updated and reported back to the AEC membership components (e.g., MC 1612, 1616, 1623) of the devices of AEC 1610. At this point, PDA 1611 can be considered to be removed from AEC 1610 as depicted. Thus, at 1670, AEC 1621 can comprise a single device (e.g., PDA 1611). Further, at 1670, EM 1614 can initiate a self interrogation of the single device member of AEC 1621, reporting results to persistent data storage on OBJ 1613. At this point, EM 1614 can send instructions to the device layer (not illustrated) of PDA 1611 to sleep PDA 1611 such that the most current state of PDA 1611 is written to OBJ 1613 to facilitate returning to said most current state when the PDA battery is recharged and PDA 1611 is brought out of sleep status.

At 1680, Smartphone 1622 can access and view prerecorded video content. As illustrated, this content can be distributed between both OBJ 1624 of Smartphone 1622 and OBJ 1617 of STB 1615. This can occur, for example, where only a portion of the content has been transferred between the persistent object stores; for example, the first 5 minutes of the program are buffered on OBJ 1624, such that as the remainder of the content is transferred from OBJ 1617, the transfer is more tolerant to latency. One of skill in the art will appreciate that QOS/LOS determinations (not illustrated), for example, those which can be made by MC 1616 and/or MC 1623, can be employed to determine aspects of data replication across AEC 1610 persistent object stores (e.g., OBJ 1617 and 1624). The accessed and viewed content at 1680 can be initially accessed by way of a 3G network (e.g., the transfer of content from OBJ 1617 to OBJ 1624 can be over a 3G network). MC 1616 can then determine that the bearer path for the program content be switched, for example, from 3G to WiFi. This can occur, for example, where the user is returning home from work (watching the content in the back seat of his carpool vehicle) and content is being accessed by 3G. As the user arrives home, Smartphone 1622 can automatically log into his home wireless LAN. Upon logging in, STB can signal Smartphone to switch bearer path for content to the WiFi for faster data transfer and less loading of the carrier network.

One of skill in the art will appreciate that numerous other permutations of the presented scenarios within service flow 1600 are possible and will further appreciate that these other permutations are within the scope of the present subject matter. Further, it will be appreciated that the specific examples given in the context of service flow 1600 are intended to illustrate aspect of the subject disclosure and are not meant to be limiting in any manner.

Figure 17:
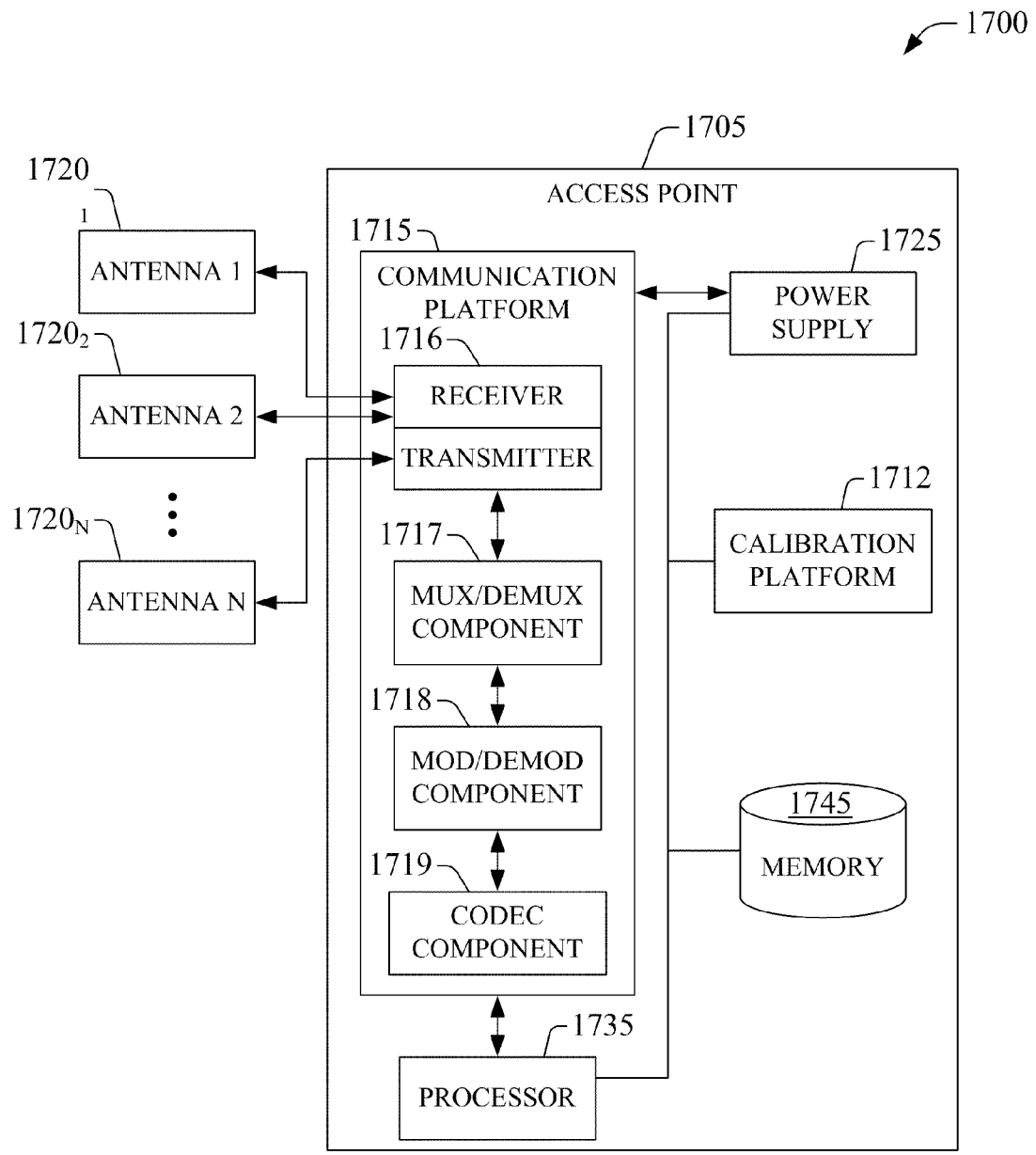
FIG. 17 illustrates a block diagram of an exemplary embodiment of an access point to implement and exploit one or more features or aspects of the subject disclosure.

FIG. 17 illustrates a block diagram of an example embodiment of an access point to implement and exploit one or more features or aspects of the subject innovation. Access point 1700 can be part of a communications framework, for example, communications framework 490, 590, 690, 790, 890, etc. In embodiment 1700, AP 1705 can receive and transmit signal(s) (e.g., attachment signaling) from and to wireless devices like femto cell access points, access terminals, wireless ports and routers, or the like, through a set of antennas $1720_1$-$1720_N$ (N is a positive integer). It should be appreciated that antennas $1720_1$-$1720_N$ embody antenna(s) 432, and are a part of communication platform 1715, which comprises electronic components and associated circuitry that provides for processing and manipulation of received electromagnetic signal(s) and electromagnetic signal(s) to be transmitted. Such electronic components and circuitry embody, at least in part, signaling and traffic components within a communication framework such that communication platform 1715 operates in substantially the same manner as communication platform 490 of system 400 (and others) described hereinbefore. In an aspect, communication platform 1715 includes a receiver/transmitter 1716 that can convert signal from analog to digital upon reception, and from digital to analog upon transmission. In addition, receiver/transmitter 1716 can divide a single data stream into multiple, parallel data streams, or perform the reciprocal operation. Coupled to receiver/transmitter 1716 is a multiplexer/demultiplexer 1717 that facilitates manipulation of signal in time and frequency space. Electronic component 1717 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1717 can scramble and spread information (e.g., codes) according to substantially any code known in the art; e.g., Hadamard-Walsh codes, Baker codes, Kasami codes, polyphase codes, and so on. A modulator/demodulator 1718 is also a part of communication platform 1715, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 1715 also includes a coder/decoder (codec) component 1719 that facilitates decoding received signal(s), and coding signal(s) to convey.

Access point 1705 also includes a processor 1735 configured to confer functionality, at least in part, to substantially any electronic component in AP 1705. In an aspect, processor 1735 can facilitate determination of propagation delay information of RF signal, or microwave signal, among communication platform 1715 and antennas $1720_1$-$1720_N$. Power supply 1725 can attach to a power grid and include one or more transformers to achieve power level that can operate AP 1705 components and circuitry. Additionally, power supply 1725 can include a rechargeable power component to ensure operation when AP 1705 is disconnected from the power grid, or in instances, the power grid is not operating.

Processor 1735 also is functionally connected to communication platform 1715 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 1735 is functionally connected, via a data or system bus, to calibration platform 1712 and other components (not shown) to confer, at least in part functionality to each of such components.

In AP 1705, memory 1745 can store data structures, code instructions and program modules, system or device information, code sequences for scrambling, spreading and pilot transmission, location intelligence storage, determined delay offset(s), over-the-air propagation models, and so on. Processor 1735 is coupled to the memory 1745 in order to store and retrieve information necessary to operate and/or confer functionality to communication platform 1715, calibration platform 1712, and other components (not shown) of access point 1705.

Figure 18:
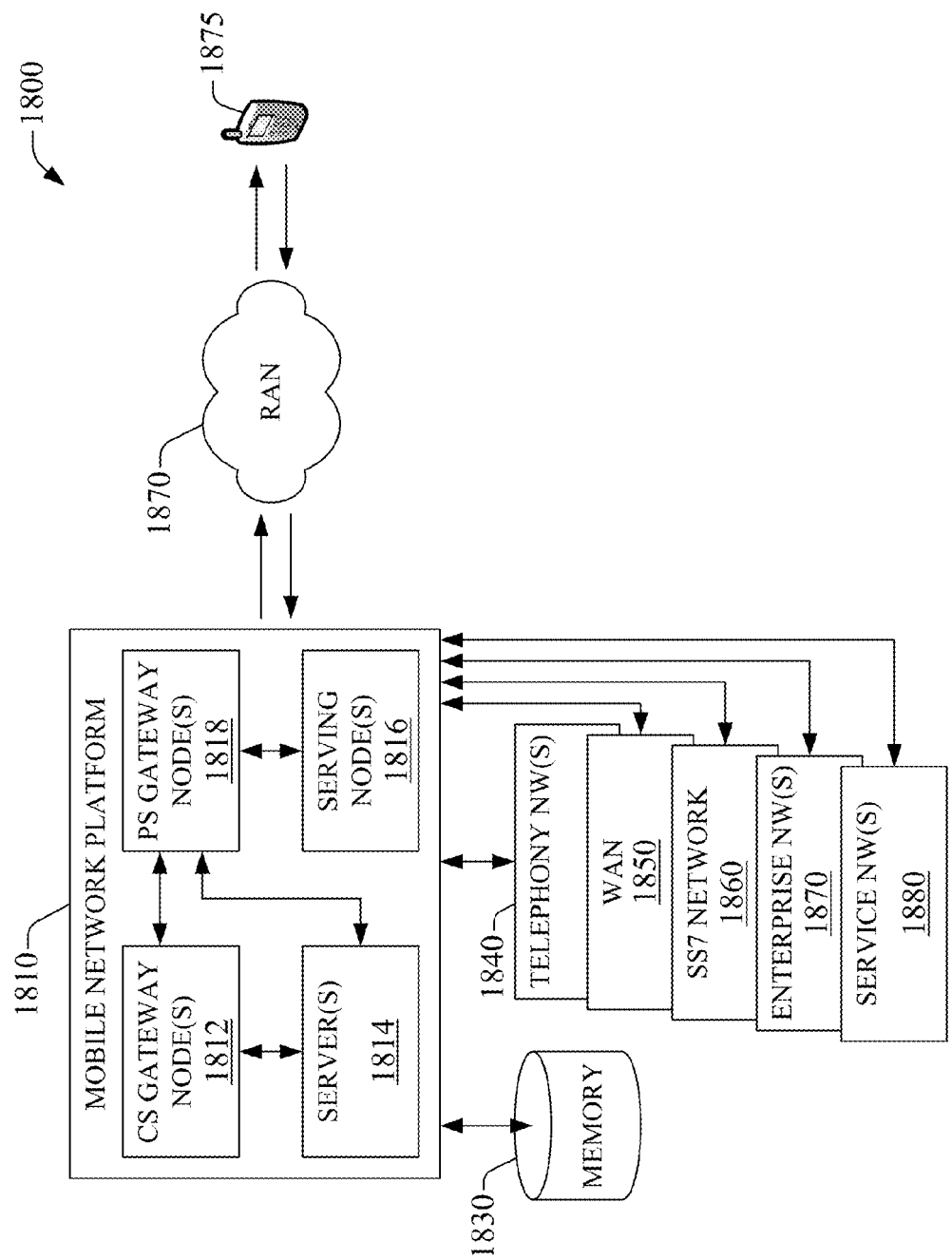
FIG. 18 is a block diagram of an exemplary embodiment of a mobile network platform to implement and exploit various features or aspects of the subject disclosure.

FIG. 18 presents an example embodiment 1800 of a mobile network platform 1810 that can implement and exploit one or more aspects of the subject innovation described herein. Mobile network platform 1800 can be at least a part of a communications framework, for example, communications framework 490, 590, 690, 790, 890, etc. Generally, wireless network platform 1810 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. Mobile network platform 1810 includes CS gateway node(s) 1812 which can interface CS traffic received from legacy networks like telephony network(s) 1840 (e.g., public switched telephone network (PSTN), or public land mobile network (PLMN)) or a signaling system #7 (SS7) network 1870. Circuit switched gateway node(s) 1812 can authorize and authenticate traffic (e.g., voice) arising from such networks. Additionally, CS gateway node(s) 1812 can access mobility, or roaming, data generated through SS7 network 1870; for instance, mobility data stored in a visited location register (VLR), which can reside in memory 1830. Moreover, CS gateway node(s) 1812 interfaces CS-based traffic and signaling and PS gateway node(s) 1818. As an example, in a 3GPP UMTS network, CS gateway node(s) 1812 can be realized at least in part in gateway GPRS support node(s) (GGSN). It should be appreciated that functionality and specific operation of CS gateway node(s) 1812, PS gateway node(s) 1818, and serving node(s) 1816, is provided and dictated by radio technology(ies) utilized by mobile network platform 1810 for telecommunication.

In addition to receiving and processing CS-switched traffic and signaling, PS gateway node(s) 1818 can authorize and authenticate PS-based data sessions with served mobile devices. Data sessions can include traffic, or content(s), exchanged with networks external to the wireless network platform 1810, like wide area network(s) (WANs) 1850, enterprise network(s) 1870, and service network(s) 1880, which can be embodied in local area network(s) (LANs), can also be interfaced with mobile network platform 1810 through PS gateway node(s) 1818. It is to be noted that WANs 1850 and enterprise network(s) 1860 can embody, at least in part, a service network(s) like IP multimedia subsystem (IMS). Based on radio technology layer(s) available in technology resource(s) 1817, packet-switched gateway node(s) 1818 can generate packet data protocol contexts when a data session is established; other data structures that facilitate routing of packetized data also can be generated. To that end, in an aspect, PS gateway node(s) 1818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1800, wireless network platform 1810 also includes serving node(s) 1816 that, based upon available radio technology layer(s) within technology resource(s) 1817, convey the various packetized flows of data streams received through PS gateway node(s) 1818. It is to be noted that for technology resource(s) 1817 that rely primarily on CS communication, server node(s) can deliver traffic without reliance on PS gateway node(s) 1818; for example, server node(s) can embody at least in part a mobile switching center. As an example, in a 3GPP UMTS network, serving node(s) 1816 can be embodied in serving GPRS support node(s) (SGSN).

For radio technologies that exploit packetized communication, server(s) 1814 in wireless network platform 1810 can execute numerous applications (e.g., location services, online gaming, wireless banking, wireless device management . . . ) that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1810. Data streams (e.g., content(s) that are part of a voice call or data session) can be conveyed to PS gateway node(s) 1818 for authorization/authentication and initiation of a data session, and to serving node(s) 1816 for communication thereafter. In addition to application server, server(s) 1814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1810 to ensure network's operation and data integrity in addition to authorization and authentication procedures that CS gateway node(s) 1812 and PS gateway node(s) 1818 can enact. Moreover, provisioning server(s) can provision services from external network(s) like networks operated by a disparate service provider; for instance, WAN 1850 or Global Positioning System (GPS) network(s) (not shown). Provisioning server(s) can also provision coverage through networks associated to wireless network platform 1810 (e.g., deployed and operated by the same service provider), such as femto cell network(s) (not shown) that enhance wireless service coverage within indoor confined spaces and offload RAN resources in order to enhance subscriber service experience within a home or business environment.

It is to be noted that server(s) 1814 can include one or more processors configured to confer at least in part the functionality of macro network platform 1810. To that end, the one or more processor can execute code instructions stored in memory 1830, for example. It is should be appreciated that server(s) 1814 can include a content manager 1815, which operates in substantially the same manner as described hereinbefore.

In example embodiment 1800, memory 1830 can store information related to operation of wireless network platform 1810. Other operational information can include provisioning information of mobile devices served through wireless platform network 1810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1830 can also store information from at least one of telephony network(s) 1840, WAN 1850, enterprise network(s) 1860, or SS7 network 1870. In an aspect, memory 1830 can be, for example, accessed as part of an object store component (e.g., 260, 560, etc.) or as a remotely connected memory store (e.g., 570, etc.), such stored information can be accessed by AEC services by way of SPI components (e.g., 220, 320-324, 420-422, etc.); by AEC membership components (e.g., 270, 640-642, etc.); by AEC event manager components (e.g., 280, 720, etc.); or combinations thereof.

Figure 19:
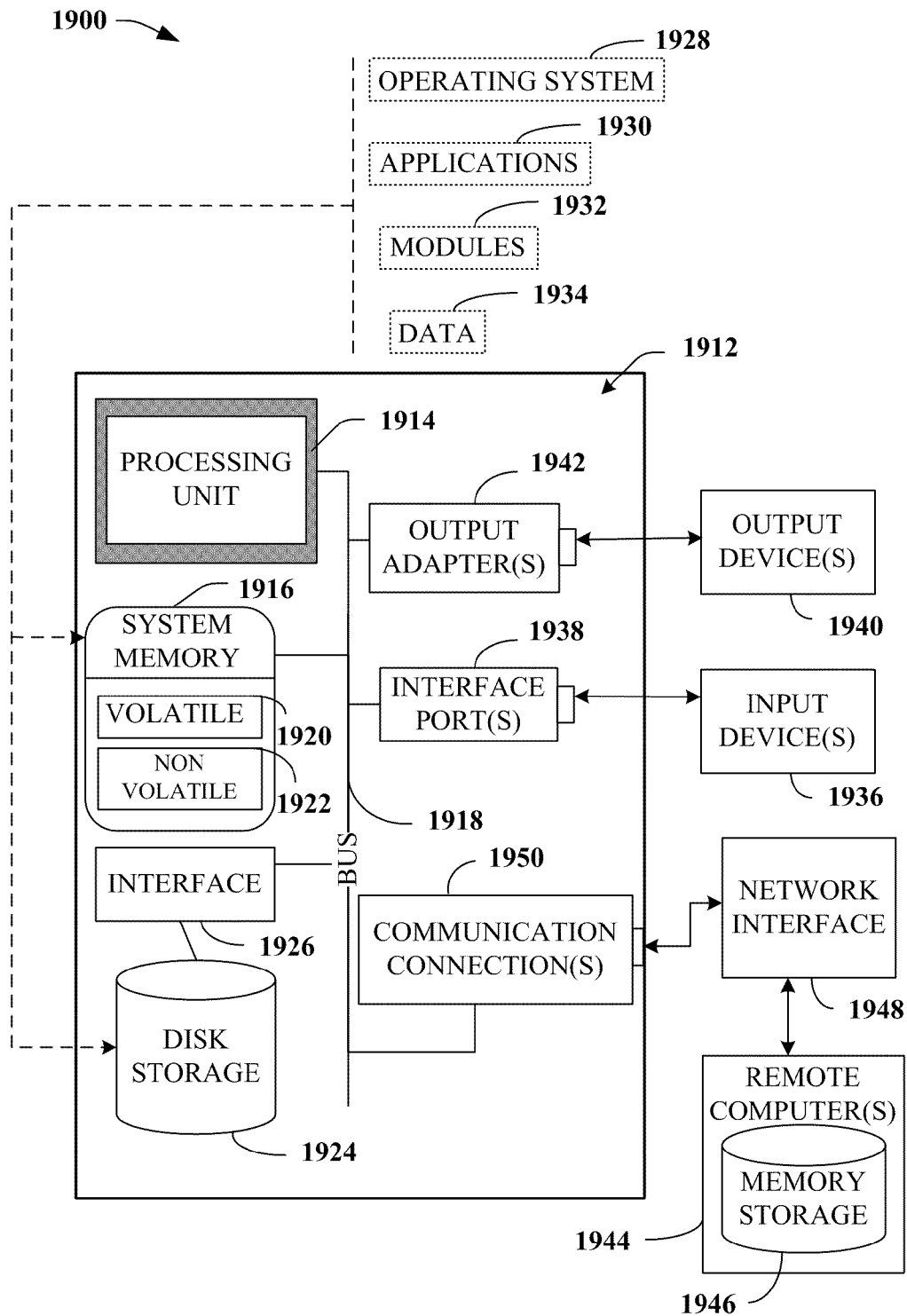
FIG. 19 illustrates a block diagram of a computing system operable to execute the disclosed systems and methods in accordance with an embodiment.

In order to provide a context for the various aspects of the disclosed subject matter, FIG. 19, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory, for example, can be included in system memory 520, memory 570, memory 794, memory 1745, memory 1830, non-volatile memory 1922 (see below), disk storage 1924 (see below), and memory storage 1946 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 19 illustrates a block diagram of a computing system 1900 operable to execute the disclosed systems and methods in accordance with an embodiment. Computer 1912 (which can be, for example, part of the hardware of a device in an AEC, such as device hardware 150) includes a processing unit 1914, a system memory 1916, and a system bus 1918. System bus 1918 couples system components including, but not limited to, system memory 1916 to processing unit 1914. Processing unit 1914 can be any of various available processors. Dual microprocessors and other multiprocessor architectures also can be employed as processing unit 1914.

System bus 1918 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1916 includes volatile memory 1920 and nonvolatile memory 1922. A basic input/output system (BIOS), containing routines to transfer information between elements within computer 1912, such as during start-up, can be stored in nonvolatile memory 1922. By way of illustration, and not limitation, nonvolatile memory 1922 can include ROM, PROM, EPROM, EEPROM, or flash memory. Volatile memory 1920 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1912 also includes removable/non-removable, volatile/non-volatile computer storage media. FIG. 19 illustrates, for example, disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1924 to system bus 1918, a removable or non-removable interface is typically used, such as interface 1926.

It is to be appreciated that FIG. 19 describes software that acts as an intermediary between users and computer resources described in suitable operating environment 1900. Such software includes an operating system 1928 (which can be, e.g., the OS of a device in an AEC, such as OS 140). Operating system 1928, which can be stored on disk storage 1924, acts to control and allocate resources of computer system 1912. System applications 1930 take advantage of the management of resources by operating system 1928 through program modules 1932 and program data 1934 stored either in system memory 1916 or on disk storage 1924. (Program modules 1932 and program data 1934 collectively can be, for example, applications, programs, RTE components, or combinations thereof, running on a device in an AEC, and/or components of, or in, an AEE, SPI module(s), object(s) stored through an Object Store component, etc.) It is to be appreciated that the disclosed subject matter can be implemented with various operating systems or combinations of operating systems.

A user can enter commands or information, e.g., via interface component 830, into computer 1911 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1914 through system bus 1918 via interface port(s) 1938. Interface port(s) 1938 include, for example, a serial port, a parallel port, a game port, and a universal serial bus (USB). Output device(s) 1940 use some of the same type of ports as input device(s) 1936.

Thus, for example, a USB port can be used to provide input to computer 1912 and to output information from computer 1912 to an output device 1940. Output adapter 1942 is provided to illustrate that there are some output devices 1940 like monitors, speakers, and printers, among other output devices 1940, which use special adapters. Output adapters 1942 include, by way of illustration and not limitation, video and sound cards that provide means of connection between output device 1940 and system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. Remote computer(s) 1944 can be a personal computer, a server, a router, a network PC, a workstation, a microprocessor based appliance, a peer device, or other common network node and the like, and typically includes many or all of the elements described relative to computer 1912.

For purposes of brevity, only a memory storage device 1946 is illustrated with remote computer(s) 1944 (which could be, e.g., in the hardware of another device that is part of the same AEC as the device whose hardware includes computer 1912; in another device in another AEC; in a device not connected with any AEC; etc.). Remote computer(s) 1944 is logically connected to computer 1912 through a network interface 1948 and then physically connected via communication connection 1950. Network interface 1948 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1950 refer(s) to hardware/software employed to connect network interface 1948 to bus 1918. While communication connection 1950 is shown for illustrative clarity inside computer 1912, it can also be external to computer 1912. The hardware/software for connection to network interface 1948 can include, for example, internal and external technologies such as modems, including regular telephone grade modems, cable modems and DSL modems, ISDN adapters, and Ethernet cards.

It is to be noted that aspects, features, or advantages of the subject innovation described in the subject specification can be exploited in substantially any wireless communication technology. For instance, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects of the subject innovation as disclosed in the subject specification can be exploited in legacy telecommunication technologies; e.g., GSM. In addition, mobile as well non-mobile networks (e.g., internet, data service network such as internet protocol television (IPTV)) can exploit aspects or features described herein.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Various aspects or features described herein can be implemented as a method, apparatus or system, or article of manufacture using standard programming or engineering techniques. In addition, various aspects or features disclosed in the subject specification also can be effected through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device comprising:
a memory to store instructions; and
a processor, coupled to the memory, that facilitates execution of the instructions to perform operations, comprising:
interfacing to a logical bus coupling the processor to a cluster of devices comprising a mobile device, wherein the cluster of devices employs distributed computing to distribute processing of a task to a plurality of devices of the cluster of devices, wherein the device is part of the cluster;
determining information related to the cluster comprising determining identification information for another device of the cluster;
receiving, via the logical bus, a communication related to the task between an operating system of the other device and a runtime executed by the other device of the cluster; and
generating an event message, for communication to the cluster via the logical bus, wherein the event message identifies the task for distributed computation by another runtime executed by the device and the runtime executed by the other device of the cluster.

2. The device of claim 1, wherein the runtime and the other runtime are executed based on different runtime executables.

3. The device of claim 2, wherein the generating the event message comprises identifying the task for distributed computation by the other runtime executed by the device, a second other runtime executed by the device and the runtime executed by the other device.

4. The device of claim 3, wherein the other runtime and the second other runtime are based on execution of different runtime environments.

5. The device of claim 4, wherein the other runtime and the runtime are based on execution of different runtime environment types.

6. The device of claim 5, wherein the other runtime and the runtime are based on execution of different runtime environment types from the second other runtime.

7. The device of claim 3 wherein the determining comprises receiving information indicating that the device employs another operating system that is a different operating system than the operating system employed by the other device.

8. The device of claim 1, wherein the operations further comprise:
receiving, via the logical bus, information relating to a functional capability of a device component of the other device of the cluster to facilitate allocation of processing related to the functional capability.

9. The device of claim 1, wherein the determining comprises receiving information indicating that the device employs another operating system that is a different operating system than the operating system employed by the other device.

10. The device of claim 9, wherein the other operating system is a consumer electronics device operating system and the operating system is a mobile device operating system.

11. The device of claim 9, wherein the interfacing to the logical bus comprises interfacing to a first logical bus associated with the device, the first logical bus coupled to a second logical bus associated with the other device.

12. The device of claim 11, wherein a first device type of the device and a second device type of the other device are different types.

13. The device of claim 12, wherein the first device type of the device is a mobile phone type and the second device type of the other device is not a mobile phone type device.

14. The device of claim 13, wherein the second device type of the other device is a consumer electronic type device for delivery of audio or video content.

15. The device of claim 14, wherein the second device type of the other device is a television type display device.

16. The device of claim 1, wherein the operations further comprise:
interfacing to a service programming interface to facilitate access to a service associated with the service programming interface by employing a programming interface to access the service without regard to an operating system type and a runtime environment type of the other runtime executed by the device.

17. The device of claim 16, wherein the interfacing to the service programming interface comprises interfacing to an abstraction of service.

18. The device of claim 1, wherein the generating the event message comprises generating an identifier portion of the event message and a payload portion of the event message.

19. The device of claim 18, wherein the generating the identifier portion comprises determining an identifier of content encapsulated in the payload portion.

20. The device of claim 18, wherein the generating the payload portion comprises encapsulating content in the payload portion.

21. The device of claim 20, wherein the generating the payload portion comprises encapsulating operable code in the payload portion.

22. The device of claim 20, wherein the generating the payload portion comprises encapsulating a nested event message in the payload portion.

23. The device of claim 20, wherein the generating the payload portion comprises encapsulating an application in the payload portion.

24. A method comprising:
interfacing, by a system comprising a processor, to a logical bus via a first device that is a member of a cluster of devices, wherein the cluster of devices, comprising a wireless device, employs distributed computing to distribute processing of a task;
communicating, by the system, with a service programming interface to facilitate access to a service associated with the service programming interface by providing a programming interface for the system to access the service that is not associated with an operating system type and a runtime environment type of the system;
reading, by the system, an identifier portion of an event message via the logical bus and, based on the identifier portion, reading the event message from the logical bus, wherein the event message comprises an identifier portion and a payload portion; and
accessing, by the system, a payload of the payload portion of the event message.

25. The method of claim 24, wherein the logical bus is shared by the first device of the cluster and a second device of the cluster and wherein the first and the second device monitor the logical bus for an event message concurrently.

26. The method of claim 24, further comprising executing, by the system, a first software component of the first device, wherein the first software component is configured to interact with a second software component executing on a second device that is a member of the cluster of devices comprising generation of an event message,.

27. The method of claim 26 wherein a first type of software of the first software component and a second type of software of the second software component are different.

28. The method of claim 27 wherein, the first type of the first software component is a first type of run time environment and the second type of the second software component is a second type of run time environment that is a different type than the first type of runtime environment.

29. The method of claim 24, wherein the payload of the payload portion of the event message comprises a nested event message.

30. The method of claim 24, wherein the payload of the payload portion of the event message comprises executable code.

31. The method of claim 30, wherein the executable code is of a type executable on a different device of the cluster than a source device of the cluster that generated the event message carrying the executable code.

32. The method of claim 30, further comprising:
executing, by the system, the executable code with the service accessed via the service programming interface.

33. The method of claim 24, wherein the first device is a mobile device and the cluster of devices comprises a consumer electronic device other than a mobile device.

34. The method of claim 24, wherein the consumer electronic device is a television-type display device.

35. A computer readable storage medium having instructions stored thereon that, in response to execution, cause a system comprising a processor to perform operations, comprising:
receiving, from a logical bus communicatively coupling a plurality of devices, an event message comprising an identifier portion and a payload portion, wherein the plurality of devices comprise a wireless device and are configured for operation as a distributed computing cluster;
determining content from the payload portion of the event message;
accessing a service based on the content, by way of a service programming interface, wherein the service is not associated with an operating system type executable by the processor or a runtime environment type executable by the processor; and
executing the content with the service accessed by the service programming interface to facilitate distributed computing of a task by the plurality of devices comprising the distributed computing cluster.

36. The computer-readable storage medium of claim 35, wherein the service is accessible via an addressable port.

* * * * *